(12) United States Patent
Gee et al.

(10) Patent No.: US 8,479,463 B2
(45) Date of Patent: Jul. 9, 2013

(54) SOLAR COLLECTORS HAVING SLIDABLY REMOVABLE REFLECTIVE PANELS FOR USE IN SOLAR THERMAL APPLICATIONS

(75) Inventors: Randall C. Gee, Arvada, CO (US); Scott Audette, Golden, CO (US); Randolph Carl Brost, Albuquerque, NM (US); Adrian L. Farr, Conifer, CO (US); Robert Hawkins, Littleton, CO (US); David White, Denver, CO (US); Shannon Thomson, Golden, CO (US)

(73) Assignee: SkyFuel, Inc., Arvada, CO (US)

( * ) Notice: Subject to any disclaimer, the term of this patent is extended or adjusted under 35 U.S.C. 154(b) by 454 days.

(21) Appl. No.: 12/499,661

(22) Filed: Jul. 8, 2009

(65) Prior Publication Data

US 2010/0032016 A1 Feb. 11, 2010

Related U.S. Application Data

(60) Provisional application No. 61/079,394, filed on Jul. 9, 2008.

(51) Int. Cl.
| | |
|---|---|
| *E04B 1/00* | (2006.01) |
| *E04B 5/00* | (2006.01) |
| *E04B 7/00* | (2006.01) |
| *E04B 1/12* | (2006.01) |
| *E04D 13/18* | (2006.01) |
| *E04H 15/00* | (2006.01) |
| *E04H 15/18* | (2006.01) |
| *E04H 14/00* | (2006.01) |
| *H01L 35/00* | (2006.01) |
| *H01L 37/00* | (2006.01) |
| *H01L 31/042* | (2006.01) |
| *H02N 6/00* | (2006.01) |

(52) U.S. Cl.
USPC ............ 52/222; 52/63; 52/173.3; 52/273; 136/214; 136/246; 136/259

(58) Field of Classification Search
USPC ............ 52/63, 222, 273, 173.3; 136/214, 136/246, 259; 126/683, 684, 696, 700
See application file for complete search history.

(56) References Cited

U.S. PATENT DOCUMENTS

| | | | |
|---|---|---|---|
| 670,916 | A | 3/1901 | Eneas |
| 670,917 | A | 3/1901 | Eneas |

(Continued)

FOREIGN PATENT DOCUMENTS

| | | | |
|---|---|---|---|
| AT | 0321919 | E | 4/2006 |
| AT | 0448369 | E | 11/2009 |

(Continued)

OTHER PUBLICATIONS

Baccaro, S., et al. (2003), "Quality control facilities for large optical reflectors at ENEA-Casaccia for physics application," Nuclear Physics B (Proc. Suppl.) 125:272-276.

(Continued)

*Primary Examiner* — Andrew Triggs
(74) *Attorney, Agent, or Firm* — Lathrop & Gage LLP

(57) ABSTRACT

Provided herein are solar collectors having reflective sheets which are slidably insertable and/or removable for quick installation, construction, removal, repair, and/or replacement. Also provided are solar collectors having reflective sheets under tension. Further provided are methods for constructing solar collectors. In another aspect, provided herein are guide rails for guiding and/or retaining slidably removable reflective sheets and holding the reflective sheets in a prescribed shape.

32 Claims, 34 Drawing Sheets

U.S. PATENT DOCUMENTS

| | | | |
|---|---|---|---|
| 1,092,503 A | 4/1914 | Moore | |
| 1,760,883 A | 6/1930 | Moss | |
| 1,792,489 A | 2/1931 | Gilmore | |
| 2,955,955 A | 10/1960 | Orr | |
| 3,070,923 A | 1/1963 | Fellman | |
| 3,187,592 A | 6/1965 | Geyer | |
| 3,459,234 A | 8/1969 | Richter et al. | |
| 3,463,527 A | 8/1969 | Baker | |
| 3,511,134 A | 5/1970 | Wittren | |
| 3,548,866 A | 12/1970 | Kaiser et al. | |
| 3,559,534 A | 2/1971 | Munro | |
| 3,564,783 A | 2/1971 | Dunne | |
| 3,584,803 A * | 6/1971 | Williams | 242/405.2 |
| 3,668,754 A | 6/1972 | Boast | |
| 3,775,226 A | 11/1973 | Windorf | |
| 3,861,379 A | 1/1975 | Anderson, Jr. | |
| 3,872,854 A | 3/1975 | Raser | |
| 3,946,532 A | 3/1976 | Gilb | |
| 4,031,444 A | 6/1977 | Back, Jr. | |
| 4,031,879 A | 6/1977 | Parham | |
| 4,069,635 A | 1/1978 | Gilb | |
| 4,069,812 A | 1/1978 | O'Neill | |
| 4,077,176 A | 3/1978 | Bauer | |
| 4,078,549 A | 3/1978 | McKeen et al. | |
| 4,119,365 A | 10/1978 | Powell | |
| 4,126,993 A | 11/1978 | Grattapaglia et al. | |
| 4,127,926 A * | 12/1978 | White | 29/453 |
| 4,141,626 A | 2/1979 | Treytl et al. | |
| 4,146,785 A | 3/1979 | Neale | |
| 4,158,356 A | 6/1979 | Wininger | |
| 4,159,710 A | 7/1979 | Prast | |
| 4,161,905 A | 7/1979 | Ota | |
| 4,178,913 A | 12/1979 | Hutchinson | |
| 4,191,164 A | 3/1980 | Kelly | |
| 4,195,620 A | 4/1980 | Rust | |
| 4,211,922 A | 7/1980 | Vaerewyck et al. | |
| 4,226,910 A | 10/1980 | Dahlen et al. | |
| 4,230,763 A | 10/1980 | Skolnick | |
| 4,237,864 A | 12/1980 | Kravitz | |
| 4,269,173 A | 5/1981 | Krueger et al. | |
| 4,293,192 A | 10/1981 | Bronstein | |
| 4,299,446 A * | 11/1981 | Jenkins, Jr. | 359/846 |
| 4,307,150 A | 12/1981 | Roche | |
| 4,313,367 A | 2/1982 | Weyer | |
| 4,313,422 A | 2/1982 | McEntee | |
| 4,318,394 A | 3/1982 | Alexander | |
| 4,328,789 A | 5/1982 | Nelson | |
| 4,343,533 A | 8/1982 | Currin et al. | |
| 4,352,511 A | 10/1982 | Ribble et al. | |
| 4,354,484 A | 10/1982 | Malone et al. | |
| 4,363,354 A | 12/1982 | Strickland | |
| 4,368,962 A | 1/1983 | Hultberg | |
| 4,372,027 A | 2/1983 | Hutchinson | |
| 4,373,514 A | 2/1983 | Lois | |
| 4,398,802 A | 8/1983 | Auger et al. | |
| 4,414,254 A | 11/1983 | Iwata et al. | |
| 4,423,719 A | 1/1984 | Hutchinson | |
| 4,425,904 A | 1/1984 | Butler | |
| 4,440,150 A | 4/1984 | Kaehler | |
| 4,446,262 A | 5/1984 | Okumura et al. | |
| 4,465,057 A | 8/1984 | Nikkel et al. | |
| 4,487,196 A | 12/1984 | Murphy | |
| 4,493,872 A | 1/1985 | Funderburk et al. | |
| 4,500,970 A | 2/1985 | Daemmer | |
| 4,510,923 A | 4/1985 | Bronstein | |
| 4,523,575 A | 6/1985 | Nikkel et al. | |
| 4,536,847 A | 8/1985 | Erickson et al. | |
| 4,571,812 A | 2/1986 | Gee | |
| 4,577,449 A | 3/1986 | Celli | |
| 4,587,951 A | 5/1986 | Townsend et al. | |
| 4,596,238 A | 6/1986 | Bronstein | |
| 4,597,377 A | 7/1986 | Melamed | |
| 4,604,990 A | 8/1986 | Nikkel et al. | |
| 4,608,964 A | 9/1986 | Russo | |
| 4,611,575 A * | 9/1986 | Powell | 126/605 |
| 4,628,692 A | 12/1986 | Pierce | |
| 4,645,714 A | 2/1987 | Roche et al. | |
| 4,666,263 A | 5/1987 | Petcavich | |
| 4,678,292 A | 7/1987 | Miyatani et al. | |
| 4,710,426 A | 12/1987 | Stephens | |
| 4,719,903 A | 1/1988 | Powell | |
| 4,739,620 A | 4/1988 | Pierce | |
| 4,832,001 A | 5/1989 | Baer | |
| 4,853,283 A | 8/1989 | Skolnick | |
| 4,888,063 A | 12/1989 | Powell | |
| 4,893,183 A | 1/1990 | Nayar | |
| 4,913,468 A | 4/1990 | Rattmann | |
| 4,933,823 A | 6/1990 | Taylor | |
| 5,006,988 A | 4/1991 | Borenstein et al. | |
| 5,013,176 A | 5/1991 | Orbom | |
| 5,049,005 A | 9/1991 | Lazare et al. | |
| 5,058,565 A | 10/1991 | Gee et al. | |
| 5,063,112 A | 11/1991 | Gross et al. | |
| 5,069,964 A | 12/1991 | Tolliver et al. | |
| 5,071,243 A * | 12/1991 | Bronstein | 359/867 |
| 5,118,540 A | 6/1992 | Hutchison | |
| 5,136,593 A | 8/1992 | Moon et al. | |
| 5,138,838 A | 8/1992 | Crosser | |
| 5,205,101 A | 4/1993 | Swan et al. | |
| 5,219,264 A | 6/1993 | McClure et al. | |
| 5,228,259 A | 7/1993 | Haddad et al. | |
| 5,237,337 A | 8/1993 | Hutchison et al. | |
| 5,251,064 A | 10/1993 | Tennant et al. | |
| 5,276,600 A | 1/1994 | Takase et al. | |
| 5,285,627 A | 2/1994 | Losel et al. | |
| 5,334,844 A | 8/1994 | Pollard et al. | |
| 5,347,986 A | 9/1994 | Cordy | |
| 5,350,201 A | 9/1994 | Bynum | |
| 5,361,172 A | 11/1994 | Schissel et al. | |
| 5,367,174 A | 11/1994 | Bazile et al. | |
| 5,398,462 A | 3/1995 | Berlin et al. | |
| 5,404,868 A | 4/1995 | Sankrithi | |
| 5,444,972 A | 8/1995 | Moore | |
| 5,446,356 A | 8/1995 | Kim | |
| 5,448,868 A | 9/1995 | Lalvani | |
| 5,531,216 A | 7/1996 | Nicklas et al. | |
| 5,542,409 A | 8/1996 | Sampayo | |
| 5,673,684 A | 10/1997 | Myles, III et al. | |
| 5,681,642 A | 10/1997 | Sugisaki et al. | |
| 5,706,798 A | 1/1998 | Steinorth | |
| 5,787,877 A | 8/1998 | Nicklas et al. | |
| 5,793,934 A | 8/1998 | Bauer | |
| 5,804,942 A | 9/1998 | Jeong | |
| 5,806,553 A | 9/1998 | Sidwell | |
| 5,819,008 A | 10/1998 | Asama et al. | |
| 5,820,168 A | 10/1998 | De Giacomoni | |
| 5,846,659 A | 12/1998 | Lower et al. | |
| 5,851,309 A | 12/1998 | Kousa | |
| 5,857,322 A | 1/1999 | Cohn | |
| 5,896,488 A | 4/1999 | Jeong | |
| 5,899,199 A | 5/1999 | Mills | |
| 5,929,530 A | 7/1999 | Stone | |
| 5,938,364 A | 8/1999 | Hayden | |
| 5,956,917 A | 9/1999 | Reynolds | |
| 5,964,216 A * | 10/1999 | Hoffschmidt et al. | 126/696 |
| 5,982,481 A | 11/1999 | Stone et al. | |
| 6,000,211 A | 12/1999 | Bellac et al. | |
| 6,041,274 A | 3/2000 | Onishi et al. | |
| 6,056,240 A | 5/2000 | Hagenlocher | |
| 6,065,267 A | 5/2000 | Fisher | |
| 6,111,638 A | 8/2000 | Chou et al. | |
| 6,123,067 A | 9/2000 | Warrick | |
| 6,131,565 A | 10/2000 | Mills | |
| 6,169,414 B1 | 1/2001 | Yoshino et al. | |
| 6,205,739 B1 | 3/2001 | Newlin | |
| 6,234,166 B1 | 5/2001 | Katsir et al. | |
| 6,237,337 B1 | 5/2001 | Bronicki et al. | |
| 6,250,693 B1 | 6/2001 | Gensert et al. | |
| 6,279,312 B1 | 8/2001 | Hennecke | |
| 6,292,752 B1 | 9/2001 | Franke et al. | |
| 6,317,229 B1 | 11/2001 | Otterson | |
| 6,321,539 B1 | 11/2001 | Bronicki et al. | |
| 6,349,521 B1 | 2/2002 | McKeon et al. | |
| 6,359,212 B1 | 3/2002 | Hall et al. | |
| 6,409,228 B1 | 6/2002 | Fadini et al. | |
| 6,433,867 B1 | 8/2002 | Esquivel | |
| 6,469,466 B1 | 10/2002 | Suzuki | |

| | | |
|---|---|---|
| 6,470,271 B2 | 10/2002 | Matsunaga |
| 6,484,506 B1 | 11/2002 | Bellac et al. |
| 6,625,983 B2 | 9/2003 | Kawasaki |
| 6,639,421 B1 | 10/2003 | Yoshino et al. |
| 6,662,801 B2 | 12/2003 | Hayden et al. |
| 6,680,693 B2 | 1/2004 | Urban et al. |
| 6,688,303 B2 | 2/2004 | Davenport et al. |
| 6,694,738 B2 | 2/2004 | Bronicki et al. |
| 6,740,381 B2 | 5/2004 | Day et al. |
| 6,772,062 B2 | 8/2004 | Lasky et al. |
| 6,772,671 B2 | 8/2004 | Asano et al. |
| 6,792,759 B2 | 9/2004 | Rollins, III |
| 6,827,911 B1 | 12/2004 | Gering |
| 6,837,010 B2 | 1/2005 | Powell et al. |
| 6,848,796 B2 | 2/2005 | Tagirov |
| 6,892,502 B1 | 5/2005 | Hubbell et al. |
| 6,989,924 B1 | 1/2006 | Jorgensen et al. |
| 7,055,519 B2 | 6/2006 | Litwin et al. |
| 7,065,927 B2 | 6/2006 | Powell et al. |
| 7,104,064 B2 | 9/2006 | Hon |
| 7,155,309 B2 | 12/2006 | Peless et al. |
| 7,163,241 B2 | 1/2007 | Liu et al. |
| 7,228,230 B2 | 6/2007 | Hirokawa |
| 7,281,381 B2 | 10/2007 | Johnson |
| 7,291,056 B2 | 11/2007 | Ohishi et al. |
| 7,349,759 B2 | 3/2008 | Peless et al. |
| 7,393,577 B2 | 7/2008 | Day et al. |
| 7,530,201 B2 | 5/2009 | Reynolds et al. |
| 7,578,109 B2 | 8/2009 | Reynolds et al. |
| 7,587,862 B2 | 9/2009 | Reynolds et al. |
| 7,612,937 B2 | 11/2009 | Jorgensen et al. |
| 7,883,288 B2 | 2/2011 | Jorna |
| 2003/0163966 A1 | 9/2003 | Reynolds et al. |
| 2004/0074180 A1 | 4/2004 | Barmakian et al. |
| 2004/0074202 A1 | 4/2004 | Barmakian et al. |
| 2004/0128940 A1 | 7/2004 | LaForge |
| 2004/0168383 A1 | 9/2004 | Reynolds et al. |
| 2004/0244376 A1 | 12/2004 | Litwin et al. |
| 2005/0034437 A1 | 2/2005 | McMurty et al. |
| 2005/0050836 A1 | 3/2005 | Barmakian |
| 2005/0252153 A1 | 11/2005 | Barmakian et al. |
| 2006/0048800 A1 | 3/2006 | Rast et al. |
| 2006/0053726 A1 | 3/2006 | Reynolds et al. |
| 2006/0174622 A1 | 8/2006 | Skowronski |
| 2006/0181765 A1 | 8/2006 | Jorgensen et al. |
| 2006/0225729 A1 | 10/2006 | Litwin |
| 2006/0229773 A1 | 10/2006 | Peretz |
| 2006/0260314 A1 | 11/2006 | Kincaid et al. |
| 2006/0277843 A1 | 12/2006 | Livingston et al. |
| 2007/0011983 A1 | 1/2007 | Reynolds et al. |
| 2008/0046130 A1 | 2/2008 | Faivre et al. |
| 2008/0050579 A1 | 2/2008 | Kirkman et al. |
| 2008/0072516 A1 | 3/2008 | Reynolds et al. |
| 2008/0127595 A1 | 6/2008 | Reynolds et al. |
| 2008/0127647 A1 | 6/2008 | Leitner |
| 2008/0168981 A1 | 7/2008 | Cummings et al. |
| 2008/0204352 A1 | 8/2008 | Reynolds et al. |
| 2008/0226846 A1 | 9/2008 | Hill |
| 2008/0247069 A1 | 10/2008 | Bronstein |
| 2008/0283113 A1 | 11/2008 | Conger |
| 2009/0000613 A1 | 1/2009 | Edwards et al. |
| 2009/0095283 A1 | 4/2009 | Curtis et al. |
| 2009/0101195 A1 | 4/2009 | Reynolds et al. |
| 2009/0188488 A1 | 7/2009 | Kraft et al. |
| 2009/0205637 A1 | 8/2009 | Moore et al. |
| 2009/0260753 A1 | 10/2009 | Selig et al. |
| 2010/0000570 A1 | 1/2010 | Mertins et al. |
| 2010/0005752 A1 | 1/2010 | Hawkins et al. |
| 2010/0032016 A1* | 2/2010 | Gee et al. ............ 136/259 |
| 2010/0043776 A1 | 2/2010 | Gee |
| 2010/0071683 A1 | 3/2010 | Selig et al. |
| 2010/0199972 A1 | 8/2010 | Brost |

FOREIGN PATENT DOCUMENTS

| | | |
|---|---|---|
| AU | 4995099 | 1/2001 |
| AU | 7300713 | 4/2008 |
| AU | 8311746 | 4/2009 |
| CA | 721243 | 11/1965 |
| CA | 2664192 | 4/2008 |
| CN | 1376228 | 10/2002 |
| CN | 1170993 | 10/2004 |
| CN | 101529027 | 9/2009 |
| DE | 43 17 279 | 12/1994 |
| DE | 203 14 172 | 12/2003 |
| DE | 69930635 | 12/2006 |
| DE | 602007003164 | 12/2009 |
| EP | 0 314 199 | 9/1991 |
| EP | 1 200 683 | 3/2006 |
| EP | 1 754 942 | 2/2007 |
| EP | 1 764 565 | 3/2007 |
| EP | 1 801 517 | 6/2007 |
| EP | 1 903 155 | 3/2008 |
| EP | 2 123 834 | 11/2009 |
| EP | 2 128 352 | 12/2009 |
| EP | 2 154 301 | 2/2010 |
| IL | 0197541 | 12/2009 |
| JP | 58150831 | 9/1983 |
| JP | 59012952 | 1/1984 |
| JP | 59072401 | 4/1984 |
| JP | 62011744 | 1/1987 |
| JP | 2262037 | 10/1990 |
| JP | 04333254 | 11/1992 |
| JP | 06003194 | 1/1994 |
| JP | 11182026 | 7/1999 |
| JP | 2001077384 | 3/2001 |
| JP | 2002063807 | 2/2002 |
| JP | 2003194419 | 7/2003 |
| JP | 2003229009 | 8/2003 |
| MX | 2009003087 | 5/2009 |
| WO | WO 80/02604 | 11/1980 |
| WO | WO 96/33787 | 10/1996 |
| WO | WO 00/07818 | 2/2000 |
| WO | WO 01/04430 | 1/2001 |
| WO | WO 02/082037 | 10/2002 |
| WO | WO 2004/099682 | 11/2004 |
| WO | WO 2005/003645 | 1/2005 |
| WO | WO 2005/003646 | 1/2005 |
| WO | WO 2005/003647 | 1/2005 |
| WO | WO 2005/078360 | 8/2005 |
| WO | WO 2005/108959 | 11/2005 |
| WO | WO 2008/039233 | 4/2008 |
| WO | WO 2008/058528 | 5/2008 |
| WO | WO 2009/052220 | 4/2009 |
| WO | WO 2009/052520 | 4/2009 |
| WO | WO 2009/105291 | 8/2009 |
| WO | WO 2010/006056 | 1/2010 |
| WO | WO 2010/006193 | 1/2010 |
| WO | WO 2010/022280 | 2/2010 |
| WO | WO 2010/083292 | 7/2010 |

OTHER PUBLICATIONS

Feuermann, D., et al. (2002) "Solar Fiber-Optic Mini-Dish Concentrators: First Experimental Results and Field Experience," Solar Energy 72(6):459-472.

HELAC Corporation (Apr. 2007) "Helical, Hydraulic Rotary Actuators, T20 Series," Product Manual.

HELAC Corporation, (2003) "Helical, Hydraulic Rotary Actuators, L20 Series," Product Manual.

HELAC Corporation (2004) "Helical, Hydraulic Rotary Actuators, L30 Series," Product Manual.

HELAC Corporation (Jun. 2001) "Sprayer Steers Clear of the Ordinary," *Hydraulics and Pneumatics* http://www.hydraulicspneumatics.com.

International Search Report and Written Opinion, Corresponding to International Application No. PCT/US09/30872, Mailed Feb. 20, 2009.

International Search Report and Written Opinion, Corresponding to International Application No. PCT/US2009/054531, Mailed Oct. 30, 2009.

International Search Report and Written Opinion, Corresponding to International Application No. PCT/US09/49945, Mailed Sep. 2, 2009.

International Search Report and Written Opinion, Corresponding to International Application No. PCT/US2009/050144, Mailed Aug. 27, 2009.

International Search Report and Written Opinion, Corresponding to International Application No. PCT/US2010/021020, Mailed Jun. 1, 2010.

Kaminski, J. et al. (2006) "Full-Field Shape Measurement of Specular Surfaces," in Fringe, 2005, The 5$^{th}$ International Workshop on Automatic Processing of Fringe Patterns, pp. 372-379.

Mulholland, G.W. and Germer, T.A. (2003), "Modeling, Measurement and Standards for Wafer Inspection," Proc. Government Microcircuits Applications and Critical Technologies Conference, "Countering Asymmetric Threats," Tampa, FL, published on ScatterWorks, In. website.

NOVATEC BioSol AG Presentation Nov. 7, 2007. http://www.menarec.org/resources/NOVATEC-BioSol_20071107.pdf.

NOVATEC BioSol AG Presentation Nov. 26, 2007. Hotel Intercontinental Germany-Frankfurt. http://www.rural-electrification.com/cms/upload/pdf/Presentations_Jordanian_Delegation_Visit/07_NOVATEC-BioSol_20071126.pdf.

Ulmer, S et al. (2006), "Slope Measurements of Parabolic Dish Concentrators Using Color-coded Targets," Presented at the SOLARPACES International Symposium, 13, Seville, ESP Jun. 23, 2006, Published *J. Solar Energy Eng.* 130:011015 (Feb. 2008).

(Mar. 20, 2008) "Precision Actuator Puts New Spin on Solar Power," *Machine Design* 24: http://machinedesign.com/article/precision-actuator-puts-new-spin-on-solar-power-0320.

(Dec. 19, 2007) "Aquaflector. Index" http://aquaflector.com/index.html.

(Dec. 19, 2007) "Aquaflector. Rationale" http://www.aquaflector.com/rationale.html.

(Dec. 19, 2007) "Aquaflector. Technology" http://www.aquaflector.com/technology.html.

"Truss Connection," You Tube, Jul. 4, 2007 http://www.youtube.com/watch?v=FtoQJONKRm0 , Downloaded Jun. 7, 2010.

First Office Action issued Jul. 9, 2012, from the State Intellectual Property Office of China for Chinese Patent Application No. 200980126876.8.

U.S. Appl. No. 61/079,382, filed Jul. 9, 2008, Farr et al.

U.S. Appl. No. 61/029,466, filed Feb. 18, 2009, Gee et al.

Automation Direct (downloaded Aug. 23, 2010) "GS2 Series Specifications" Drives/Motors/Motion vol. 13, e13-22 http://www.automationdirect.com/adc/Shopping/Catalog/Drives/GS2_(115_-z-_230_-z-_460_-z-_575_VAC_V-z-Hz_Control)/GS2_Drive_Units_(115_-z-_230_-z-_460_-z-_575_VAC)/GS2-11P0.

Dersch et al. (2004) "Trough Integration into Power Plants—A Study on the Performance and Economy of Integrated Solar Combined Cycle Systems," Energy 29:947-959.

Eckart [Hydraulik • Pneumatik] (downloaded Aug. 23, 2010) "Produkte mit starkem Profil" http://www.eckart-gmbh.de/.

El-Sayed, M. (2005) "Solar Supported Stearn Production for Power Generation in Egypt," Energy Policy 33:1251-1259.

El-Wakil, M.M. (1984) "Combined Cycles: General," In; Powerplant Technology, New York: McGraw-Hill Hardcover, pp. 341-351.

Flagsol (2006) "ISCCS—Integrated Solar Combined Cycle System," http://www.flagsol.com/ISCCS_tech.htm, Downloaded Sep. 9, 2006.

Horn et al. (2004) "Economic Analysis of Integrated Solar Combined Cycle Power Plants; A Sample Case: The Economic Feasibility of an ISCCS Power Plant in Egypt," Energy 29:935-945.

Hosseini et al. (2005) "Technical and Economic Assessment of the Integrated Solar Combined Cycle Power Plants in Iran," Renewable Energy 30:1541-1555.

Kelly et al. (2001) "Optimization Studies for Integrated Solar Combined Cycle Systems," Proceedings of Solar Forum 2001, Solar Energy: The Power to Choose, Apr. 21-25, Washington, DC.

Lietner et al. (2002) "Brighter than a Hundred Suns," U.S. Department of Energy/NREL publication, p. 10 of 144-06P spec.

"National Renewable Energy Laboratory, USA Rough: Near-Term Component/Subsystem Development, Task I-B-1: Space Frame Design, Draft Detailed Report" (Aug. 25, 2005), prepared by Gossamer Space Frames.

Product Literature for Portable Specular Reflectometer Model 15R, Devices and Services Company, http://devicesandservices.com/prod02.htm, last modified May 25, 2007.

(Dec. 19, 2007) "Aquaflector." http://www.aquaflector.com/contact.html.

International Search Report corresponding to International Application No. PCT/US06/62046, Mailed Jul. 17, 2008.

* cited by examiner

1817

1817

1817

2013A

2013B

SOLAR COLLECTORS HAVING SLIDABLY REMOVABLE REFLECTIVE PANELS FOR USE IN SOLAR THERMAL APPLICATIONS

CROSS REFERENCE TO RELATED APPLICATIONS

This application claims priority under 35 U.S.C. 119(e) to U.S. Provisional Patent Application No. 61/079,394 filed on Jul. 9, 2008, which is hereby incorporated by reference in its entirety.

BACKGROUND OF THE INVENTION

This invention is in the field of solar thermal power production. This invention relates generally to a solar trough and components thereof for collection, concentration, and conversion of solar energy to heat or electricity.

Solar power generation currently represents a small part of the total global electricity supply; however, there is an enormous potential for power generation worldwide using solar concentration techniques. Solar thermal power generation has advantages over solar power generation using photovoltaics including eliminating the need for large quantities of crystalline silicon for production of photovoltaic cells.

One technique for solar power generation utilizes arrays of reflective troughs for concentration of incident solar radiation, by reflection, onto receivers capable of efficiently converting the solar radiation to heat for subsequent utilization, for example power generation. Linear troughs having parabolic cross-sections are amongst the preferred shapes for solar troughs and various trough designs exist.

For example, U.S. Pat. No. 4,596,238 discloses a solar trough having a generally rectangular flexible sheet with a reflective surface. The sheet is formed into a concentrating shape by a pair of identical form members which are positioned at parallel edges of the flexible sheet and include a tensioning means positioned between the form members.

U.S. Pat. No. 4,611,575 also discloses a solar trough which utilizes parabolic ribs and cross members to form a rigid structure and reflective sheets formed of steel and having adhesively bonded reflective film thereon. The reflective sheets are formed into parabolic shapes by attachment to joining members attached to the parabolic ribs.

U.S. Pat. No. 5,964,216 discloses a trough-type parabolic concentrator which utilizes a reflector plate bent into a trough shape and a support structure made of a plurality of wooden frames. The wooden frames are joined together using screws to make a single parabolic segment and guide rails are attached to two adjacent parabolic segments to force the reflector plates to take a parabolic shape. The reflector plates are secured against slipping by wooden or metal stops placed at the outer ends of a segment.

U.S. Pat. No. 4,372,027 discloses a monocoque parabolic trough-type solar concentrator having reflective sheets attached to parabolic bows. Also disclosed is a roll-forming method for attaching a reflective laminate to the surface of the sheets of the monocoque trough.

One disadvantage of the solar troughs described above is that the reflective sheets are generally permanently attached to the supporting and/or shaping structure. In order to repair or replace the reflective sheets, the trough structures must undergo a significant amount of disassembly, increasing repair and assembly time and costs.

SUMMARY OF THE INVENTION

Provided herein are solar concentrators having reflective sheets which are slidably insertable and/or removable for quick installation, construction, removal, repair, and/or replacement. Also provided are solar concentrators having reflective sheets under tension. Further provided herein are methods for constructing solar collectors. In another aspect, provided herein are guide rails for guiding and/or retaining slidably removable reflective sheets.

In a first aspect, provided herein is a guide rail for directing and retaining a slidably removable reflective sheet. A guide rail of this aspect comprises a rail body having a longitudinal axis and one or more longitudinal channels sized and shaped for guiding and retaining a longitudinal edge of one or more slidably removable reflective sheets. In a specific embodiment, a guide rail comprises a rail body having a longitudinal axis and one or more longitudinal channels sized and shaped for guiding and retaining a longitudinal hook edge or a longitudinal hemmed edge of one or more slidably removable reflective sheets. In an embodiment, a guide rail comprises a rail body having a longitudinal axis and one or more longitudinal channels having retaining shapes. In a specific embodiment, the longitudinal channels for guiding and retaining the longitudinal edge of one or more slidably removable reflective sheets comprise an outer channel portion and an inner channel portion wider than the outer channel portion.

Longitudinal channels having a retaining shape or such inner and outer portions are useful, for example, for guiding and retaining hook or hemmed longitudinal edges of one or more slidably removable reflective sheets. In specific embodiments, the inner portion of such a channel has a depth selected from about 0.080" to about 0.250", or more preferably a depth selected from about 0.090" to about 0.175", or even more preferably a depth selected from about 0.100" to about 0.125". In specific embodiments, the inner portion of such a channel has a width selected from about 0.270" to about 1.000", or more preferably a width selected from about 0.500" to about 0.800", or even more preferably a width selected from about 0.650" to about 0.700". In specific embodiments, the outer portion of such a channel has a depth selected from about 0.050" to about 0.125", more preferably a depth selected from about 0.068" to about 0.110", or even more preferably a depth selected from about 0.085" to about 0.100". In specific embodiments, the outer portion of such a channel has a width selected from about 0.040" to about 0.250", more preferably a width selected from about 0.100" to about 0.225", or even more preferably a width selected from about 0.150" to about 0.215".

In an embodiment, a guide rail comprises a rail body having upper and lower surfaces and further comprises a pair of longitudinal tabs positioned on the upper surface for retaining a slidably removable reflective strip. In another embodiment, a guide rail comprises a longitudinal channel sized and shaped for attachment to a supporting rib. In a specific embodiment, the supporting rib has a parabolic or substantially parabolic longitudinal shape and forces the guide rail to adopt a parabolic or substantially parabolic longitudinal shape. In specific embodiments, a supporting rib has a thickness selected from 0.040" to 0.400", or more preferably a thickness selected from 0.060" to 0.350", or even more preferably a thickness selected from 0.120" to 0.300". In a specific embodiment, a guide rail of this aspect has a longitudinal channel sized and shaped for attachment to a supporting rib positioned on the lower surface of a guide rail having lower and upper surfaces.

In an embodiment, the guide rails comprise a single piece of material formed by extrusion, for example steel, aluminum or plastic. In another embodiment, a guide rail has a rail body comprising one or more pieces, for example a top piece and a bottom piece. Guide rails formed of multiple pieces are useful, for example, when it is not possible to form by extrusion a guide rail having a desired cross-sectional shape in a single piece. In a specific embodiment, the top piece and the bottom piece respectively define top and bottom surfaces of the one or more longitudinal channels for guiding and/or retaining the longitudinal edge of one or more slidably removable reflective sheets.

In an embodiment, a guide rail comprises a main body and interlocking pieces. The main body comprises a longitudinal channel and the interlocking pieces serve to retain one or more slidably removable reflective sheets in the channel. In an exemplary embodiment, a mechanical mechanism is optionally used to insert the interlocking pieces. An advantage to this embodiment is that no edge preparation is needed on the slidably removable reflective sheet.

In an embodiment, a guide rail comprises one or more retaining means for securing a slidably removable reflective sheet. Useful retaining means comprise, for example, a retaining pin and mating hole for insertion thereof or a rail member positioned transversely to the guide rail. In a specific embodiment, a transverse rail member is attached to the transverse edges of a slidably removable reflective sheet, for example by a clamping mechanism. Transverse rail members may also be used for securing the slidably removable reflective sheet into place by attachment of the transverse rail at one or more points to a guide rail and/or supporting rib.

In another aspect, the guide rails can be used for forming an assembly comprising a guide rail and a slidably removable reflective sheet having a longitudinal edge retained in a longitudinal channel of the guide rail. In a specific embodiment, the slidably removable reflective sheet comprises a sheet of material, for example a metal, and preferably aluminum or steel. Slidably removable reflective sheets useful with various embodiments of the present invention have one or more reflective surfaces, for example surfaces capable of reflecting a substantial portion of the incident light. In an embodiment a useful reflective surface is capable of withstanding long-term exposure to the elements. In an embodiment, a slidably removable reflective sheet comprises a reflective film, for example ReflecTech™ silvered film, or a polished or anodized metal surface. In specific embodiments, a slidably removable reflective sheet has a thickness selected from about 0.020" to about 0.080", or more preferably a thickness selected from about 0.025" to about 0.065", or even more preferably a thickness selected from about 0.030" to about 0.055". In a specific embodiment, a slidably removable reflective sheet comprises a reflective film adhesively attached to a sheet of material.

In an embodiment, a reflective assembly comprises a guide rail and a first slidably removable reflective sheet having two longitudinal edges positioned in one or more longitudinal channels of the guide rail and generally positioned over the upper surface of the guide rail. In a specific embodiment, the first slidably removable reflective sheet further allows the channels of the guide rail to comprise a retaining shape. In a specific embodiment, a reflective assembly further comprises one or more additional slidably removable reflective sheets positioned in the channel or channels of the guide rail, wherein the one or more additional slidably removable reflective sheets are retained by the first slidably removable reflective sheet. In an alternative embodiment, the first slidably removable reflective sheet is replaced by one or more clips, positioned over the upper surface of the guide rail to allow the channels of the guide rail, combined with the one or more clips, to comprise a retaining shape.

In another aspect, the present invention provides a reflective assembly for a solar collector comprising a pair of supporting ribs, a pair of guide rails, one mounted on each supporting rib, for directing longitudinal edges of one or more slidably removable reflective sheets and one or more slidably removable reflective sheets having longitudinal edges mounted within longitudinal channels of the pair of guide rails. A specific reflective assembly embodiment further comprises one or more additional supporting ribs, guide rails, and slidably removable reflective sheets. Such a reflective assembly is useful, for example, as it can have a longer transverse length.

In an embodiment, the guide rails of the reflective assembly are shaped so as to define an optical surface of the one or more slidably removable reflective sheets, for example an optical surface that reflects a substantial portion of incident light to a solar receiver. In an embodiment, a useful guide rail shape is a linear shape, so as to define a planar optical surface. In another embodiment, a useful guide rail shape is a substantially parabolic shape, so as to define a trough shaped optical surface. In a specific embodiment, the supporting ribs span an entire length of the guide rails. In an embodiment, the supporting ribs comprise multiple pieces that together span the length of the guide rails. In an embodiment, a longitudinal edge of one or more of the reflective sheets is a hemmed longitudinal edge. In another embodiment, a longitudinal edge of one or more of the reflective sheets is a longitudinal hook edge.

In some embodiments, the longitudinal hook and/or hemmed edges of a slidably removable reflective sheet are fabricated by a roll forming process. U.S. Provisional Patent Application 61/144,703 filed on Jan. 14, 2009, herein incorporated by reference in its entirety, describes methods for manufacturing hook and hemmed longitudinal edges through roll forming.

In an aspect, at least one of the one or more slidably removable reflective sheets of the reflective assembly is under tension, for example by application of a tensile force by the guide rails. In a specific embodiment of this aspect, the reflective assembly of this aspect further comprises one or more springs attached to at least one of the pair of supporting ribs for placing the one or more slidably removable reflective sheets under tension. In specific embodiment, the reflective assembly further comprises one or more compliant features, for example for application of a tensile force to the one or more slidably removable reflective sheets. In a related embodiment, the one or more slidably removable reflective sheets comprise one or more compliant features. In another embodiment, the distance between the pair of supporting ribs is not fixed and is adjustable. This is useful, for example, as the one or more slidably removable reflective sheets may be placed under tension by increasing the distance between the pair of supporting ribs supporting each slidably removable reflective sheet.

In an embodiment, a reflective assembly further comprises a transverse rail member mounted between the pair of supporting ribs for attaching to, supporting, or retaining one or more transverse edges of one or more of the slidably removable reflective sheets, for example by a clamping mechanism. In a specific embodiment, the transverse rail member has one or more transverse channels for retaining one or more transverse edges of one or more of the slidably removable reflective sheets. Transverse rail members include embodiments comprising a single rail member and embodiments comprising two adjoining rail members, for example fastened together by interlocking features, nuts and bolts, screws, clamps, clips or other attachment means known in the art.

In an embodiment, the transverse rail member is positioned to attach to, support, or retain one or more transverse edges of one or more slidably removable reflective sheets at a rim of the reflective assembly. In another embodiment, the transverse rail member is positioned to attach to, support, or retain one or more transverse edges of one or more slidably removable reflective sheets at a longitudinally interior position of the reflective assembly. In another embodiment, the transverse rail member extends beyond the pair of supporting ribs and/or guide rails for attaching to, supporting, or retaining one or more transverse edges of one or more slidably removable reflective sheets of an adjacent reflective assembly.

In an embodiment, the transverse rail member comprises a first portion positioned on a first surface of the one or more slidably removable reflective sheets and one or more second portions each positioned between a pair of supporting ribs on a second surface, opposite the first surface, of the one or more slidably removable reflective sheets. In a specific embodiment, the transverse rail member first portion extends across and/or attaches to one or more guide rails by one or more attachment means. Useful attachment means include bolts, screws, clamps, or other attachment methods known in the art. In a specific example, T-bolts or other bolts are inserted into longitudinal channels of one or more guide rails for attaching the transverse rail first and/or second portion to one or more guide rails. In alternate embodiments, other attachment means are used in place of the T-bolts. Attaching the transverse rail member to the guide rails may result in fewer distortions to the optical surface of the slidably removable reflective sheets compared to other transverse rail member embodiments.

For some embodiments, the transverse rail first and second portions retain the one or more transverse edges of the one or more slidably removable reflective sheets by a clamping mechanism. For example, the transverse rail members may further comprise one or more clips for clamping the transverse rail first and second portions onto the one or more transverse edges of the one or more slidably removable reflective sheets. In a specific embodiment, the transverse rail member includes grooves for attaching the clips. In another embodiment, screw fasteners or bolts and nuts may be used to clamp the transverse rail first and second portions onto the one or more transverse edges of the one or more slidably removable reflective sheets.

The transverse rail member may also comprise one or more self-locating features for properly aligning the transverse rail member to the guide rails, supporting ribs, slidably removable reflective sheets, or other portions of the reflective assembly. In a specific embodiment, self-locating features are useful for aligning first and second portions of a transverse rail member to one another.

In another aspect, provided herein is a reflective trough comprising a supporting structure, a plurality of supporting ribs mounted on the supporting structure, a plurality of guide rails, at least one guide rail mounted on each supporting rib, and a plurality of slidably removable reflective sheets having longitudinal edges mounted within channels of the guide rails. In a preferred embodiment of this aspect, the reflective trough is a parabolic trough.

In an embodiment, the supporting structure, plurality of supporting ribs, and plurality of guide rails are shaped so as to give the slidably removable reflective sheets an optical surface having a trough shape. In an embodiment, the optical surface reflects a substantial portion of the incident light to a solar receiver. In a specific embodiment, the supporting structure comprises a space frame. In a specific embodiment, the supporting ribs are mounted on the supporting structure at regular intervals. In another embodiment, the supporting ribs are mounted on the supporting structure at a variety of intervals.

In an embodiment, the supporting ribs and/or guide rails define optical surfaces of the plurality of slidably removable reflective sheets, for example optical surfaces that each reflect a substantial portion of the incident light to a solar receiver. In an embodiment of this aspect, a reflective trough further comprises a solar receiver mounted at a point of substantially optimal energy capture for absorbing a substantial portion of the incident light. In a specific embodiment, a solar receiver is mounted along a transverse focal line of the reflective trough or a line of substantially optimal energy capture.

In an embodiment, a transverse rail member is useful with reflective assemblies and troughs, for example for attaching to, supporting, or retaining a transverse edge of a slidably removable reflective sheet. In an embodiment, a transverse rail member is useful for increasing the rigidity of the slidably removable reflective sheets along the transverse direction, for example to aid in defining the optical surface of the slidably removable reflective sheets and/or to aid in the assembly of a reflective assembly or a reflective trough.

In an embodiment, the transverse rail members comprise one or more transverse channels. In an embodiment, a transverse rail member attaches to, supports or retains a transverse edge of a single slidably removable reflective sheet. In another embodiment, a transverse rail member extends across at least three supporting ribs for attaching to, supporting, or retaining transverse edges of at least two slidably removable reflective sheets. Transverse rail members may be positioned at rim of the reflective trough or at an interior position of the reflective trough.

As with the reflective assemblies described above, some reflective trough embodiments may further comprise one or more compliant features. In an embodiment, the one or more compliant features apply tension to at least one of the plurality of slidably removable reflective sheets along a transverse direction. In an embodiment, the supporting structure provides the compliant features. In another embodiment, the compliant features are provided by at least one of the slidably removable reflective sheets. The reflective troughs may also comprise one or more compression and/or extension springs for applying tension to at least one of the plurality of slidably removable reflective sheets along a transverse direction. In addition to one or more springs, the reflective troughs of this aspect may further comprise one or more bolts or threaded rods passing through the center of at least one of the one or more springs.

A reflective trough embodiment may also further comprise means for translating at least one of the plurality of supporting ribs in a transverse direction. For example, the reflective trough may comprise one or more rib translation rails. By increasing the distance between the supporting ribs which support each slidably removable reflective sheet, tension may be applied to one or more of the slidably removable reflective sheets.

In another aspect, the present invention provides a method for constructing a reflective solar assembly. A method of this aspect comprises the steps of attaching one or more guide rails to one or more supporting ribs, and sliding opposite longitudinal edges of one or more slidably removable reflective sheets into longitudinal channels of the guide rails attached to transversely adjacent ribs. In a specific method of this aspect, transverse rail members are attached to transverse edges of the slidably removable reflective sheets before sliding the longitudinal edges of the slidably removable reflective sheets into the longitudinal channels of the guide rails.

According to some embodiments, first attaching transverse rail members to the reflective sheets eases installation into the longitudinal channels and prevents the reflective sheets from sagging or bowing. In another embodiment, the reflective sheets are installed before the transverse rail members are attached, using temporary transverse supports which are then removed before the final transverse rail members are installed.

In order to place at least one of the slidably removable reflective sheets under tension along a transverse direction, a method of this aspect further comprises the step of increasing the transverse spacing between adjacent ribs. In a specific method of this aspect, the supporting ribs are first attached to a support structure. In a method of this aspect, increasing the transverse spacing between transversely adjacent ribs aids in seating at least one of the one or more slidably removable reflective sheets more firmly on the guide rails.

In order to place at least one of the slidably removable reflective sheets under tension along a transverse direction, in an embodiment, the support structure comprises one or more compliant features. In an embodiment, the support structure comprises one or more springs and/or flexure sections for the application of tension to at least one slidably removable reflective sheet. In an embodiment, the support structure comprises means for translation of at least one of the plurality of supporting ribs in a transverse direction, for example one or more rib translation rails.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful. It will be evident to one having skill in the art that the accompanying drawings may not be to scale to better illustrate certain aspects of the invention.

DETAILED DESCRIPTION OF THE INVENTION

Figure 1A:
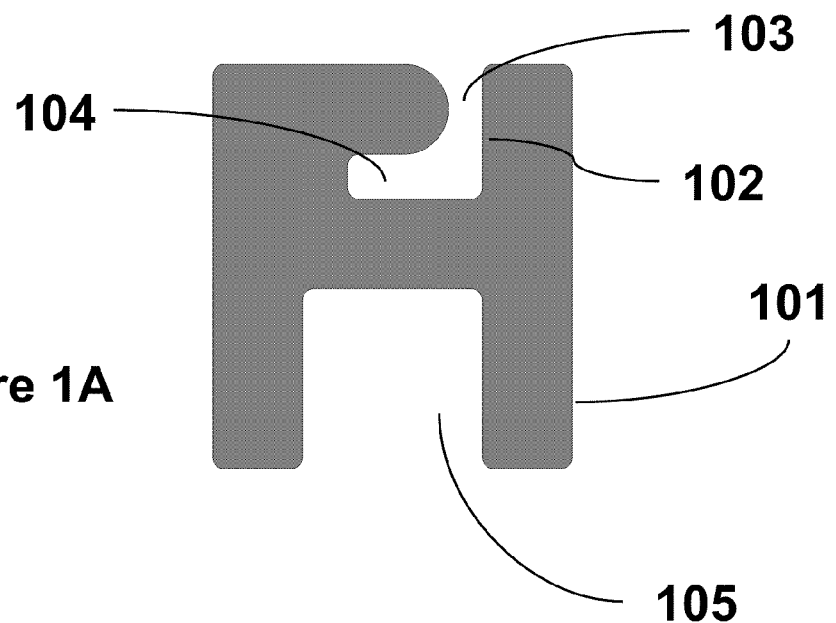
FIG. 1A illustrates the cross-section of a first exemplary guide rail as viewed along the longitudinal direction.

In general the terms and phrases used herein have their art-recognized meaning, which can be found by reference to standard texts, journal references and contexts known to those skilled in the art. The following definitions are provided to clarify their specific use in the context of the invention.

"Guide rail", "rail body", and "guide rail body" interchangeably refer to a rail structure having a channel (also referred herein as a track, groove, or slot) running along the rail structure used for guiding, directing, retaining, attaching, capturing, and/or shaping a sheet or panel. In some embodiments a guide rail is a separate member attached to another structure, such as a rib or other supporting structure. In other embodiments, a guide rail can refer to an object having a channel contained within the object, for example a channel cut into or formed in a supporting rib or support structure.

"Longitudinal," "longitudinal direction," or "longitudinal axis" refers to a direction or axis parallel to the long axis of a guide rail, for example a guide rail of a reflective assembly or reflective trough. The longitudinal axis can include embodiments where the axis is linear or non-linear, such as parabolic or semi-circular. For example, the longitudinal axis of a parabolic or otherwise curved guide rail is understood to run along the guide rail in a continuously tangential manner. The longitudinal axis of a sheet or panel is understood to be the axis of the sheet or panel parallel to the longitudinal axis of any guide rail or supporting rib which is attached to, supporting, retaining, guiding, or directing the sheet or panel.

"Transverse," "transverse direction," or "transverse axis" refers to a direction or axis perpendicular to the longitudinal axis of a guide rail. In some embodiments a transverse axis is an axis which runs along the rim of a reflective trough, or an axis which runs along the length of a solar receiver of a parabolic trough.

"Channel" refers to a recessed region of an object or body. A channel may have one or more depths, one or more widths, and/or one or more lengths. A channel also refers to features referred to as a track, a groove, and/or a slot. In an embodiment, a longitudinal channel refers to a recessed region of an object having a longitudinal dimension. In an embodiment, a channel is formed in an object by removing material from the body of the object. In another embodiment, a channel is formed in an object during the construction or formation of the object, for example by molding or extrusion. In another embodiment, a channel is formed in an object after construction or formation of the object, for example by stamping or machining.

"Slidably insertable" or "slidably removable" refers to the ability of an object which is not permanently fixed to another structure to be easily installed or removed from a retained, supported, or attached position on the structure by means of a relative translation of the object and the structure in a sliding motion.

"Reflective sheet" refers to a sheet, panel, or film having a highly reflective surface for reflection of incident light. In an embodiment, a reflective sheet comprises a thin sheet of material, for example a metal sheet, preferably aluminum or steel, with a reflective film thereon having a reflectivity acceptable for use in solar collectors (e.g., ReflecTech™ silvered film). In an embodiment, a reflective sheet comprises a metal sheet having a polished or anodized surface. In an embodiment, a reflective sheet comprises a reflective film.

"Supporting rib" refers to a stiff longitudinal member that supports another object along the longitudinal direction and is capable of transferring the weight of the object to the ground or another supporting structure. In some embodiments a supporting rib has a precisely shaped dimension, for example a linear or parabolic surface, which can be used to define or force the shape of another object attached to or supported by the supporting rib. In an embodiment, a plurality of supporting ribs are used for supporting the weight of a sheet of material positioned across the plurality of supporting ribs. Supporting ribs may also apply tensile forces to structures supported by multiple supporting ribs. Supporting ribs are also useful for transferring environmental forces to the ground or a supporting structure, for example, forces due to wind or snow loads on a sheet of material supported by the supporting rib.

"Supporting structure" or "support structure" refers to a rigid device used for supporting another object, transferring the weight of the object to the ground, and/or holding or controlling the position of the object. In an embodiment, a supporting structure is comprised of a plurality of rigid members. In an embodiment, a supporting structure is used to generally define the shape of an object which is supported by the supporting structure.

"Retaining shape" refers to the shape of a longitudinal channel of a guide rail useful for retaining a longitudinal edge of a slidably removable reflective sheet such that the slidably removable reflective sheet can not be removed or escape from the longitudinal channel by a translation or sequence of translations other than translation substantially along the longitudinal direction. In a specific embodiment, a retaining shape includes a shape pair or matching shapes of a longitudinal channel of a guide rail and a longitudinal edge of a reflective sheet. In an embodiment, a retaining shape includes an enclosing shape, i.e., a retaining shape for surrounding a longitudinal edge of a reflective sheet. In some embodiments, the longitudinal edge of a slidably removable reflective sheet may be removed or escape from a longitudinal channel having a useful retaining shape by a rotation of the reflective sheet or by translation along the longitudinal direction. In certain embodiments, a longitudinal channel having a retaining shape additionally maintains a slidably removable reflective sheet in a shape prescribed by the shape of the guide rail.

"Retain" or "capture" refers to the ability of one object to hold another object in place, for example, to prevent relative movement of the objects in at least one direction. In an embodiment, an object is retained by another object by mechanical friction. In an embodiment, an object is retained by another object by a physical restraint, for example a retaining pin. In an embodiment, an object is retained by another object by a clamping mechanism "Hemmed edge" refers to the end of an object which is rolled or folded onto itself. A hemmed edge can also refer to the end of an object which is rolled or folded over another object to create a wide or enlarged and relatively stiff edge. In an embodiment, the edge of a reflective sheet is rolled onto itself to form a hemmed edge; such a hemmed edge can be used to retain the reflective sheet in a channel of a guide rail. In a specific embodiment, a hemmed edge comprises a single hem, for example the edge of an object rolled or folded onto itself once. In another specific embodiment, a hemmed edge comprises a double hem, for example the edge of an object rolled or folded onto itself twice. In a specific embodiment, a hemmed edge is manufactured through roll forming.

"Hook edge" refers to the end of an object which is curved to form a hook-like shape. In an embodiment, the cross-section of an object with a hook edge resembles the general shape of a hook. In an embodiment, the edge of a reflective sheet is curled, bent or folded over itself to form a continuous hook edge. In an embodiment, a hook edge of a reflective sheet can be captured or retained in a channel of a guide rail. In a specific embodiment, a hook edge is manufactured through roll forming.

"Longitudinal tabs" refers to longitudinal structures which extend off of the main body of a longitudinal object. In an embodiment, a longitudinal tab is used for capturing the longitudinal edge of a sheet or strip.

"Not fixedly attached" refers to the arrangement of a plurality of objects such that the objects are not permanently or temporarily attached to one another in any mechanical way other than friction. In an embodiment, objects which are not fixedly attached to one another can be retained or captured. In an embodiment, objects which are not fixedly attached can be retained by mechanical friction.

"Mechanically attached" refers to the arrangement of a plurality of objects such that the objects are attached to one another at one or more attachment points by any mechanical attachment means, for example screws, bolts or retaining pins, and can be separated by removing the mechanical attachment means. In a specific embodiment, a plurality of objects are attached to one another by clamping.

"Optical surface" refers to a precisely machined, arranged, formed, patterned, and/or shaped surface for focusing, reflecting, or absorbing incident light.

"Substantial portion" refers to a percentage greater than or equal to 50%.

"Solar receiver" refers to a component capable of absorbing incident solar radiation. In an embodiment, a solar receiver is positioned at a specific location for absorbing a substantial portion of solar radiation which is reflected from one or more reflective sheets.

"Point of substantially optimal energy capture" and refers to positions of a solar receiver wherein the solar receiver is mounted such that a substantial portion of the light incident on a reflecting surface is reflected onto the solar receiver. In a specific embodiment, the point of substantially optimal energy capture is the position of the solar receiver wherein the solar receiver receives and/or absorbs the maximum or near the maximum amount of reflected light. In a specific embodiment, a solar receiver mounted at a point of substantially optimal energy capture absorbs a substantial portion of the light incident on the surface of the solar receiver.

In a reflective trough, a "line of substantially optimal energy capture" is a successive series of points of substantially optimal energy capture corresponding to a series of points along the reflective trough.

"Reflective assembly" refers to an assembly comprising one or more reflective sheets, one or more guide rails, and one or more supporting ribs. In some embodiments, the one or more guide rails and one or more supporting ribs comprise a unitary structure. Depending on the specific application, a reflective assembly can have a parabolic, planar, or other shape known to the art. In an embodiment, multiple reflective assemblies are constructed and/or positioned adjacent to and/or adjoining one another to form a long reflective structure.

"Rib translation rail" refers to a structure which allows for the translation of a supporting rib. In an embodiment, a rib translation rail allows for motion of a supporting rib in a transverse direction and allows for adjusting the distance between adjacent ribs, and/or for application of tension to a sheet of material supported across multiple supporting ribs.

"Reflective strip" refers to a narrow (i.e., longer than it is wide) sheet, panel, or film having a reflective surface for reflection of incident light. In an embodiment, a reflective strip comprises a sheet of material, for example a metal, preferably aluminum or steel, with a reflective film thereon having a reflectivity acceptable for use in solar collectors (e.g., ReflecTech™ silvered film). In an embodiment, a reflective strip comprises a metal sheet having a polished or anodized surface. In an embodiment, a reflective strip comprises a reflective film.

"Compliant feature" refers to a portion of a structure which has a stiffness smaller than that of the surrounding structure, resulting in a feature which can withstand an applied force with a motion of the feature, for example a bending motion.

"Flexure section" refers to a portion of a structure capable of undergoing a bending or flexing motion in a reversible manner. A flexure section can also refer to a portion of a structure having a stiffness smaller than that of other portions of the structure. In an embodiment, a flexure section can be incorporated into a structure to give the structure a means for applying, resisting, or withstanding a force or tension applied to the structure.

"Inner portion" refers to the part of an object which generally faces towards or is located closest to the center of an object. The term "inner portion" may also refer to the internal part of an object. In an embodiment, the inner portion of a channel is the deepest or most interior portion of the channel.

"Depth" refers to a distance dimension of an object or a region within a body, for example a channel of a guide rail, relating to the distance of the object or region from the surface of the body.

"Outer portion" refers to the part of an object which generally faces away from or is located furthest from the center of an object. The term "outer portion" may also refer to the external part of an object. In an embodiment, the outer portion of a channel is the shallowest or external portion of the channel or the portion of a channel which connects with the surface of a body. In an embodiment, the outer portion and inner portions of a channel are further distinguished from one another based on a change in dimension (e.g., width) of the channel. In an embodiment, the inner portion of a channel has a wider width than the outer portion of the channel.

"Width" refers to a distance dimension of an object or region, for example the transverse dimension of a channel of a guide rail.

"Rim" as used with respect to a reflective trough or reflective assembly refers to the transverse edge of the reflective trough or reflective assembly.

"Self-locating" refers to the ability of an object to align itself to another object. In some embodiments, features of two objects allow the objects to be self-locating to one another.

In an aspect, the present invention provides solar collectors useful for concentrating solar energy as an energy producing device. In an aspect, the solar collectors described herein comprise one or more guide rails for guiding, retaining, and/or shaping a slidably removable reflective sheet. A guide rail embodiment of the present invention comprises a longitudinal rail body having one or more longitudinal channels for guiding and/or retaining a longitudinal edge of one or more slidably removable reflective sheets.

Figure 1B:
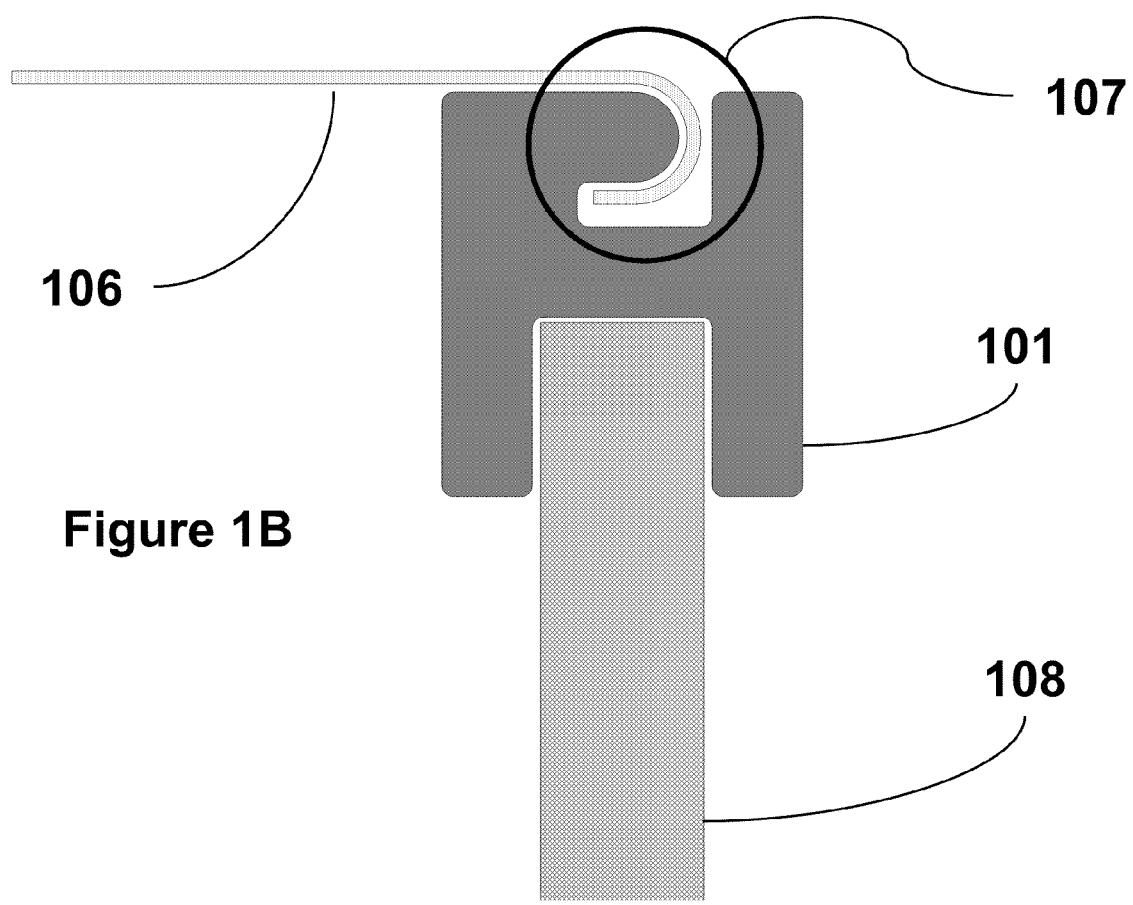
FIG. 1B illustrates the cross-section of the first exemplary guide rail with a slidably removable reflective sheet having a hook edge retained in a longitudinal channel and a supporting rib mounted in a second longitudinal channel.

In one embodiment, a guide rail of the present invention comprises a rail body having a longitudinal axis and a first longitudinal channel sized and shaped for guiding and retaining a longitudinal hook edge or a longitudinal hemmed edge of one or more slidably removable reflective sheets. In a specific embodiment, the first longitudinal channel comprises an outer portion and an inner portion wider than the outer portion. FIG. 1A illustrates the cross-section of a first exemplary guide rail as viewed along the longitudinal direction. Rail body 101 has a first longitudinal channel 102 with an outer channel portion 103 and an inner channel portion 104 wider than the outer channel portion 103 and a second longitudinal channel 105 for mounting the guide rail onto a supporting rib. One edge of outer channel portion 103 is rounded to better fit the hook edge of a slidably removable reflective sheet. FIG. 1B illustrates the guide rail with a slidably removable reflective sheet 106 extending transversely from rail body 101 and having a hook edge 107 retained in first longitudinal channel 102 and with a supporting rib 108 mounted in second longitudinal channel 105. The guide rails of FIGS. 1A and 1B are useful as the guide rails of a reflective solar assembly and in a specific embodiment are useful as the end (first and/or last) guide rails of a reflective trough. In some embodiments, one side of a guide rail is thicker or has additional material than that of the other side to better handle the forces applied by the slidably removable reflective sheets, for example the weight of the slidably removable reflective sheets, tensile forces applied by the slidably removable reflective sheets and/or environmental forces on the slidably removable reflective sheets.

Figure 2A:
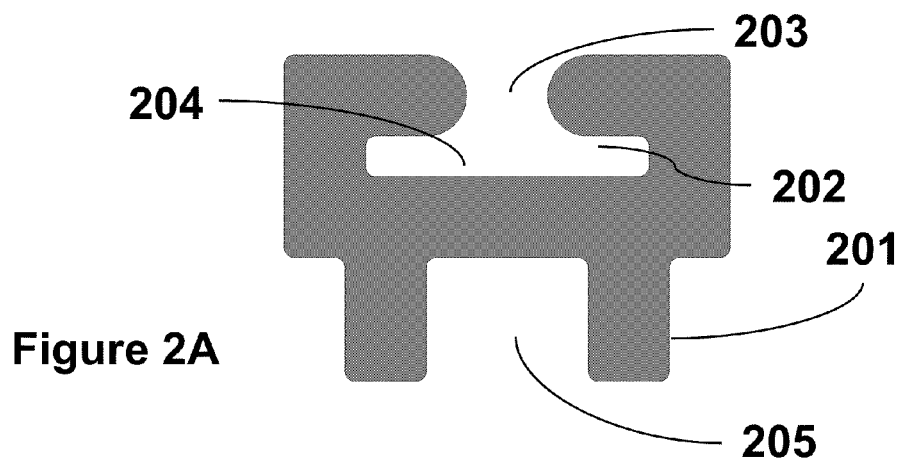
FIG. 2A illustrates the cross-section of a second exemplary guide rail as viewed along the longitudinal direction.
Figure 2B:
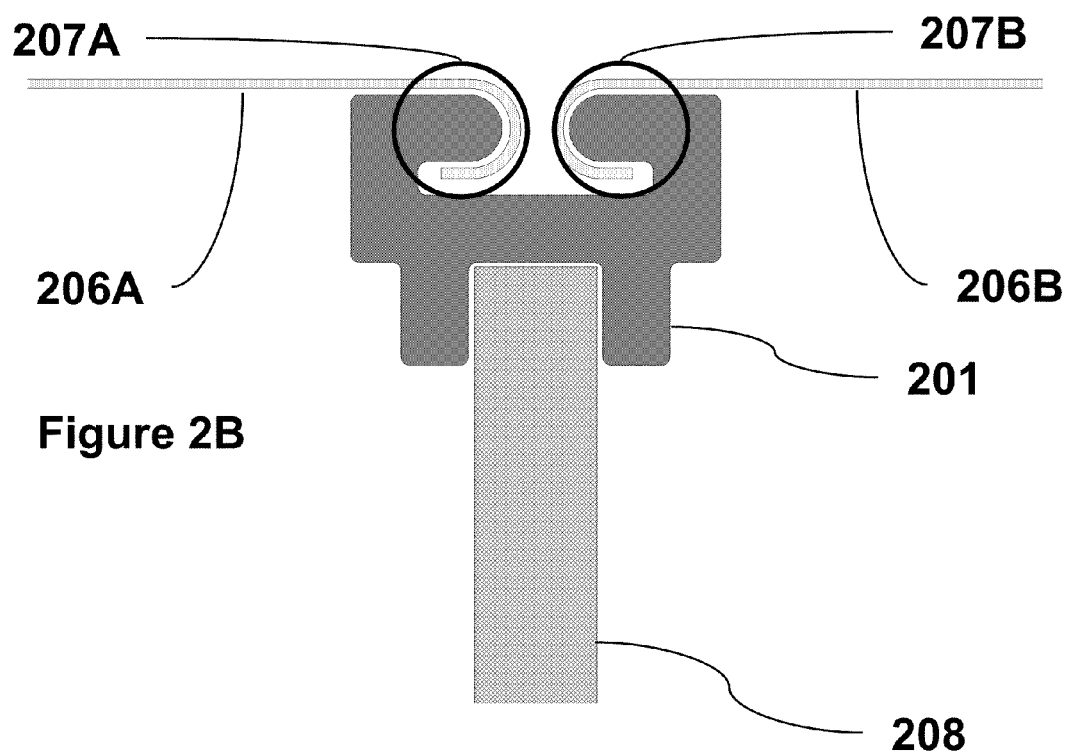
FIG. 2B illustrates the cross-section of the second exemplary guide rail with a pair of slidably removable reflective sheets having hook edges retained in a longitudinal channel and a supporting rib mounted in a second longitudinal channel.

FIG. 2A illustrates the cross-section of a second exemplary guide rail as viewed along the longitudinal direction. Rail body 201 has a first longitudinal channel 202 with an outer channel portion 203 and an inner channel portion 204 wider than the outer channel portion 203 and a second longitudinal channel 205 for mounting the guide rail onto a supporting rib. Edges of outer channel portion 203 are rounded to better fit the hook edges of slidably removable reflective sheets, but other embodiments include rectangular or wedge shaped edges. FIG. 2B illustrates guide rail 201 with first and second slidably removable reflective sheets 206A and 206B extending transversely in opposite directions from rail body 201 and having hook edges 207A and 207B retained in the first longitudinal channel 202 and with a supporting rib 208 mounted in second longitudinal channel 205. The guide rails of FIGS. 2A and 2B are useful as the guide rails of a reflective solar assembly and in a specific embodiment are useful as guide rails of a reflective trough.

FIGS. 1 and 2 illustrate embodiments where the guide rail body 101 or 201 is a separate part from the supporting rib 108 or 208. In these and other embodiments, the guide rail body and supporting rib can be attached and held together by attachment means known to the art, including welding, adhesive bonding, screws rivets, crimping, clamping or other attachment means. Separate guide rail body and supporting rib elements are useful, for example, as separate parts allows for efficient manufacturing of each element, despite different fabrication and structural requirements. For example, the supporting ribs may be made stiff, i.e., to be resistant to bending, and made to follow a precise curve shape. The guide rails, for example, may be made by linear processes such as extrusion, and then formed to follow the curve of the supporting rib. In a specific embodiment, separating the supporting rib and rail body into two parts allows the rail body to easily bend to follow the curve of a supporting rib along the longitudinal direction.

Figure 3A:
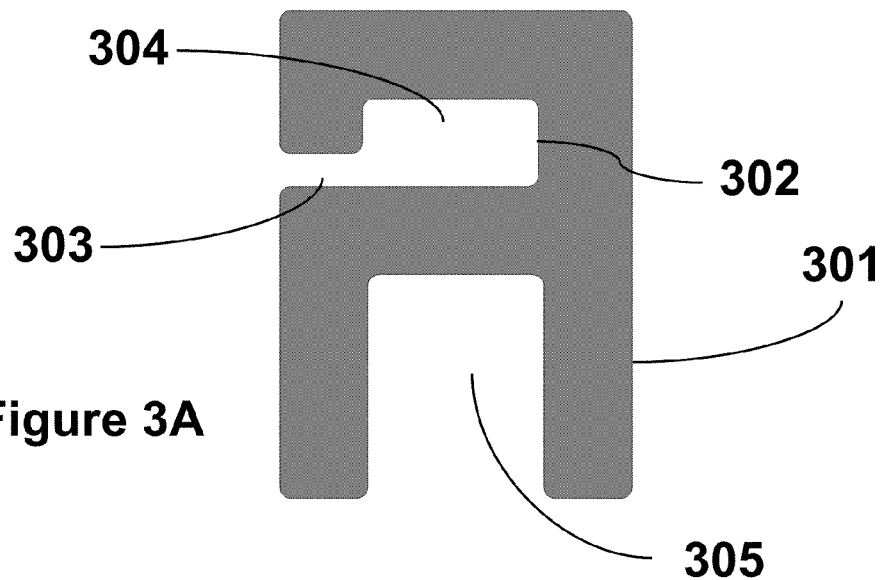
FIG. 3A illustrates the cross-section of a third exemplary guide rail as viewed along the longitudinal direction.
Figure 3B:
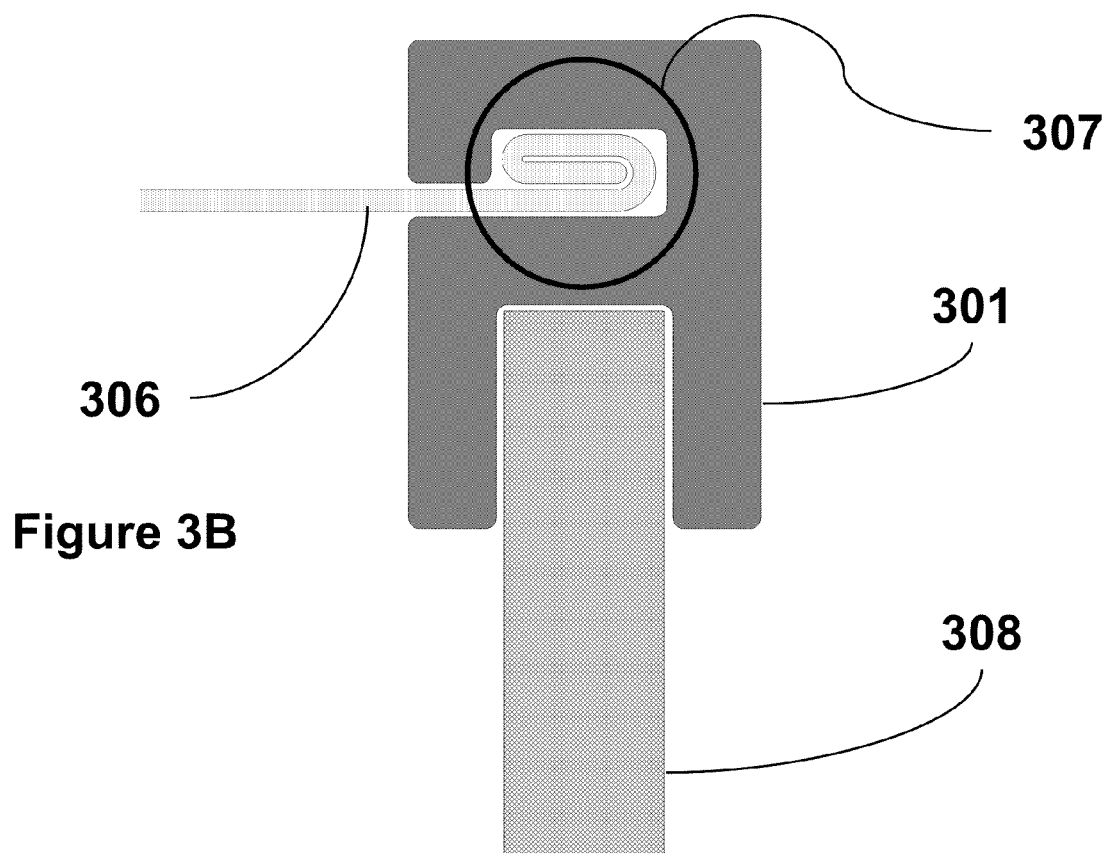
FIG. 3B illustrates the cross-section of the third exemplary guide rail with a slidably removable reflective sheet having a hemmed edge retained in a longitudinal channel and a supporting rib mounted in a second longitudinal channel.

FIG. 3A illustrates the cross-section of a third exemplary guide rail as viewed along the longitudinal direction. Rail body 301 has a first longitudinal channel 302 with an outer channel portion 303 and an inner channel portion 304 wider than the outer channel portion 303 and a second longitudinal channel 305 for mounting the guide rail onto a supporting rib. FIG. 3B illustrates the guide rail with a slidably removable reflective sheet 306 extending transversely from rail body 301 and having a longitudinal hemmed edge 307 retained in the first longitudinal channel 302 and with a supporting rib 308 mounted in second longitudinal channel 305. The guide rails of FIGS. 3A and 3B are useful as the guide rails of a reflective solar assembly and in a specific embodiment are useful as the first and/or last guide rails of a reflective trough.

Figure 4A:
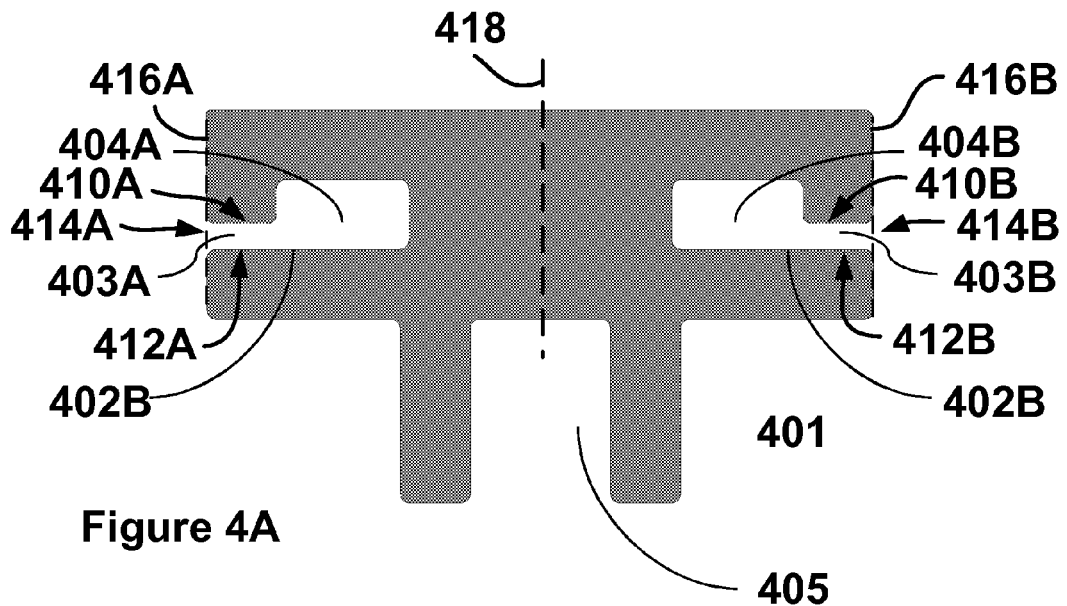
FIG. 4A illustrates the cross-section of a fourth exemplary guide rail as viewed along the longitudinal direction.
Figure 4B:
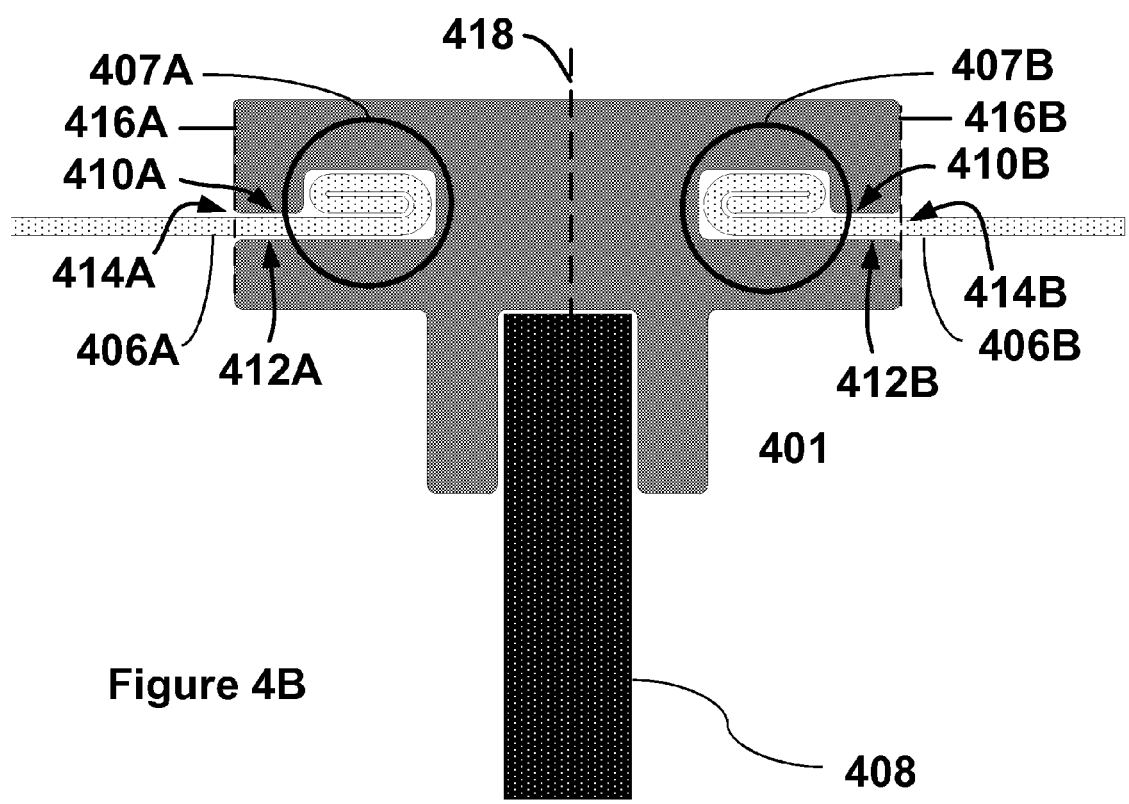
FIG. 4B illustrates the cross-section of the fourth exemplary guide rail with a pair of slidably removable reflective sheets having hemmed edges retained in first and second longitudinal channels and a supporting rib mounted in a third longitudinal channel.

FIG. 4A illustrates the cross-section of a fourth exemplary guide rail as viewed along the longitudinal direction. Rail body 401 has first and second longitudinal channels 402A and 402B with outer channel portions 403A and 403B having top surfaces 410A, 410B and bottom surfaces 412A, 412B that define an opening 414A, 414B at a surface 416A, 416B of the rail body 401 and inner channel portions 404A and 404B closer to the center 418 of the rail body 401. In the embodiment shown, inner channel portions 404A and 404B are wider than the outer channel portions 403A and 403B and a third longitudinal channel 405 is provided for mounting guide rail 401 onto a supporting rib. FIG. 4B illustrates the guide rail with first and second slidably removable reflective sheets 406A and 406B extending transversely in opposite directions from rail body 401 and having hemmed edges 407A and 407B retained in the first and second longitudinal channels 402A and 402B and with a supporting rib 408 mounted in third longitudinal channel 405. The guide rails of FIGS. 4A and 4B are useful as the guide rails of a reflective solar assembly and in a specific embodiment are useful as interior guide rails of a reflective trough, as they are adapted for use with one or more slidably removable reflective sheets extending in opposite directions.

Figure 5A:
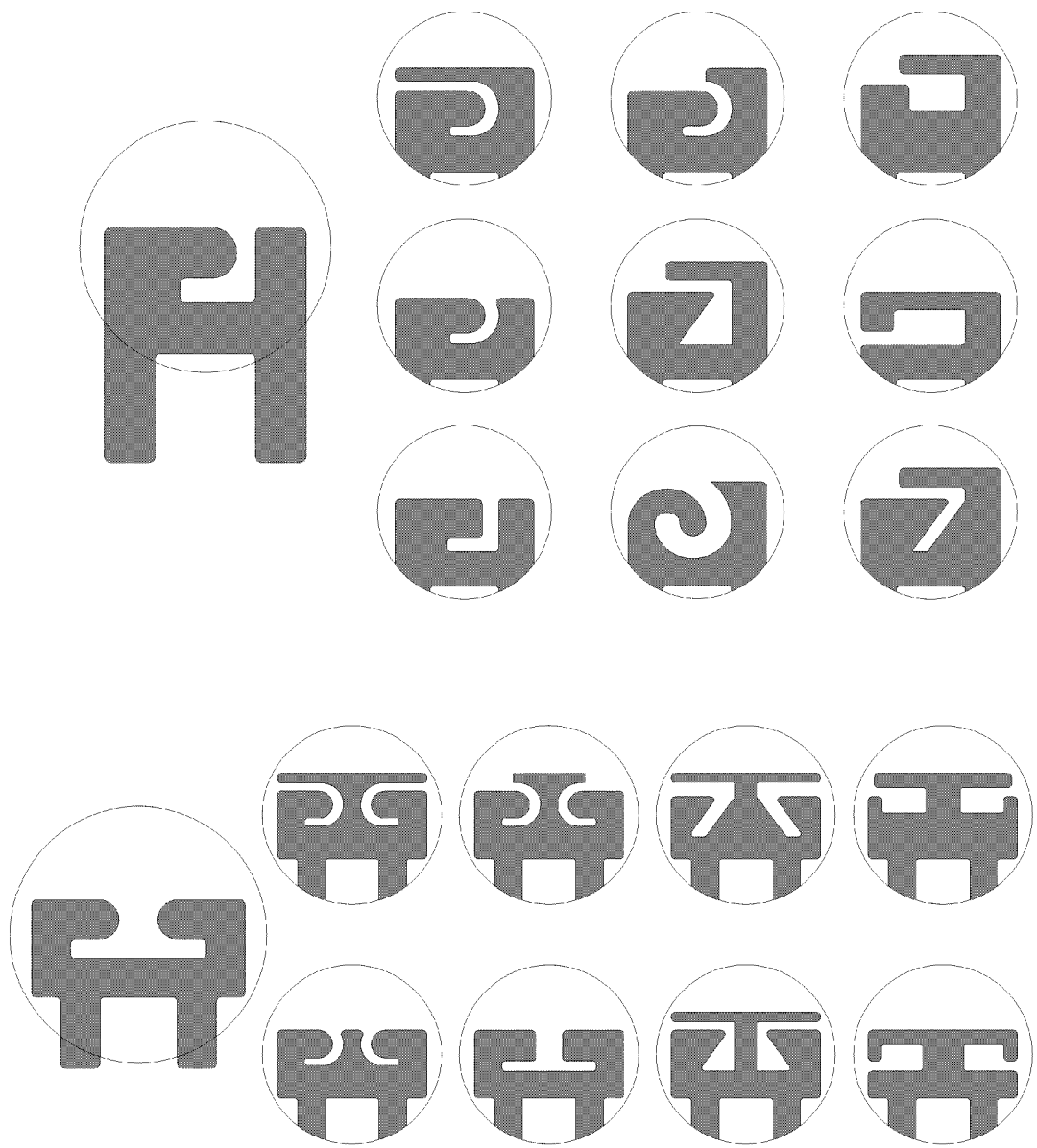
FIG. 5A and FIG. 5B illustrate alternative longitudinal channel retaining shape embodiments for retaining a longitudinal edge of a slidably removable reflective sheet.

FIG. 5A illustrates additional embodiments of guide rail channels having a retaining shape or useful for guiding and retaining longitudinal edges of slidably removable reflective sheets.

Figure 5B:
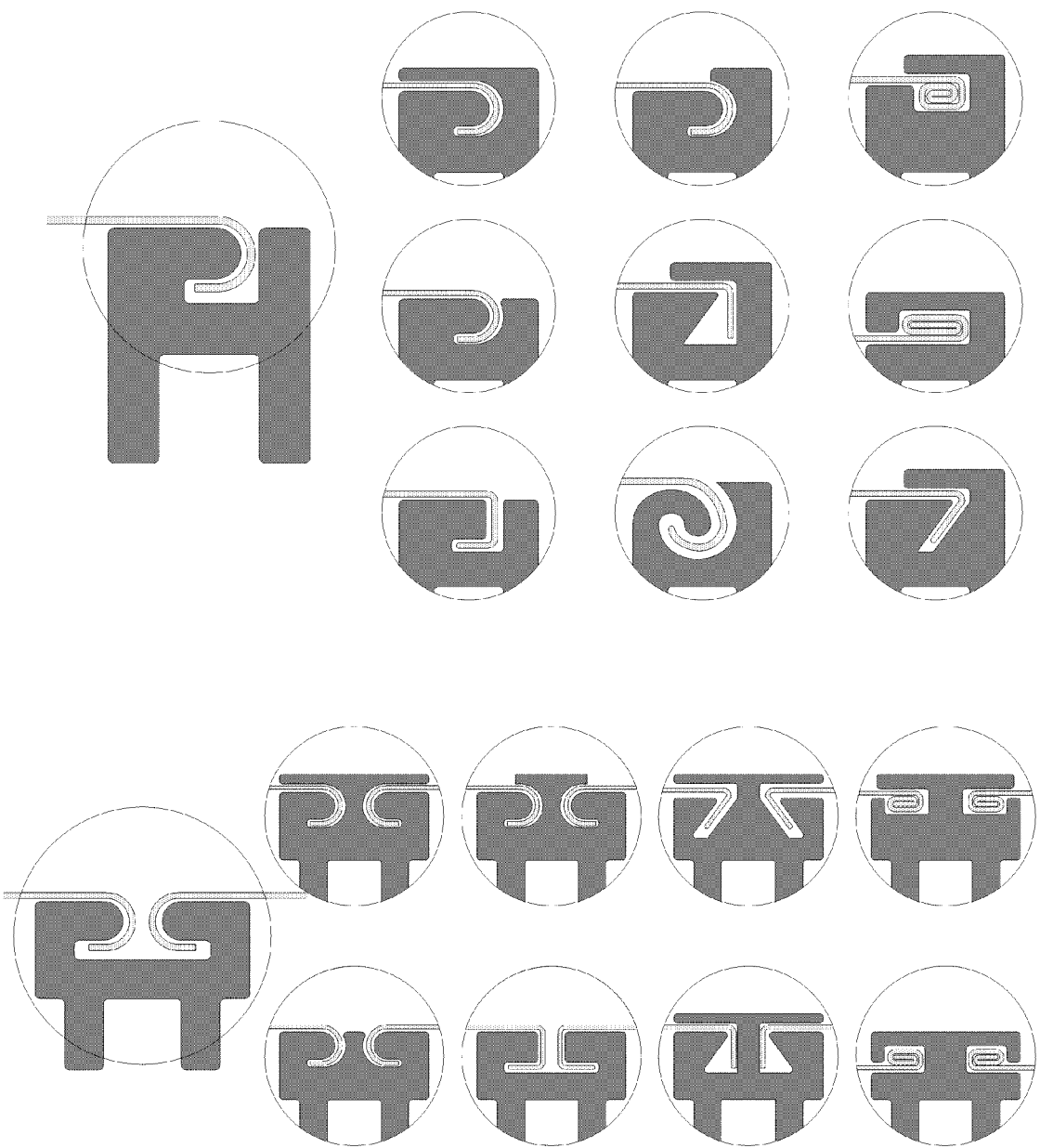

FIG. 5B illustrates embodiments of guide rail channels having a retaining shape and corresponding reflective sheet shapes that cannot be removed from the channel by one or more translations, other than by translation substantially along the longitudinal direction of the guide rail channels.

Figure 5C:
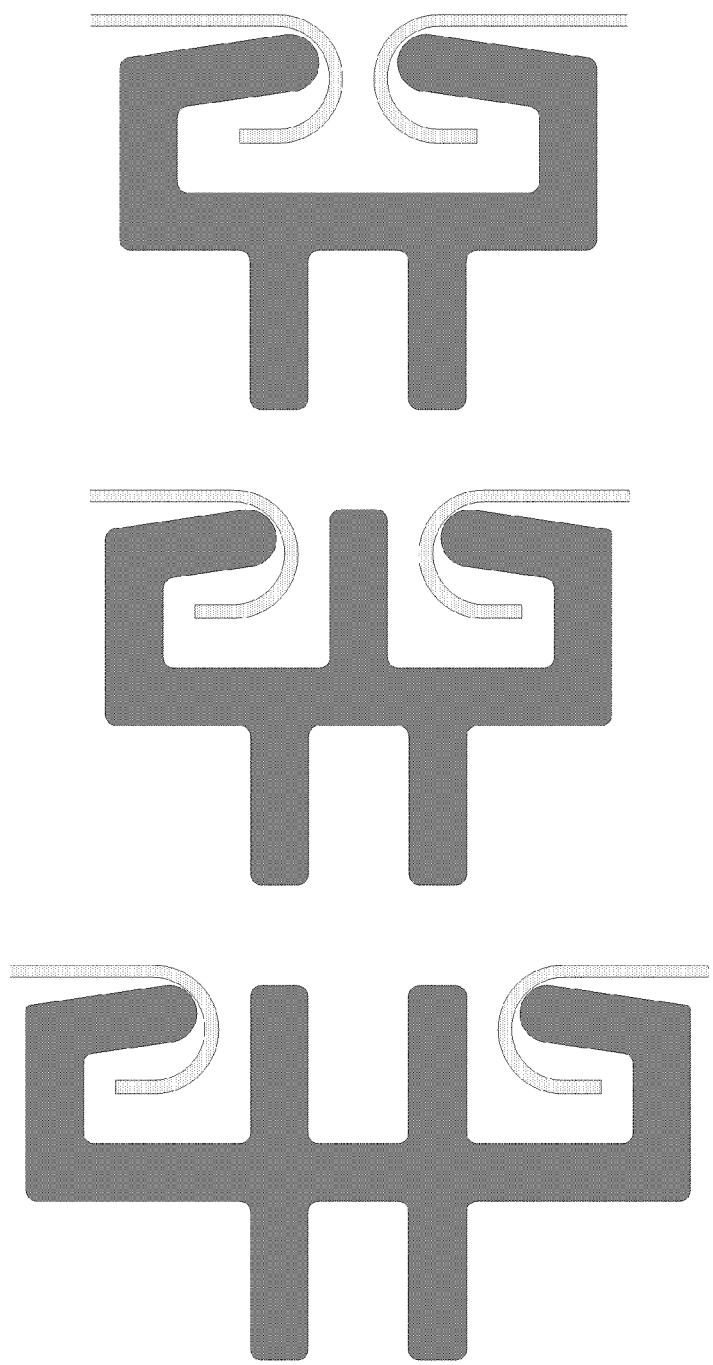

FIG. 5C illustrates embodiments of three guide rails with channels having a retaining shape. In these embodiments, the upper and outer portion of the retaining channel is canted at an angle, for example a 5° angle, such that only a single portion of the guide rail makes contact with a slidably removable reflective sheet retained in the longitudinal channel. For certain embodiments, such a configuration results in a reduced insertion/removal force for inserting/removing a slidably removable reflective sheet.

Figure 5D:
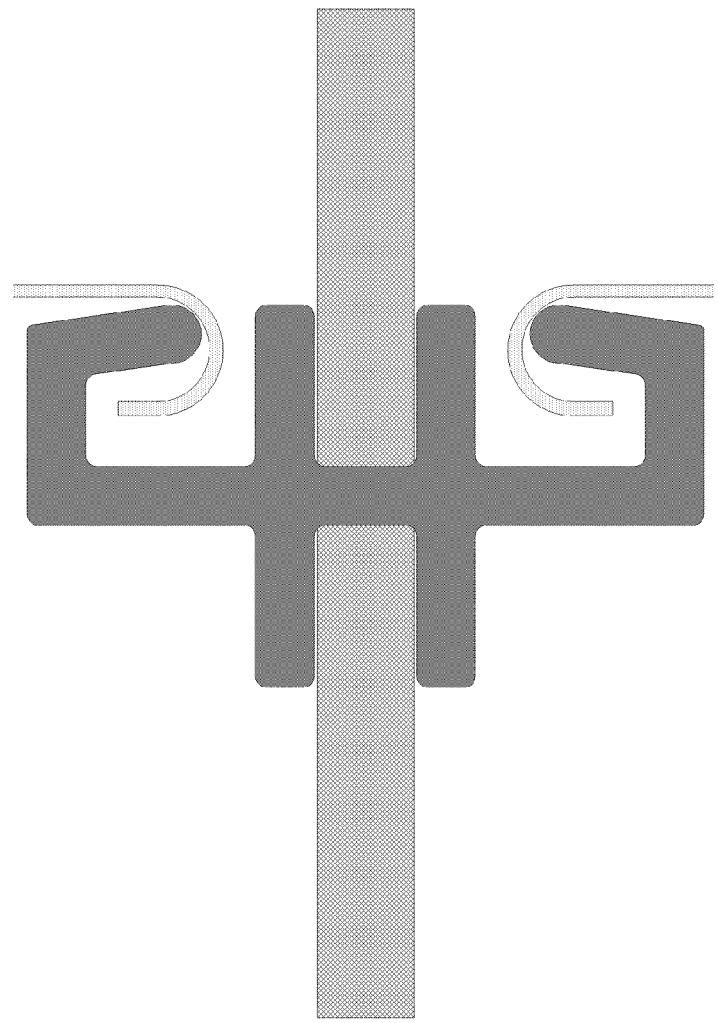

FIG. 5D illustrates a guide rail embodiment where a portion of a supporting rib extends through the guide rail. Such an embodiment is useful for allowing a support strut to pass through a guide rail, for example a support strut for a solar receiver.

In one embodiment, guide rails are made of a single material, for example steel, aluminum or plastic, and in a specific embodiment are made by extrusion, although they can be made by other methods. Embodiments are contemplated which include multiple materials, for example, a guide rail which includes a slip coating comprising plastic, polytetrafluoroethylene, best known as Teflon®, or other coating, for decreasing the friction along the longitudinal direction between the guide rail and a slidably removable reflective sheet being installed or removed from a longitudinal channel of the guide rail. Additional embodiments are contemplated where the guide rail is made of a lubricious material, such as polyoxymethylene, best known as Delrin®. An additional embodiment is contemplated where the guide rail is made of aluminum and the surfaces of the guide rail are anodized, for example to increase surface hardness. In some embodiments, the surfaces of a guide rail and a slidably removable reflective sheet have different hardnesses, for example where the guide rail surface is harder or softer than the slidably removable reflective sheet surface. Use of differing hardnesses is useful, for example, to reduce or eliminate surface galling when a slidably removable reflective sheet is slid in, out or along a guide rail.

Figure 6A:
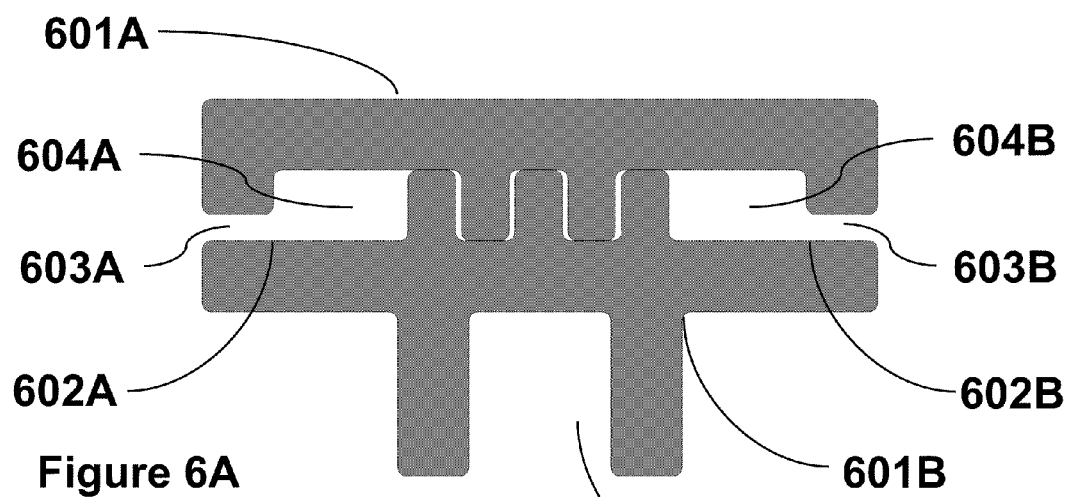
FIG. 6A illustrates the cross-section of a fifth exemplary guide rail as viewed along the longitudinal direction, comprising top and bottom portions.
Figure 6B:
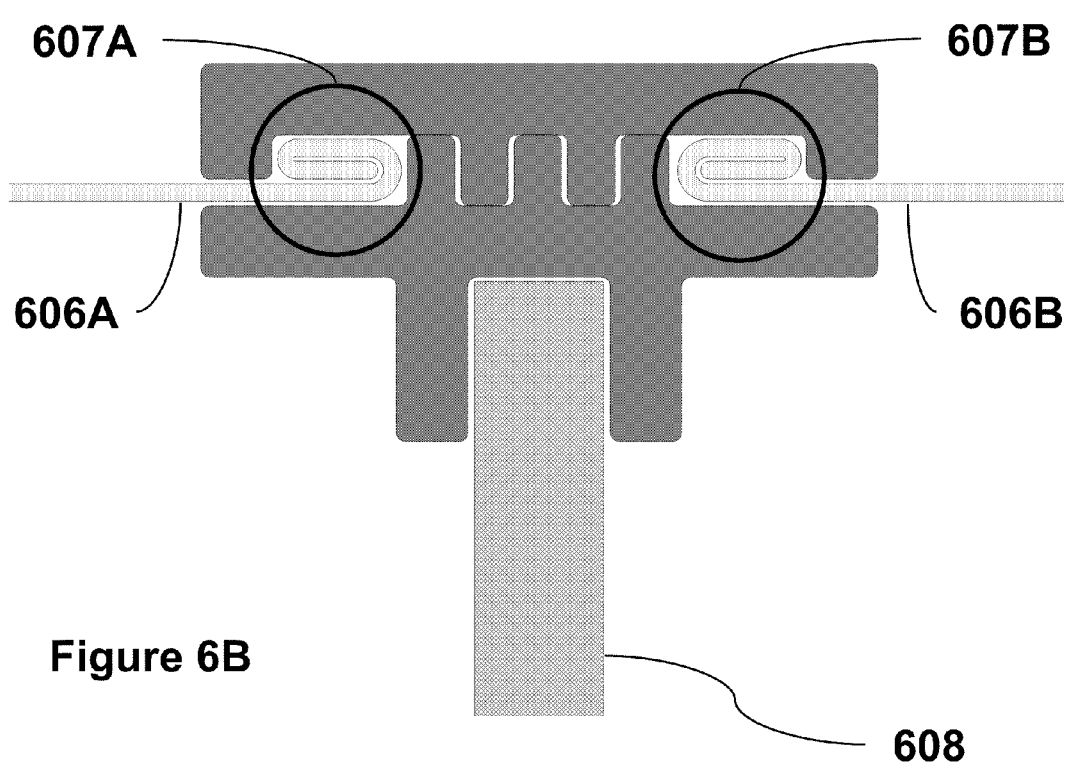
FIG. 6B illustrates the cross-section of the fifth exemplary guide rail with a pair of slidably removable reflective sheets having hemmed edges retained in first and second longitudinal channels and a supporting rib mounted in a third longitudinal channel.

For some embodiments, it is not possible to make the guide rails of the present invention as a single extruded structure; for example, it is not possible to fabricate an appropriate extrusion die for a single piece. A solution to this problem is providing a guide rail formed of multiple pieces; any guide rail embodiments described herein can further be fabricated in multiple pieces. The pieces may be joined by adhesive bonding, welding at multiple points, friction, interlocking structures, screws, bolts, or by any combination of these or other attachments methods known to the art. For example, FIGS. 6A and 6B illustrate the cross-section of a guide rail formed of two pieces which are joined together to form a single guide rail structure similar to that of FIGS. 4A and 4B. The guide rail of FIG. 6A comprises a top piece 601A joined to a bottom piece 601B. Here, the pieces are joined (e.g., by adhesive bonding) over a large surface area to increase the strength of the bond between the two pieces. Top and bottom pieces 601A and 601B respectively define top and bottom surfaces of longitudinal channels 602A and 602B which include inner channel portions 604A and 604B wider than outer channel portions 603A and 603B. Bottom piece 601B further includes a longitudinal channel 605 for mounting onto a supporting rib. FIG. 6B illustrates slidably removable reflective sheets 606A and 606B having longitudinal hemmed edges 607A and 607B retained in the channel of the guide rail formed from pieces 601A and 601B as well as a supporting rib 608 mounted in the longitudinal channel 605 of bottom piece 601B.

Figure 7A:
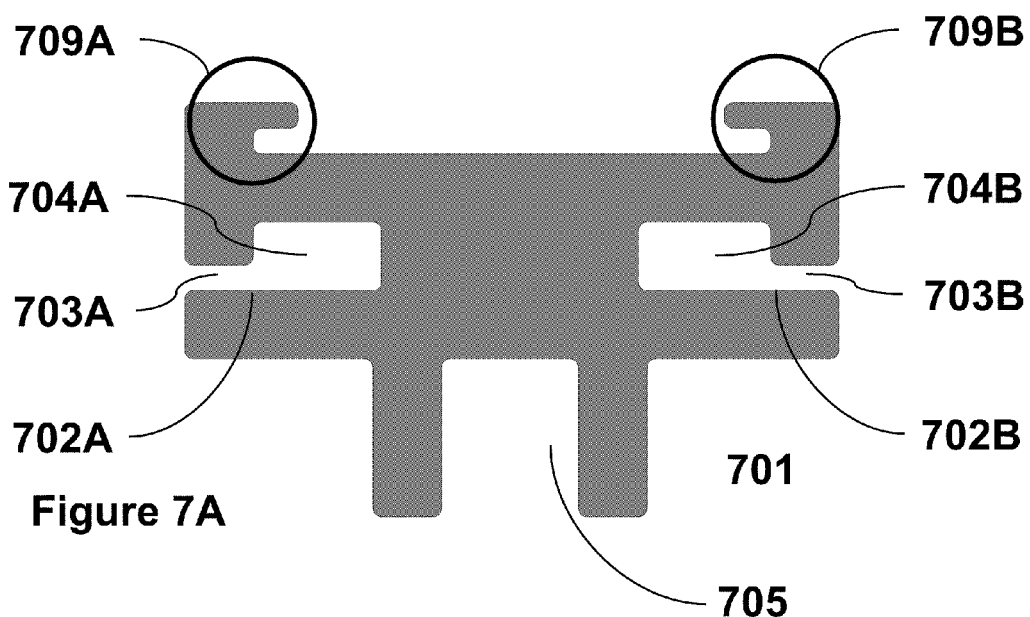
FIG. 7A illustrates the cross-section of a sixth exemplary guide rail as viewed along the longitudinal direction and having a pair of longitudinal tabs for guiding and retaining a longitudinal reflective strip.
Figure 7B:
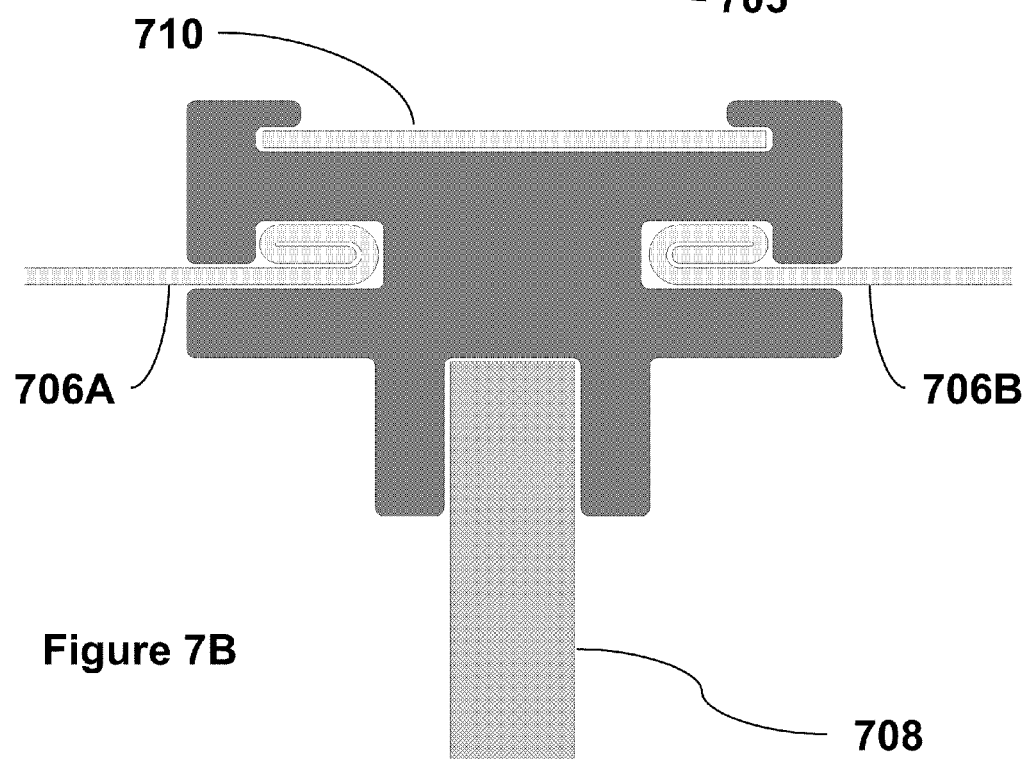
FIG. 7B illustrates the cross-section of the sixth exemplary guide rail with a pair of slidably removable reflective sheets having hemmed edges retained in first and second longitudinal channels, a supporting rib mounted in a third longitudinal channel, and a reflective strip retained by the longitudinal tabs.

In order to increase the usable reflective surface area of assemblies comprising guide rails, in an embodiment, the guide rails are adapted to have a longitudinal reflective strip positioned on their upper surface. In a specific embodiment of this aspect, the guide rails comprise a pair of longitudinal tabs for retaining a slidably removable reflective strip. FIGS. 7A, 7B, 8A and 8B illustrate the cross-sections of guide rails comprising means for retaining a slidably removable reflective strip. FIGS. 7A and 7B illustrate the cross-section of an exemplary guide rail comprising rail body 701 which has a pair of longitudinal channels 702A and 702B having inner channel portions 704A and 704B which are wider than outer channel portions 703A and 703B, a longitudinal channel 705 for mounting the guide rail onto a supporting rib, and a pair of longitudinal tabs 709A and 709B for guiding and retaining a slidably removable reflective strip. FIG. 7B illustrates the guide rail mounted on a supporting rib 708, having slidably removable reflective sheets 706A and 706B having longitudinal hemmed edges retained in longitudinal channels 702A and 702B, and having a slidably removable reflective strip 710 which is retained by longitudinal tabs 709A and 709B.

Figure 8A:
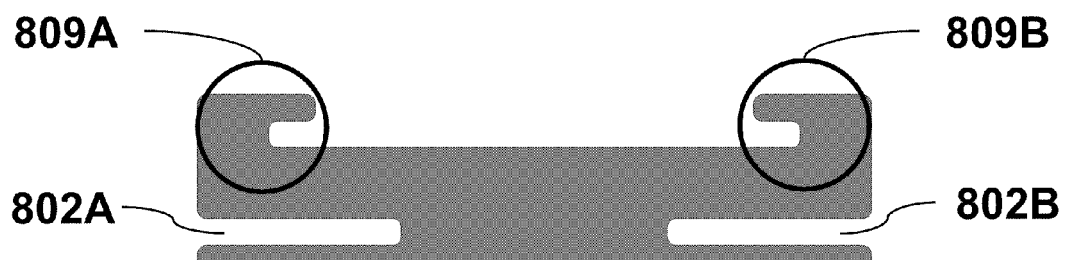
FIG. 8A illustrates the cross-section of a seventh exemplary guide rail as viewed along the longitudinal direction and having a pair of longitudinal tabs for guiding and retaining a longitudinal reflective strip.
Figure 8B:
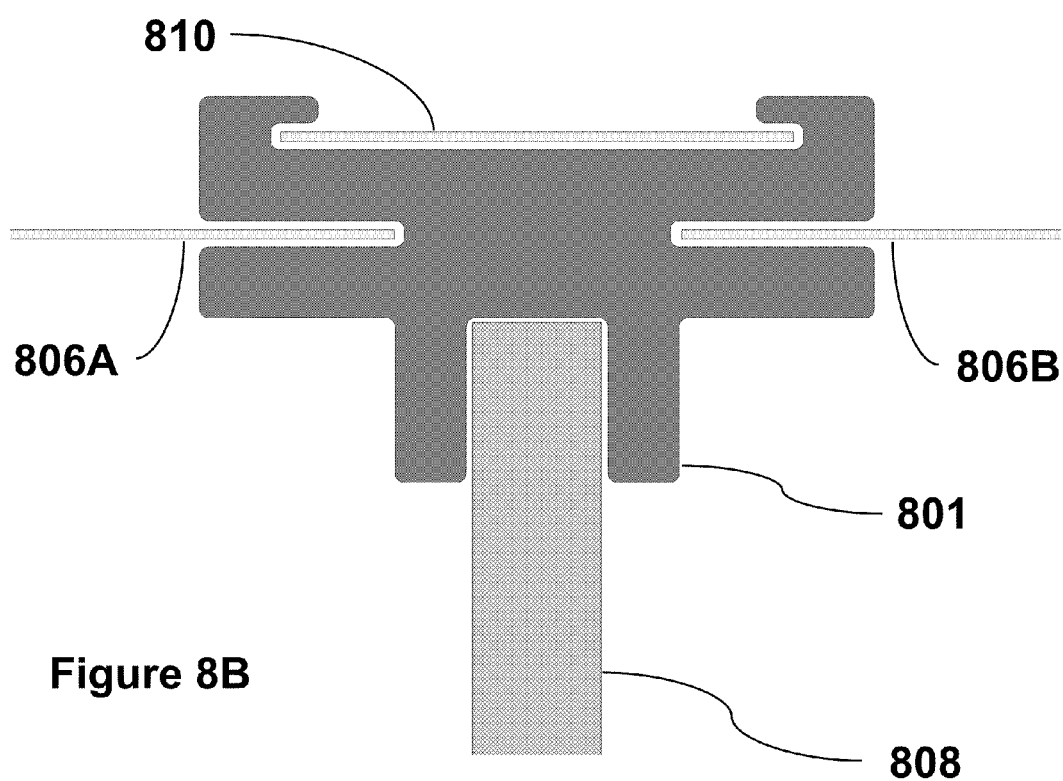
FIG. 8B illustrates the cross-section of the seventh exemplary guide rail with a pair of slidably removable reflective sheets having longitudinal edges in first and second longitudinal channels, a supporting rib mounted in a third longitudinal channel, and a reflective strip retained by the longitudinal tabs.

FIGS. 8A and 8B illustrate the cross section of another exemplary guide rail having longitudinal tabs 809A and 809B for guiding and retaining a slidably removable reflective strip 810. Rail body 801 includes a pair of longitudinal channels 802A and 802B, for guiding slidably removable reflective sheets 806A and 806B, and a third longitudinal channel 805 for mounting on a supporting rib 808.

Figure 9A:
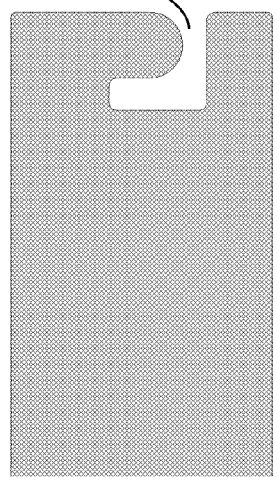
FIGS. 9A, 9B and 9C illustrate embodiments of a supporting rib and guide rail formed of a single piece of material.
Figure 9B:
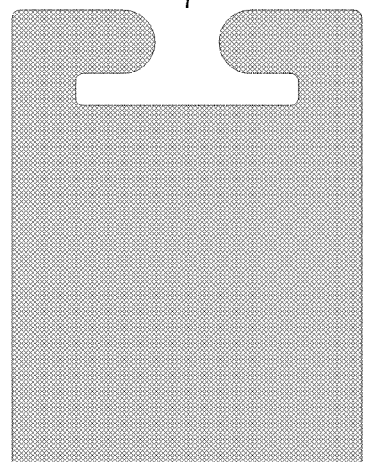
Figure 9C:
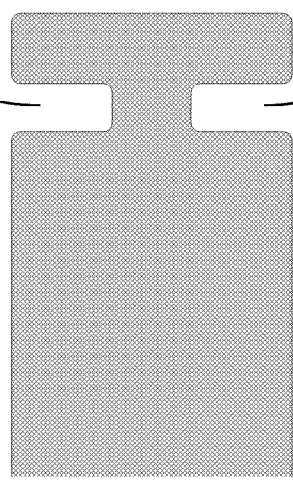

FIGS. 9A, 9B and 9C illustrate embodiments where the supporting rib and guide rails are a unitary structure; that is, formed of a single piece and having one or more longitudinal channels (e.g., 902A, 902B, 902C, 902D). Such a supporting rib/guide rail embodiment may be fabricated by a number of methods, for example first cutting a blank to the shape of the supporting rib and then machining one or more guide rail channels into the supporting rib. In alternative embodiments, one or more guide rail channels are formed by a die stamping operation. Similarly, the supporting rib and one or more guide rail channels may be formed by a series of progressive die stamping operations. Alternative embodiments include supporting ribs including guide rails, formed by casting, injection molding, or other fabrication methods known in the art.

Figure 10:
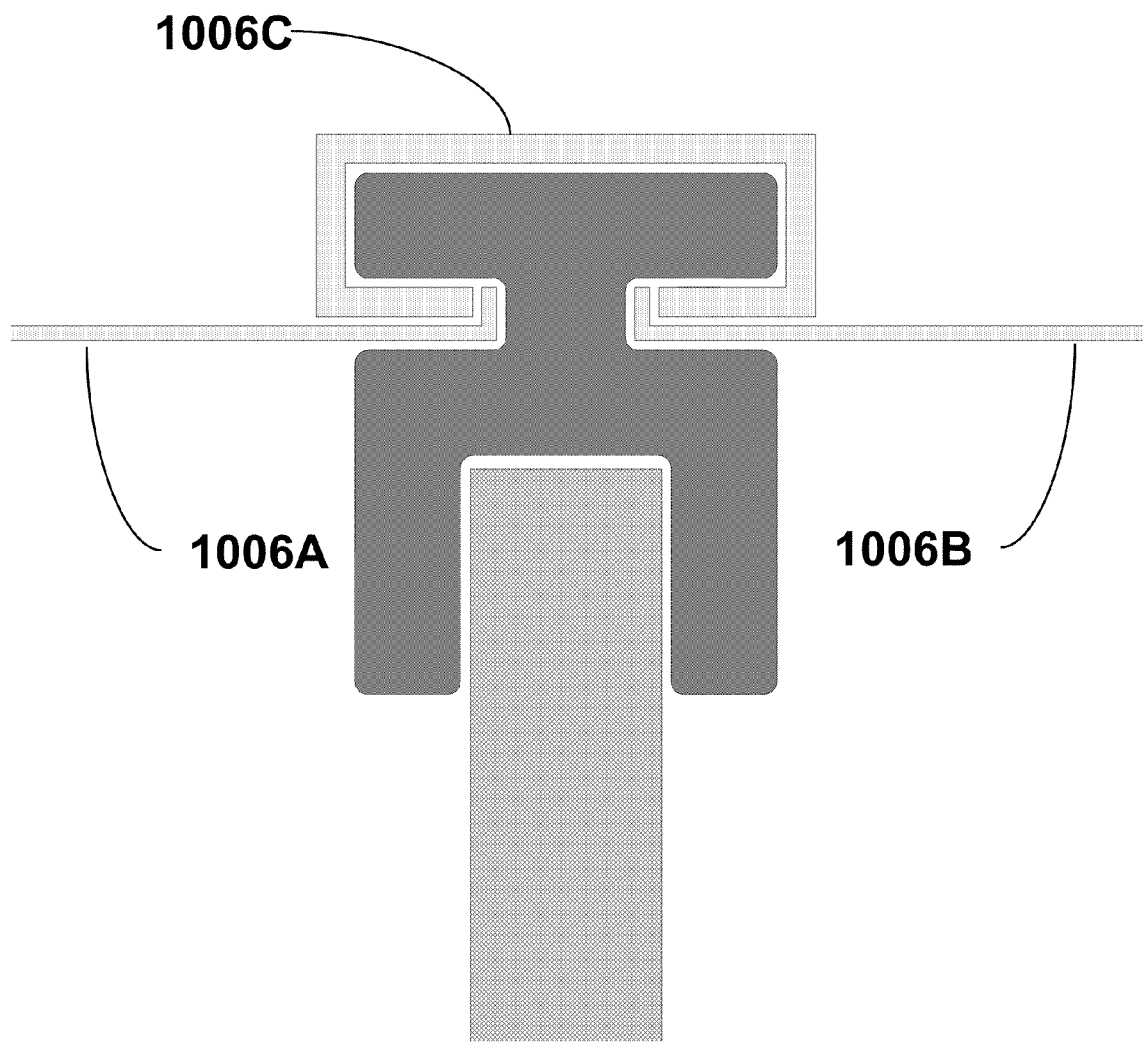
FIG. 10 illustrates the cross-section of an exemplary reflective assembly embodiment.

FIG. 10 illustrates a specific embodiment of a reflective assembly comprising a guide rail having a pair of slidably removable reflective sheets 1006A and 1006B retained in channels of the guide rail. The reflective assembly of FIG. 10 further comprises a third slidably removable reflective sheet 1006C covering the upper surface of the guide rail which retains slidably removable reflective sheets 1006A and 1006B within the channels of the guide rail. In another embodiment, instead of a third slidably removable reflective sheet, one or more clips 1006C may be used for retaining slidably removable reflective sheets 1006A and 1006B.

Figure 11A:
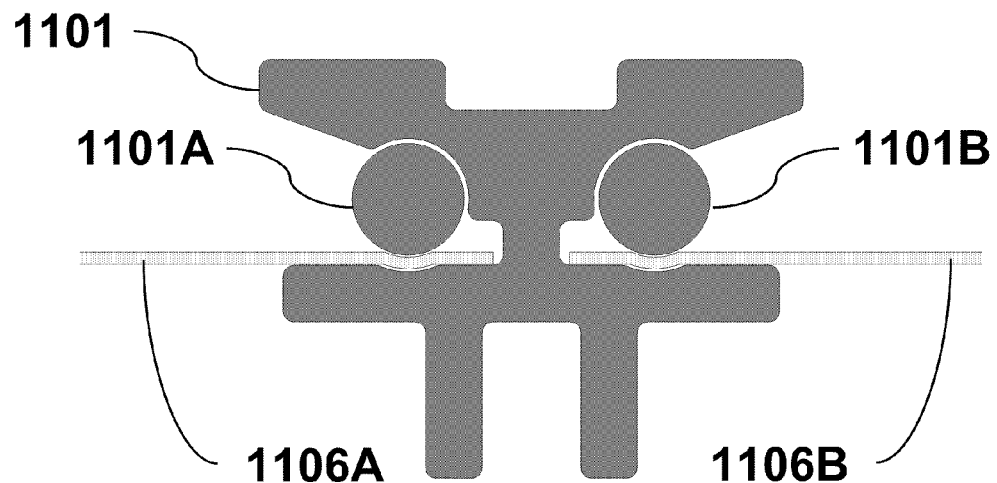
FIG. 11A illustrates the cross-section of an exemplary guide rail having longitudinal edges of slidably removable reflective sheets retained in longitudinal channels. The reflective sheets are secured in place with a longitudinal interlocking member pressed into the longitudinal channels.
Figure 11B:
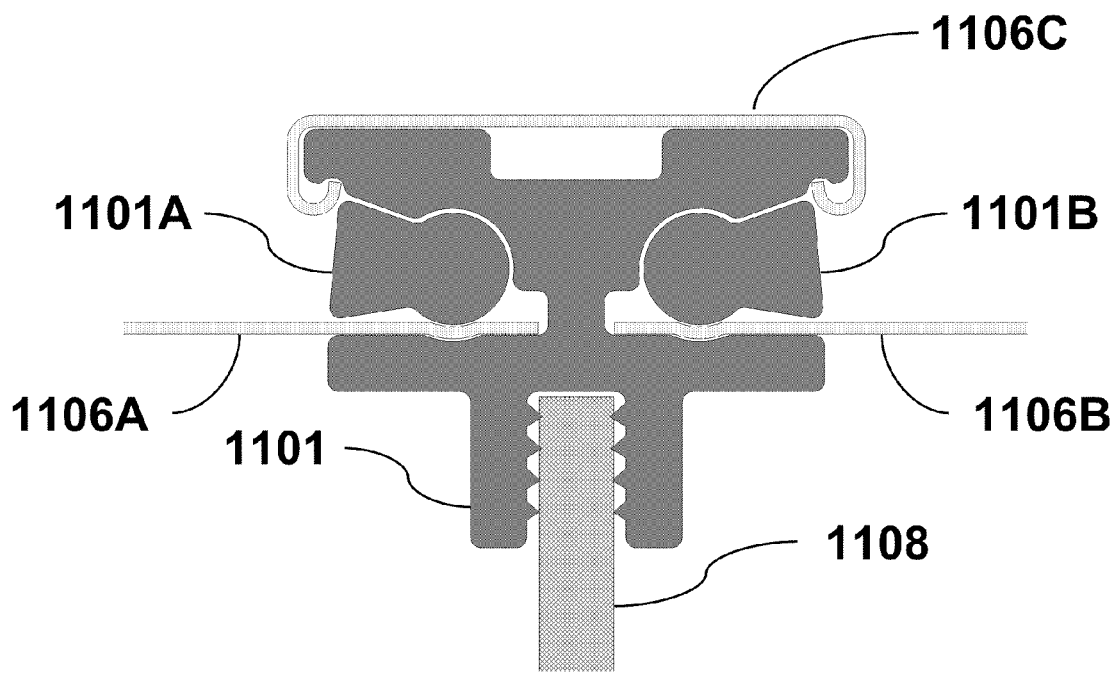
FIG. 11B illustrates the cross-section of an exemplary guide rail having longitudinal edges of slidably removable reflective sheets retained in longitudinal channels. The reflective sheets are secured in place with a longitudinal interlocking member pressed into the longitudinal channels. The longitudinal interlocking member in FIG. 11B has a keyhole shape rather than the round shape shown in FIG. 11A.

FIGS. 11A and 11B illustrate the cross section of two exemplary guide rails having two slidably removable reflective sheets 1106A and 1106B retained in channels of the guide rails 1101. Second and third portions, 1101A and 1101B are pressed into place to secure the reflective sheets after sheet installation. The embodiment shown in FIG. 11B also features a third slidably removable reflective sheet 1106C covering the upper surface of the guide rail. Also shown in FIG. 11B is an embodiment for mounting a guide rail on a supporting rib. In this embodiment, a crimping mechanism secures guide rail 1101 onto supporting rib 1108.

Figure 11C:
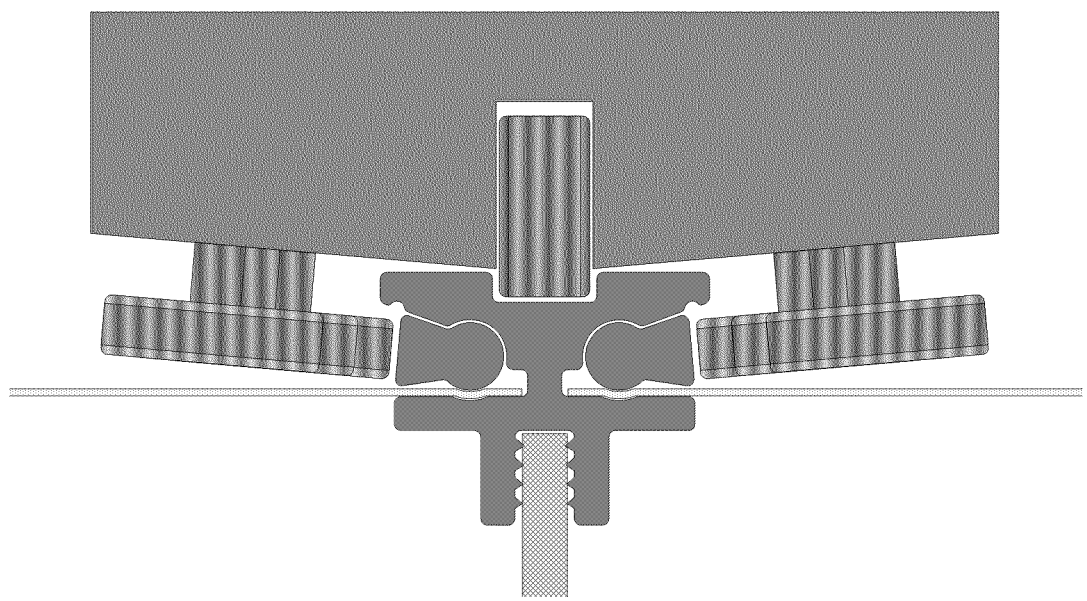
FIG. 11C illustrates one mechanism and apparatus for pressing the longitudinal interlocking members into the longitudinal channels of the guide rails of FIG. 11A or 11B.

FIG. 11C shows one embodiment of a device for pressing second and third guide rail portions 1101A and 1101B into place to secure the reflective sheets. The second and third guide rail portions can optionally be manually inserted into the longitudinal channel to secure the reflective sheets.

Figure 12A:
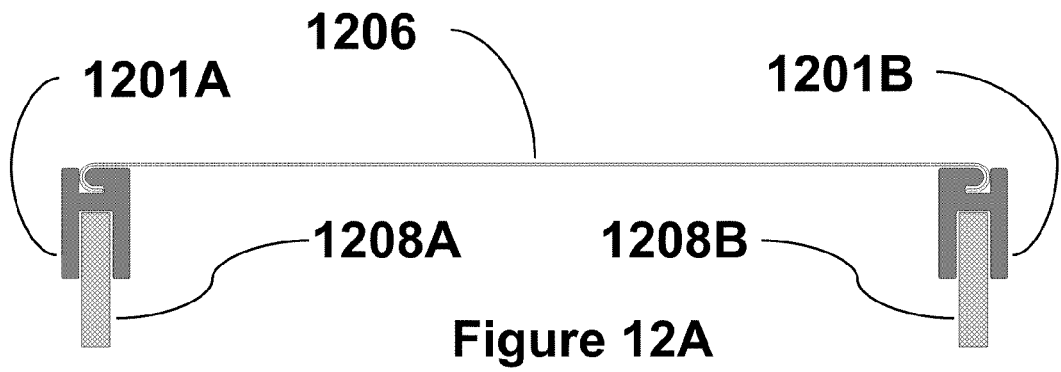
FIG. 12A illustrates a cross-sectional view of a reflective assembly embodiment for a solar collector as viewed along the longitudinal direction.
Figure 12B:
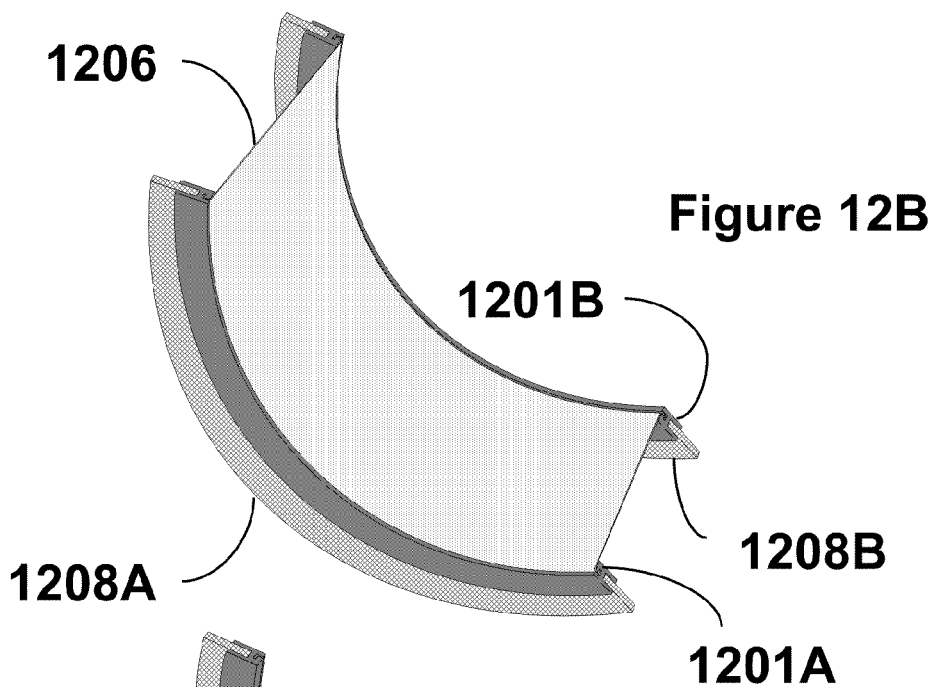
FIG. 12B illustrates a perspective view of a reflective assembly embodiment for a solar collector.
Figure 12C:
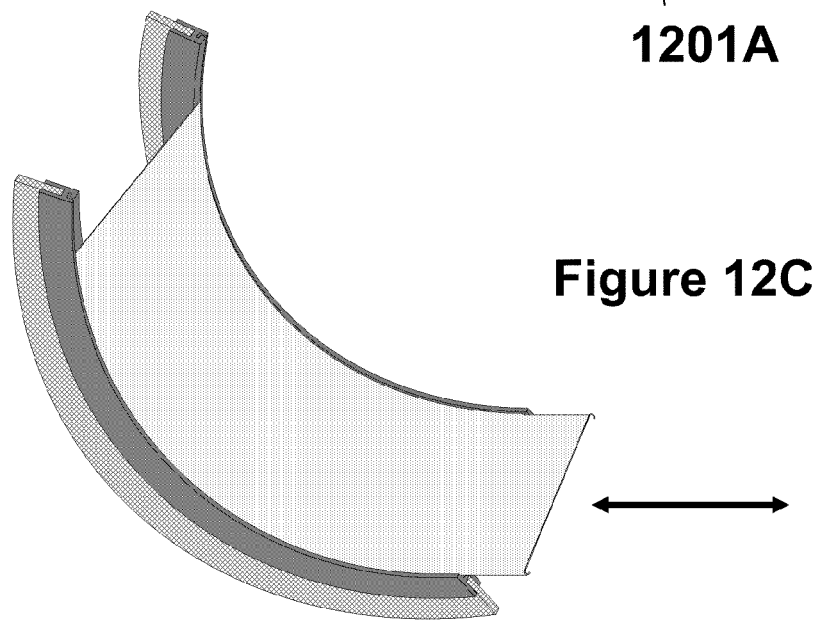
FIG. 12C illustrates a perspective view of a reflective assembly embodiment for a solar collector with the slidably removable reflective sheet partially removed from the guide rails.

FIG. 12A illustrates a cross-sectional view of a reflective assembly embodiment for a solar collector as viewed along the longitudinal direction. Guide rails 1201A and 1201 B are mounted onto supporting ribs 1208A and 1208B and slidably removable reflective sheet 1206 has longitudinal hook edges retained in channels of guide rails 1201A and 1201B. FIGS. 12B and 12C illustrate a perspective view of this reflective assembly. FIG. 12C shows the slidably removable reflective sheet 1206 partially removed from the assembly; the double headed arrow indicates that the direction of motion of the slidably removable reflective sheet.

Figure 13A:
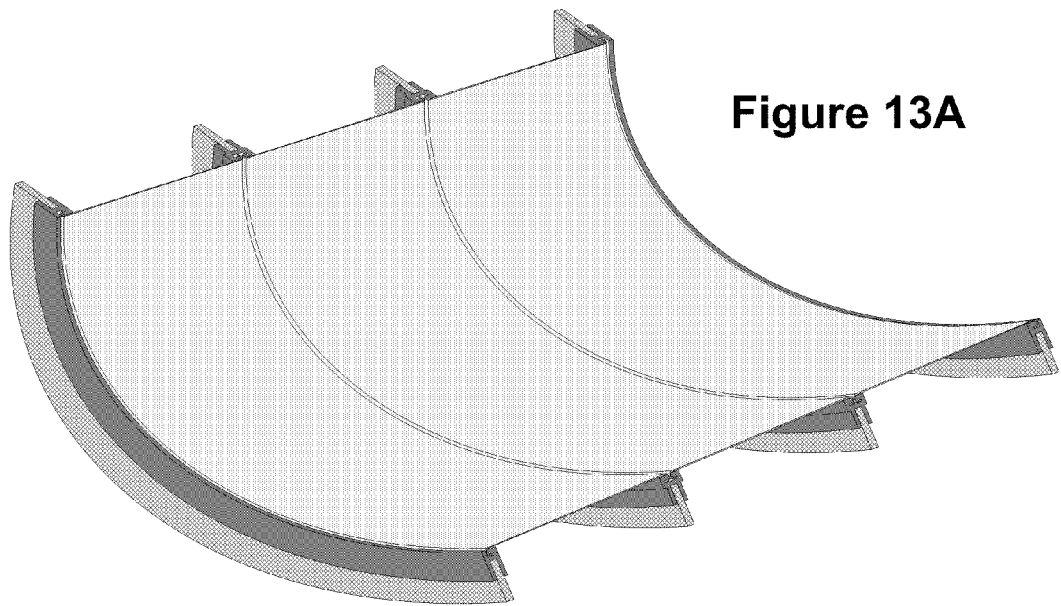
FIG. 13A illustrates a front perspective view of a reflective assembly for a solar collector having three slidably removable reflective sheets.
Figure 13B:
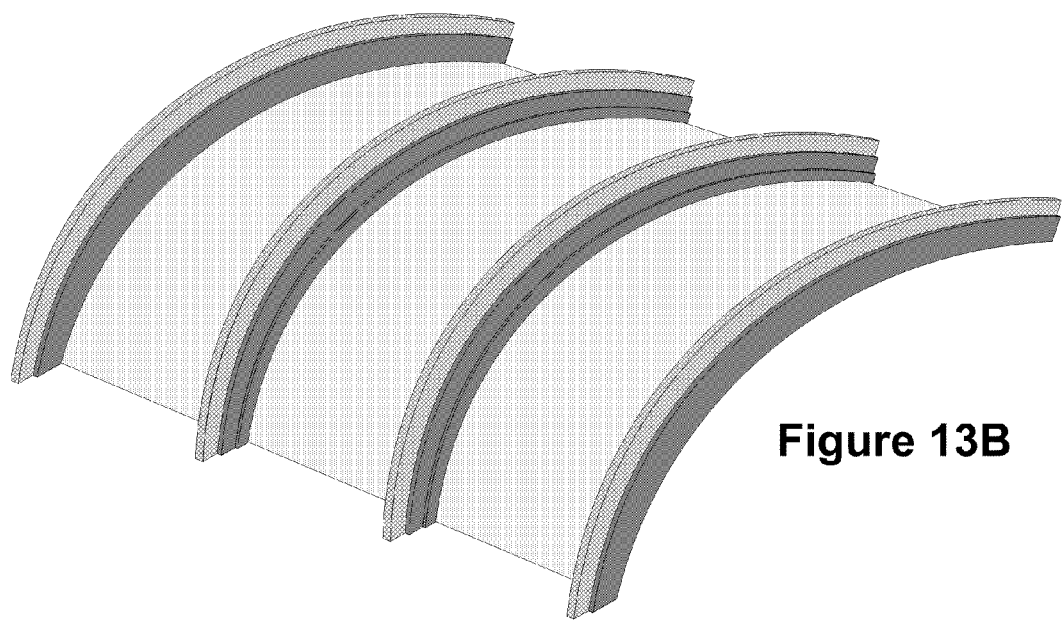
FIG. 13B illustrates a rear perspective view of a reflective assembly for a solar collector having three slidably removable reflective sheets.

In an embodiment, a reflective assembly for a solar collector of the present invention comprises multiple slidably removable reflective sheets. FIG. 13A illustrates a front perspective view of a reflective assembly for a solar collector having three slidably removable reflective sheets. FIG. 13B illustrates a rear perspective view of a reflective assembly for a solar collector having three slidably removable reflective sheets; four guide rails and supporting ribs also comprise the reflective assembly shown in FIGS. 13A and 13B.

Figure 14:
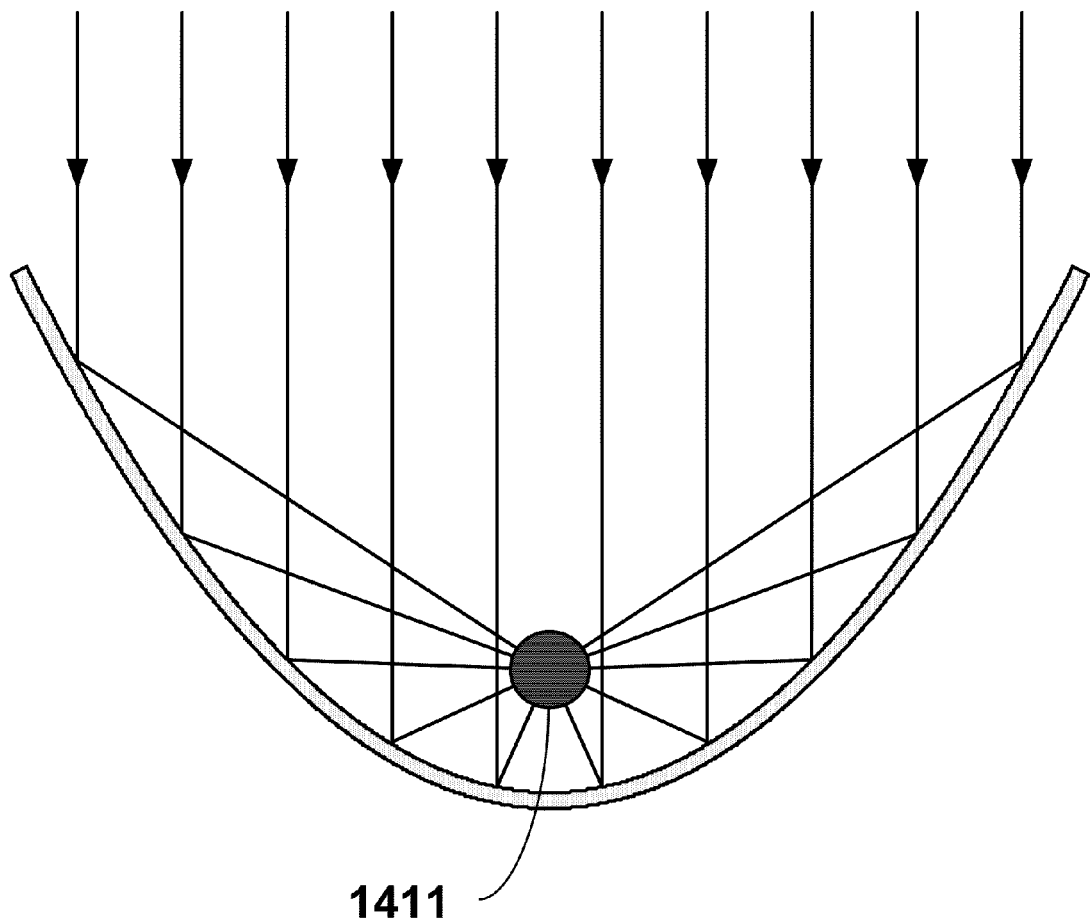
FIG. 14 illustrates the cross-section of a reflective trough as viewed along the transverse direction and shows the optimal focusing of incident light onto a solar receiver.

In an embodiment, the reflective solar assemblies of the present invention have an arc shaped cross-section, such that a substantial portion of the incident light is reflected and concentrated to a solar receiver. In a specific embodiment, the cross-section of the reflective solar assemblies is parabolic, as illustrated in FIG. 14; incident parallel light rays are optimally focused onto a solar receiver 1411 positioned at the focus of the parabola. Many cross-sectional shapes known to the art are useful for concentrating a substantial portion of the incident light onto a solar receiver including, but not limited to, parabolic, near-parabolic, substantially-parabolic, compound-parabolic, elliptical, semi-elliptical, and arc-shaped. The guide rails and reflective assemblies can be used to construct reflective assemblies and reflective troughs having all such shapes.

Figure 15:
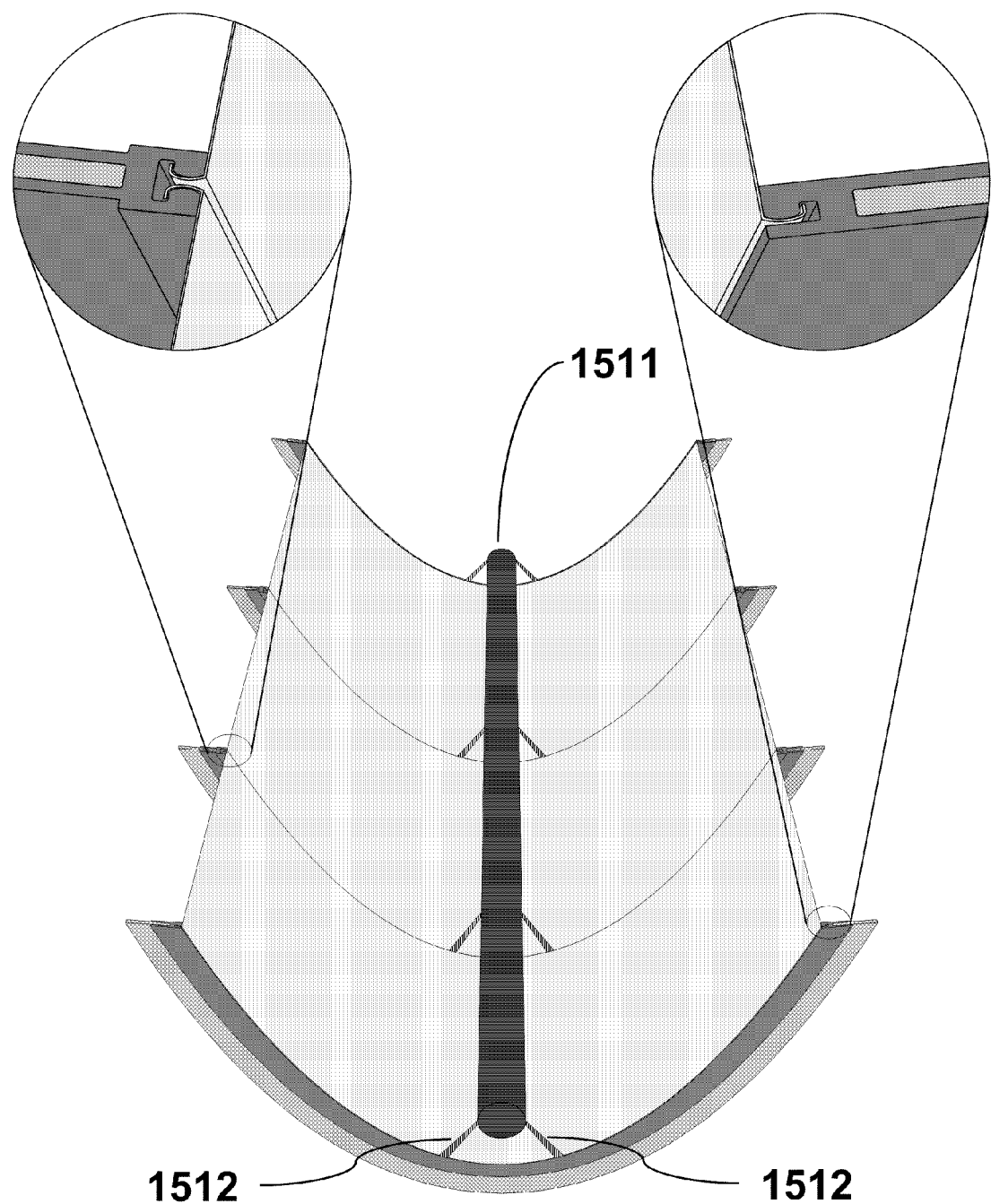
FIG. 15 illustrates a perspective view of a reflective assembly including a solar receiver positioned for absorbing a substantial portion of the incident light; insets in FIG. 15 further illustrate an expanded view of longitudinal edges of exemplary slidably removable reflective sheets retained in channels of the guide rails.

In a specific embodiment, a solar receiver useful with various aspects of the present invention is positioned to absorb light reflected by the slidably removable reflective sheets of a reflective assembly or reflective trough. In a specific embodiment, a solar receiver is positioned along the transverse axis of a reflective solar trough, spanning multiple slidably removable reflective sheets, and positioned at a point of substantially optimal energy capture. FIG. 15 illustrates a specific embodiment of a parabolic reflective assembly with a solar receiver 1511 positioned at a point of substantially optimal energy capture. In this embodiment, the guide rails each comprise two access points for attaching support struts 1512 to the solar receiver. The insets in FIG. 15 further show expanded views of the slidably removable reflective sheets retained in the guide rails. In a specific embodiment, a guide rail adapted for guiding and retaining two slidably removable reflective sheets extending in opposite transverse directions can be used as each of the guide rails of a reflective assembly, for example including the transverse ends where there is only a single slidably removable reflective sheet retained by the guide rail.

Other embodiments of this aspect include guide rails comprising one or more access points for attaching support struts to the solar receiver. In some embodiments, as in FIG. 15, every guide rail includes access points for support struts; in other embodiments, not every guide rail in a reflective assembly or reflective trough includes access points. Useful access points useful include holes for passing a support strut through the guide rail for attachment of the support strut to a supporting rib or support structure. Access points also include embodiments for attaching the support strut directly to the guide rail, for example using bolts, screws, interlocking components or other attachment methods. In another embodiment, the solar receiver is mounted directly on the support structure; in this embodiment, the guide rails need not include access points.

Figure 16:
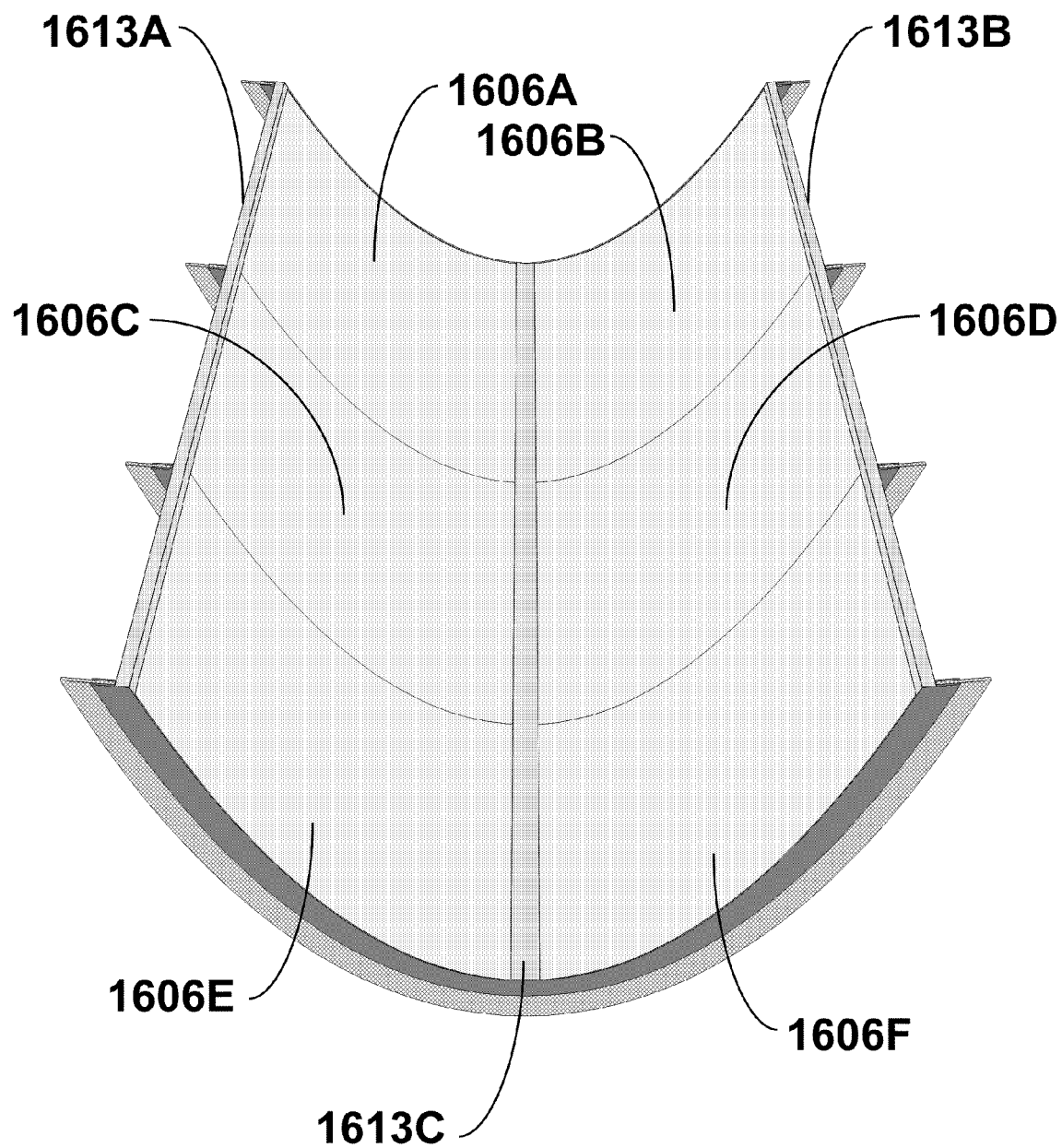
FIG. 16 illustrates a perspective view of a reflective assembly including transverse rail members.

The reflective assemblies of various embodiments of the present invention may also comprise one or more transverse rail members. Transverse rail members are useful, for example, for increasing the transverse rigidity of slidably removable reflective sheets and/or for the preventing slidably removable reflective sheets from sagging between supporting ribs and/or guide rails. In an embodiment, a transverse rail member is positioned at a longitudinal end of a reflective assembly. In another embodiment, a transverse rail member is positioned in the interior of a reflective assembly. For example, FIG. 16 illustrates a specific embodiment of a reflective assembly having three transverse rail members, one transverse rail member (1613A and 1613B) positioned at each longitudinal end of the reflective assembly, and one transverse rail member 1613C at an interior position of the reflective assembly. In this embodiment, six slidably removable reflective sheets (1606A, 1606B, 1606C, 1606D, 1606E, and 1606F) comprise the reflective assembly, two positioned between each pair of guide rails.

Useful transverse rail members include many different embodiments for attaching to, supporting, retaining and/or protecting transverse edges of slidably removable reflective sheets. In one embodiment, a transverse rail member comprises a length of angle stock; for example, steel or aluminum angle stock. In another embodiment, a transverse rail member comprises two lengths of angle stock positioned to form a T-shaped or U-shaped member. In another embodiment, a transverse rail member comprises extruded or roll-formed steel or aluminum; for example, steel or aluminum having an L-shaped or other cross-sectional shape known to the art. In another embodiment, a transverse rail member comprises an L-shaped member having one or more notches or cut-out portions for passing over a guide rail and/or supporting rib. In another embodiment, a transverse rail member comprises an angled member having one or more lower support regions for supporting and/or protecting the transverse edges of one or more slidably removable reflective sheets.

Figure 17A:
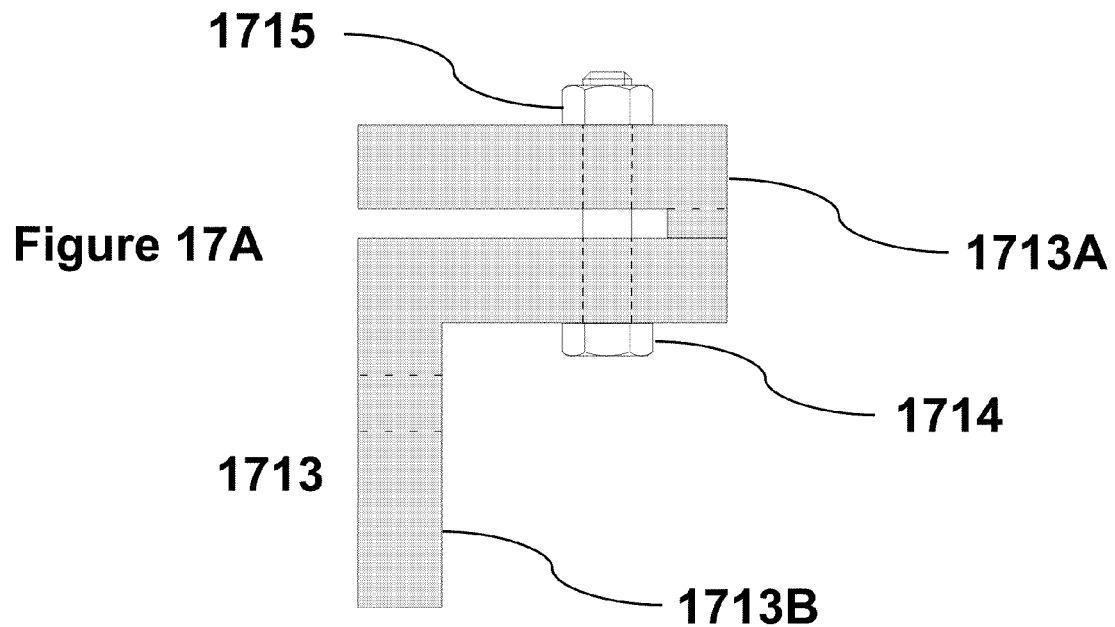
FIG. 17A, FIG. 17B and FIG. 17C illustrate cross-sectional or perspective views of an exemplary transverse rail member.
Figure 17B:
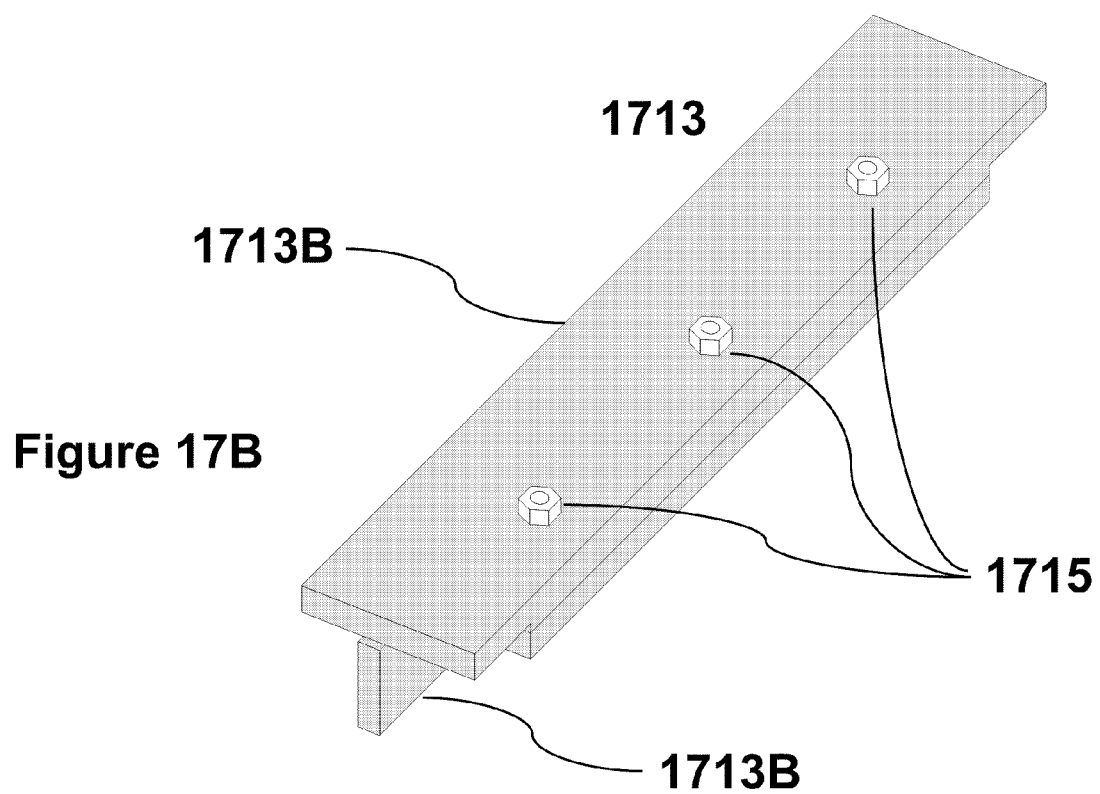
Figure 17C:
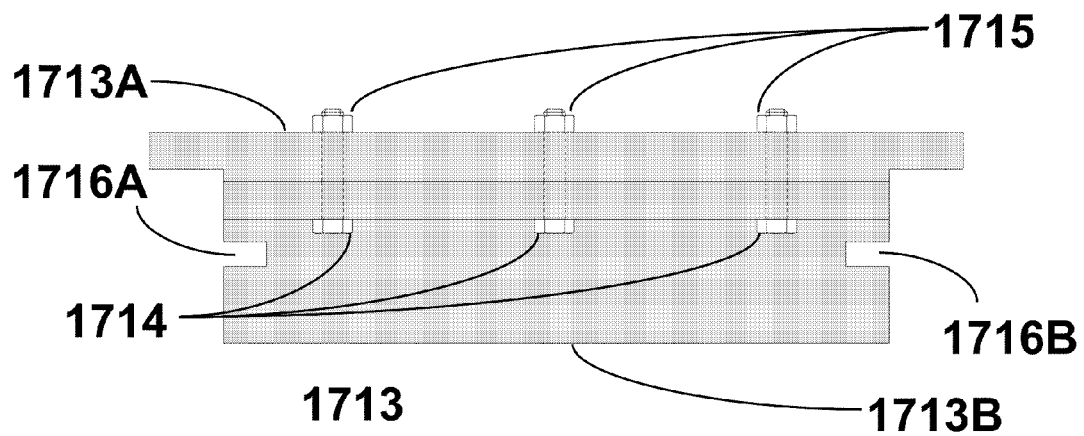
Figure 17D:
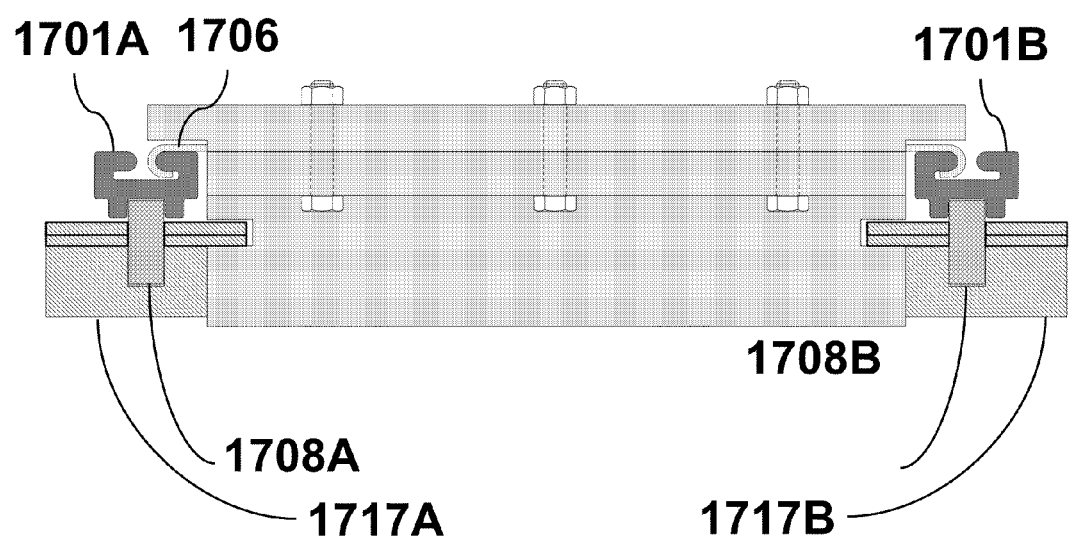
FIG. 17D shows the transverse rail member in place in a reflective assembly.
Figure 18A:
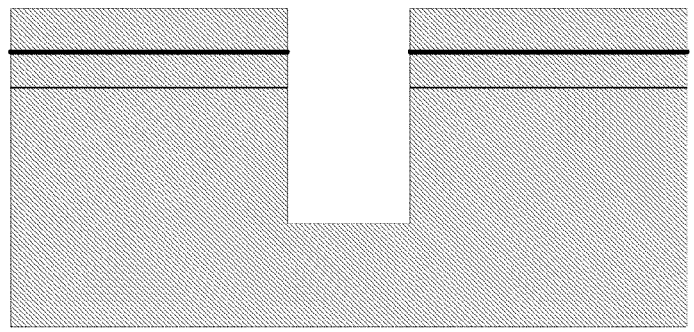
FIG. 18A, FIG. 18B and FIG. 18C illustrate sectional or perspective views of a retaining member.
Figure 18B:
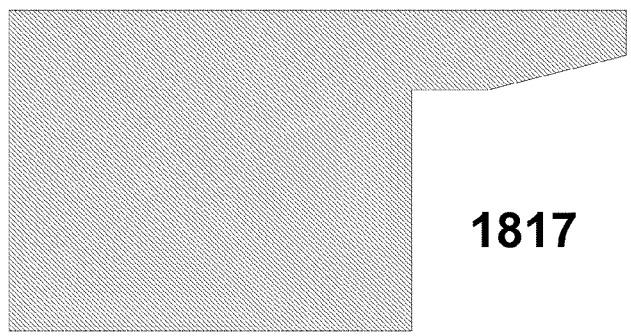
Figure 18C:
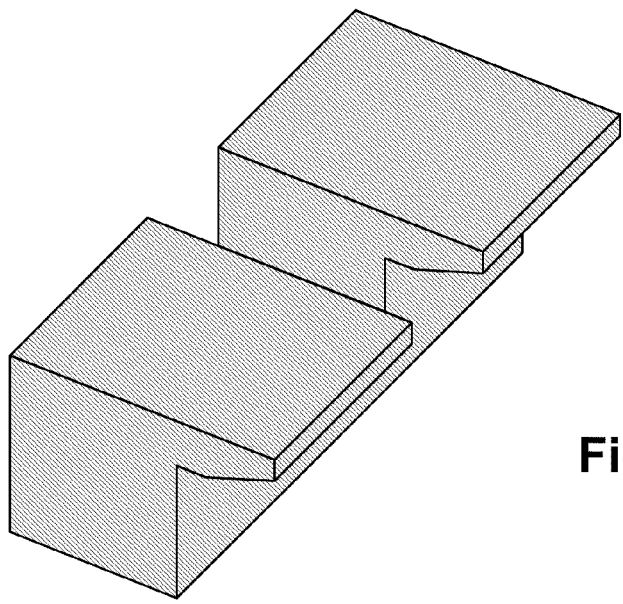

FIGS. 17A, 17B and 17C show cross-sectional and perspective views of a transverse rail member embodiment 1713, for example useful as transverse rail members positioned at the rims of the reflective assembly of FIG. 16. Transverse rail member 1713 is comprised of a first portion 1713A and a second portion 1713B; the two portions are mechanically attached by bolts 1714 and nuts 1715, the tightening of which provides a clamping force on a slidably removable reflected sheet inserted between the first and second portions. Second portion 1713B further includes notches 1716A and 1716B. FIG. 17D illustrates a view in the longitudinal direction of an assembly including transverse rail member 1713, slidably removable reflective sheet 1706, two guide rails 1701A and 1701B, two supporting ribs 1708A and 1708B and two retaining members 1717A and 1717B which attach around the supporting ribs 1708A and 1708B and engage notches 1716A and 1716B. The retaining member may further be mechanically attached to the supporting rib, for example with screws or set-screws. FIGS. 18A, 18B and 18C show views of the retaining member.

Figure 19A:
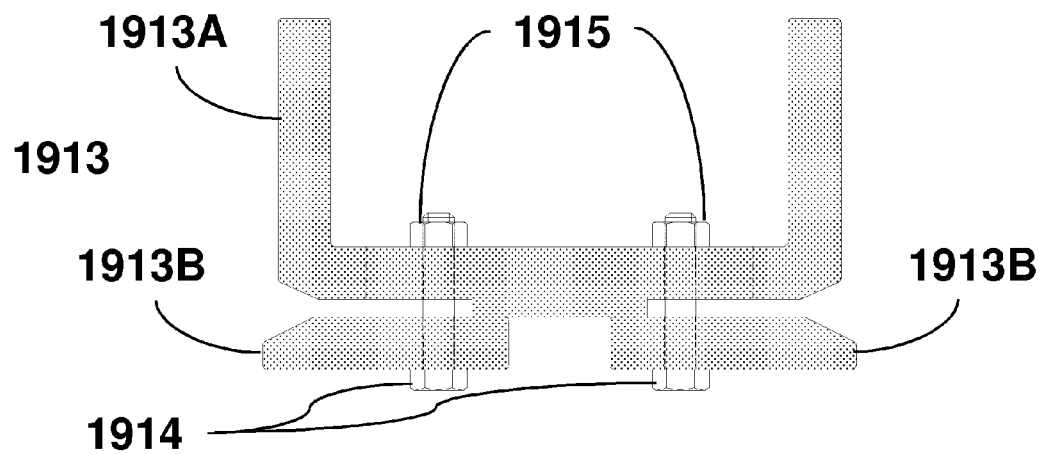
FIG. 19A and FIG. 19B illustrate cross-sectional and perspective views, respectively, of an exemplary transverse rail member.
Figure 19B:
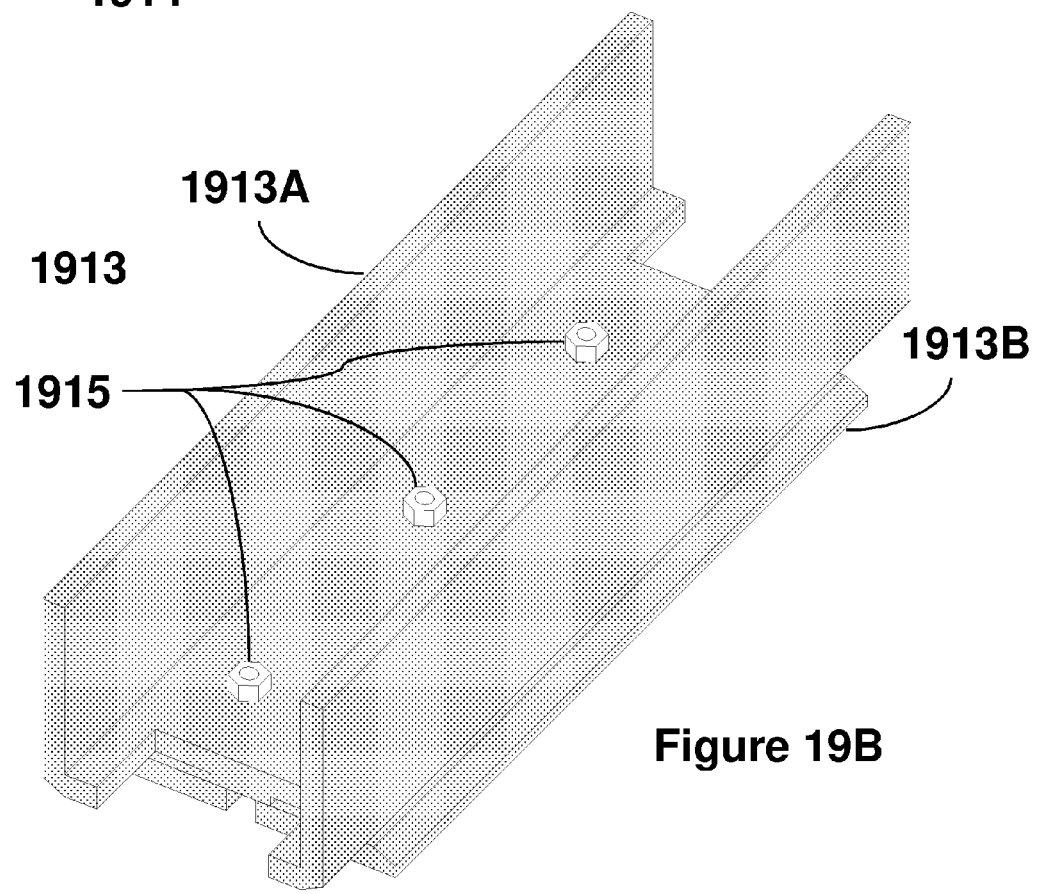

FIG. 19 shows two views of another transverse rail member embodiment, for example, useful as the transverse rail member positioned at the longitudinal interior position of the reflective assembly of FIG. 16. Transverse rail member 1913 is comprised of a first portion 1913A and a second portion 1913B; the two portions are mechanically attached by nuts 1915 and bolts 1914, the tightening of which provides a clamping force on a slidably removable reflected sheet inserted between the first and second portions.

Figure 20A:
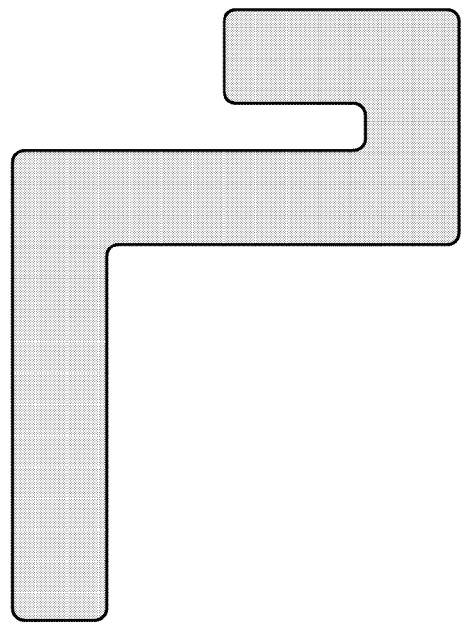
FIGS. 20A and 20B illustrate the cross-sections of additional transverse rail embodiments.
Figure 20B:
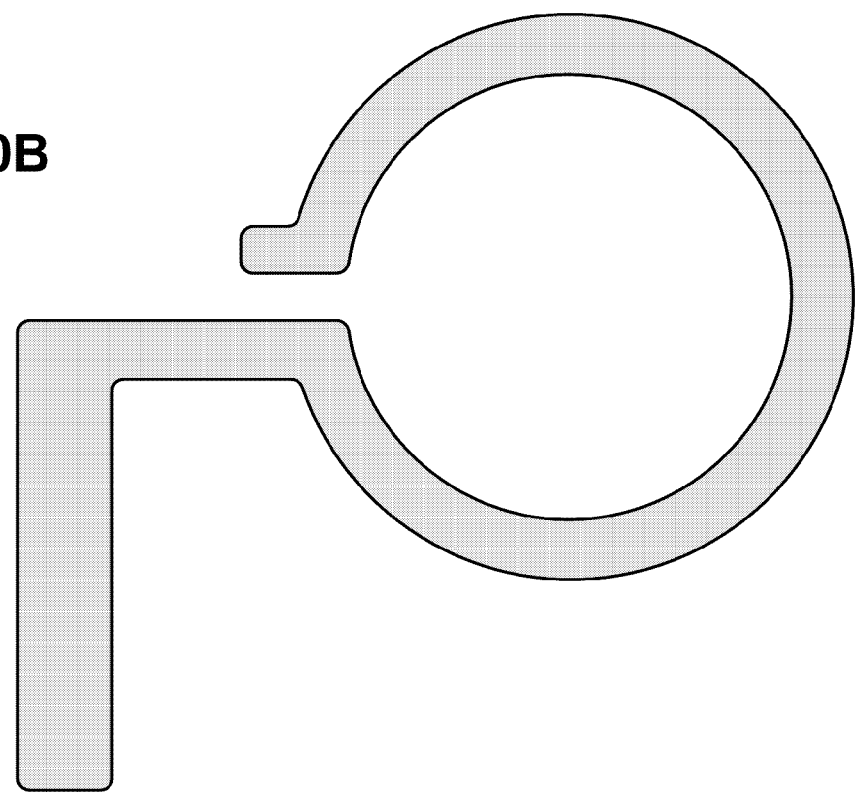

In a specific embodiment, a transverse rail member 2013A comprises extruded material having a cross-section as depicted in FIG. 20A. In an embodiment shown in FIG. 20B, a transverse rail member 2013B is used to grip the transverse edge of a slidably removable reflective sheet.

Figure 21A:
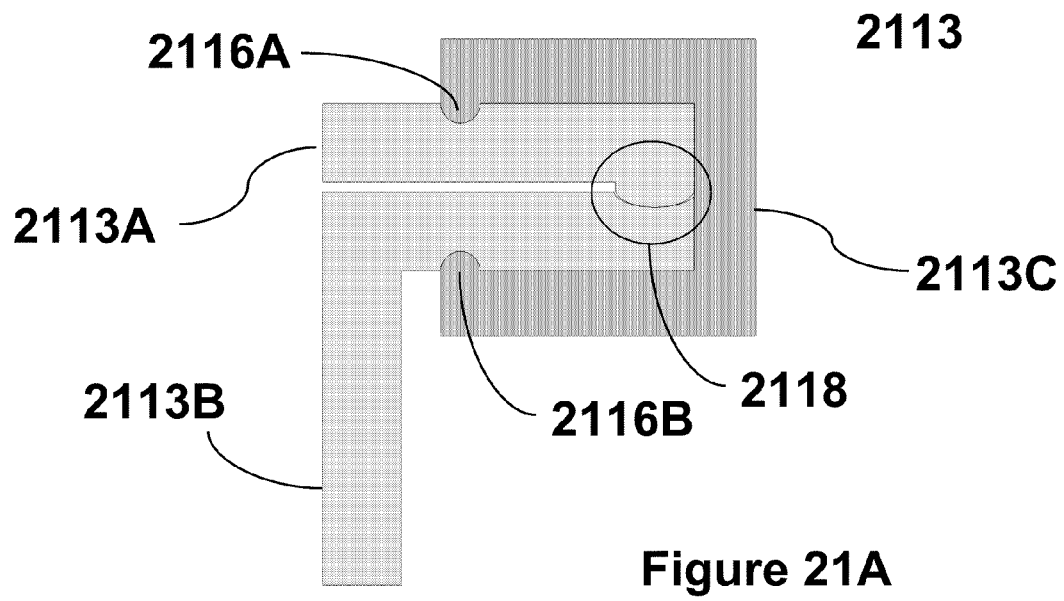
FIGS. 21A and 21B illustrate the cross-sections of two alternate transverse rail member embodiments.

FIG. 21A illustrates another transverse rail member embodiment. In this embodiment, the transverse rail member comprises a first portion 2113A, a second portion 2113B and one or more clips 2113C. The first and second portions include self locating features 2118 for aligning first portion 2113A and second portion 2113B to one another. In some embodiments, as shown in FIG. 21A, the first and second portions respectively include grooves 2116A and 2116B for securing clips 2113C.

Figure 21B:
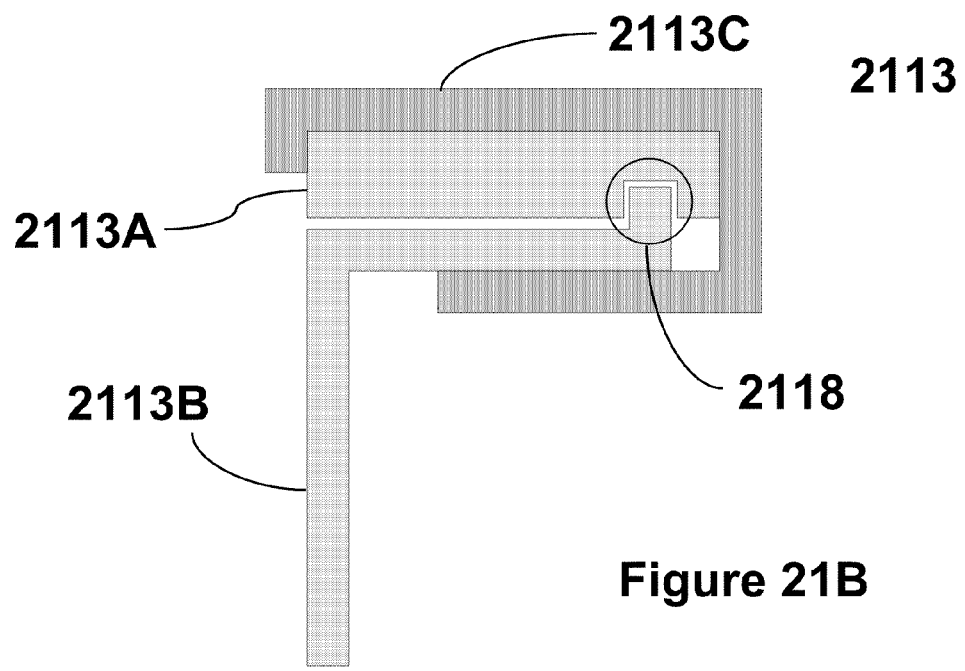

In an alternate embodiment shown in FIG. 21B, transverse rail member first portion 2113A and transverse rail member second 2113B portion include self locating features 2118 and are attached to one another by one or more clips 2113C. The embodiment in FIG. 21B is useful, for example when first portion 2113A is made by extrusion and/or when second portion 2113B is formed by extrusion or roll-forming. In the embodiments shown in FIGS. 21A and 21B, clips 2113C can be replaced by other attachment means, for example screws, nuts and bolts, bolts engaging tapped holes, clamps, clips, or any combination of these and/or other attachment means known to the art.

Figure 21C:
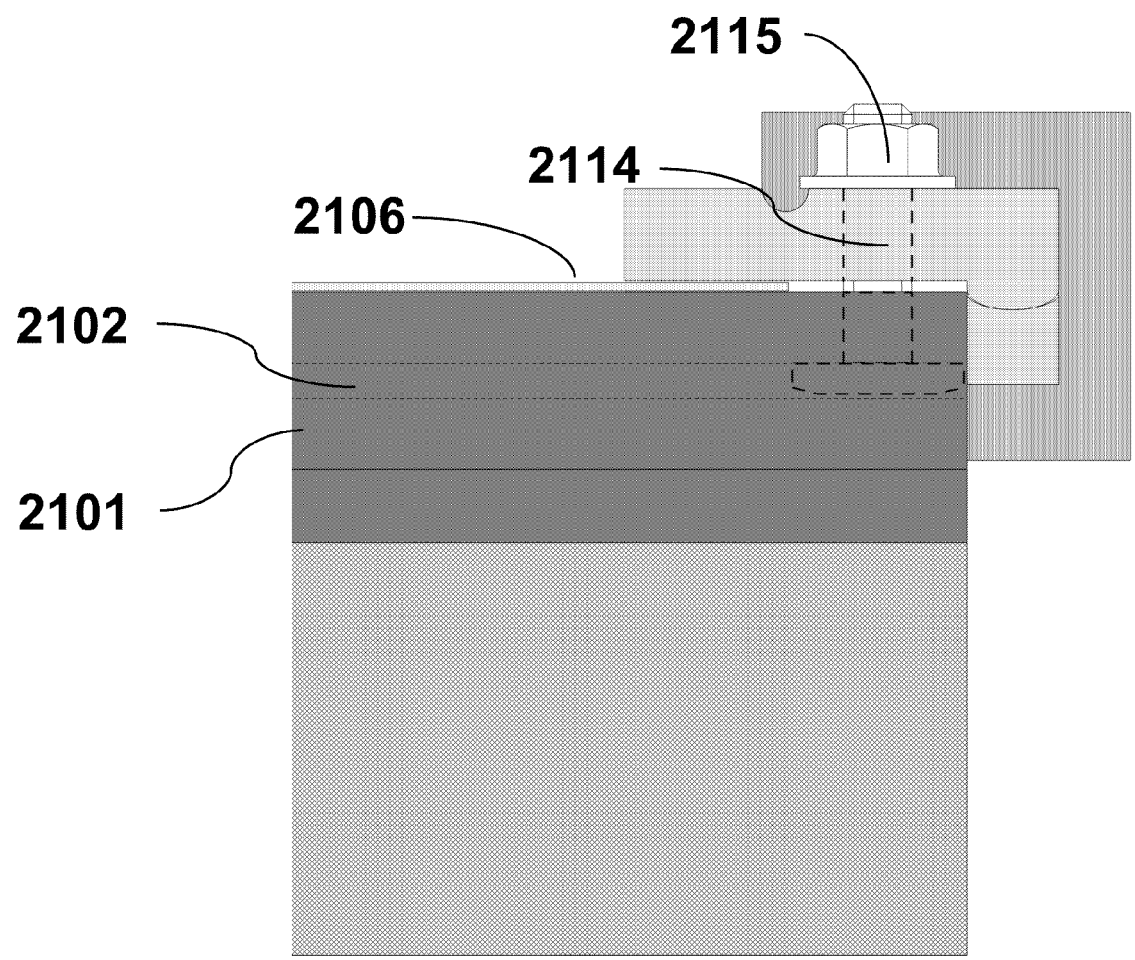
FIGS. 21C, 21D, 21E and 21F illustrate various sectional views of a transverse rail member embodiment in place in a reflective assembly.

FIG. 21C illustrates a sectional view along the transverse direction of the transverse rail member of FIG. 21A in place in a reflective assembly. One or more T-bolts 2114 are inserted into longitudinal channels 2102 of guide rails 2101 for attaching top portion 2113 to guide rails 2101 with nuts 2115. T-bolts 2114, nuts 2115 and clips 2113C all provide clamping forces for retaining slidably removable reflective sheets 2106 to transverse rail member 2113. Additionally, clips 2113C attach transverse rail second portion 2113B to first portion 2113A. For some embodiments, T-bolts 2114 are substituted with other types of bolts or other attachment means known to the art, for attaching the first portion 2113 to the guide rails 2101.

Figure 21D:
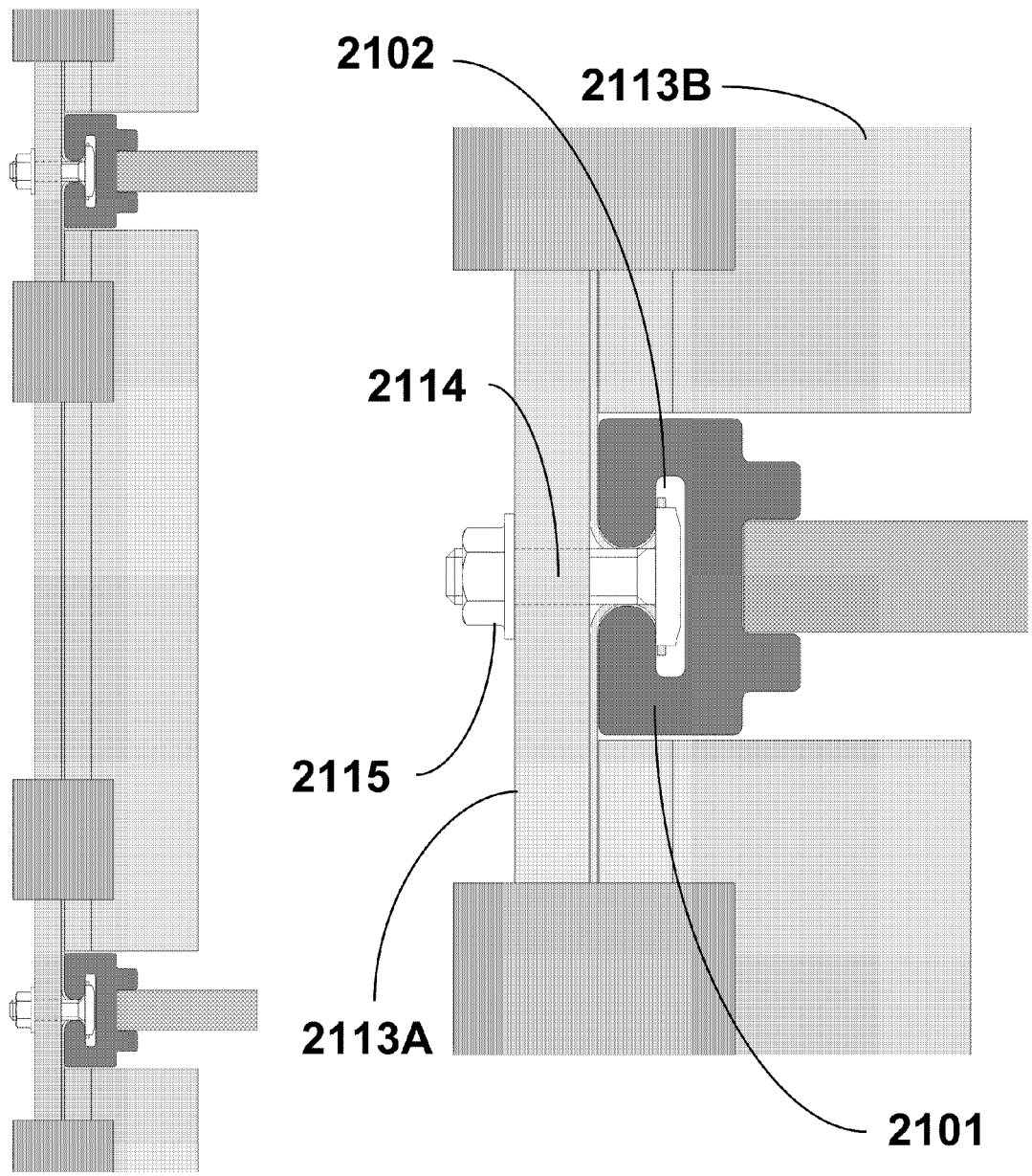

FIG. 21D illustrates a sectional view along the longitudinal direction of the transverse rail member of FIG. 21A in place in a reflective assembly as in FIG. 21C and includes an expanded view surrounding a guide rail. As above, one or more T-bolts 2114 are inserted into longitudinal channels 2102 of guide rails 2101 for attaching top portion 2113A to guide rails 2101 with nuts 2115.

Figure 21E:
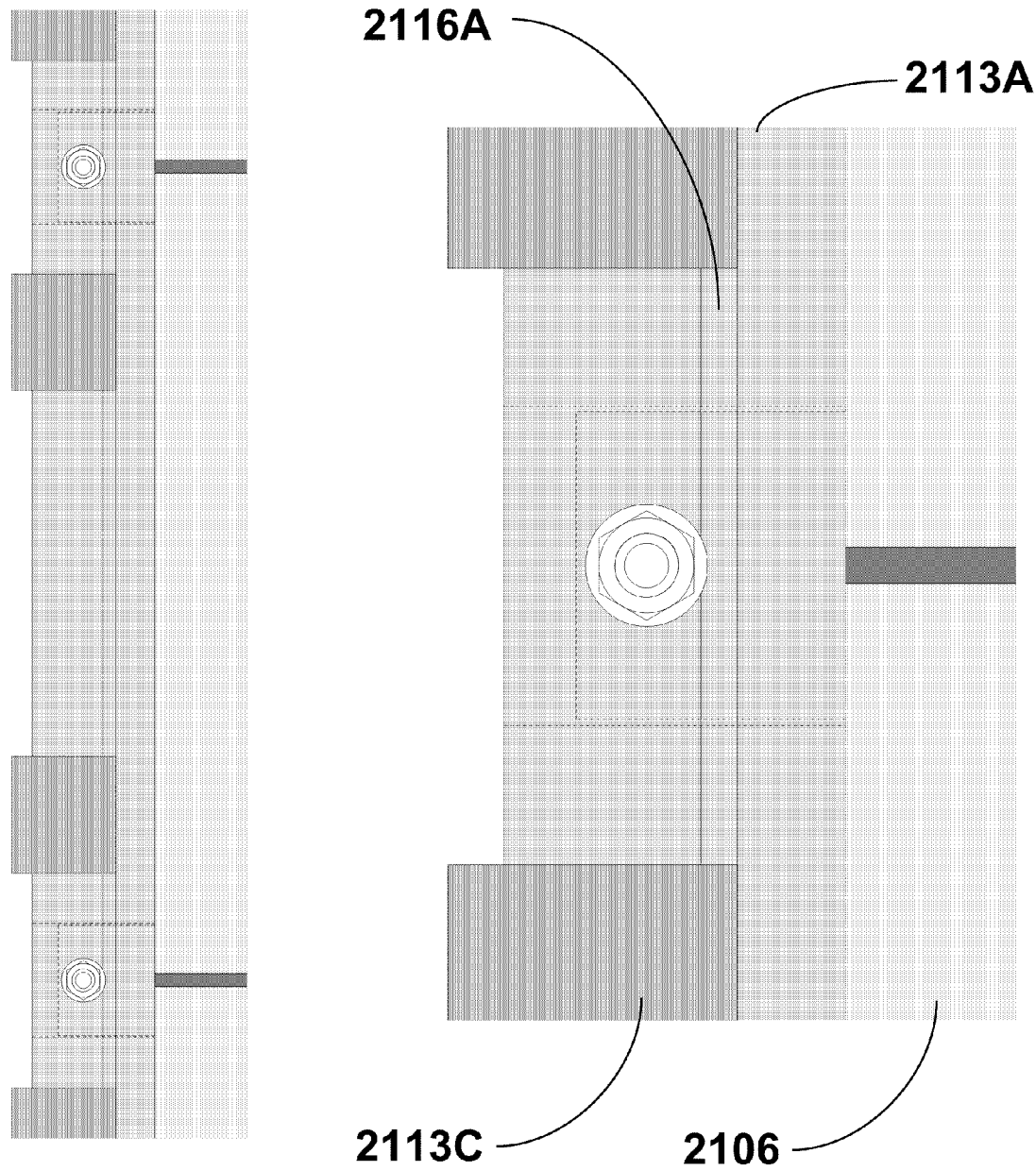
Figure 21F:
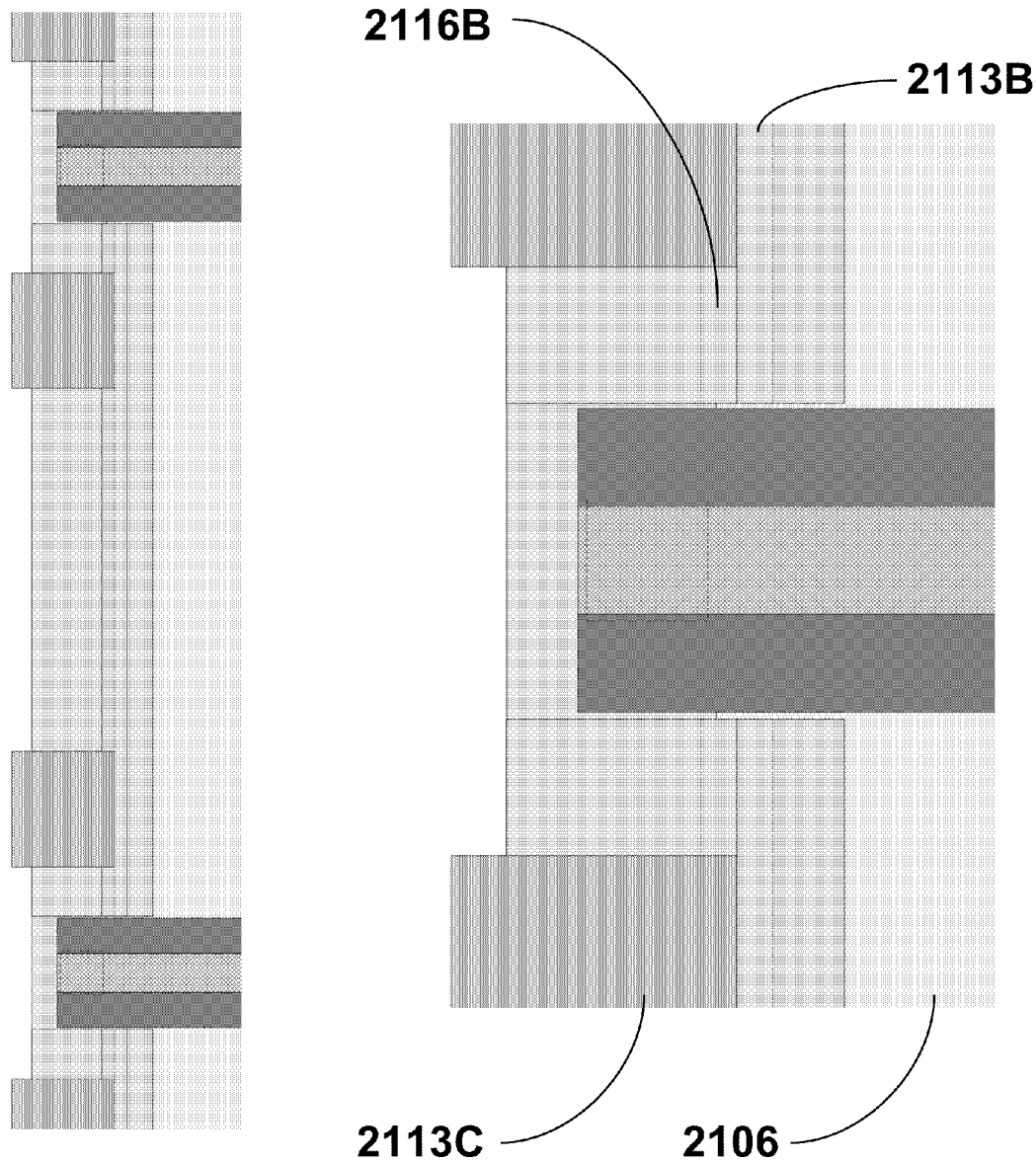
Figure 21G:
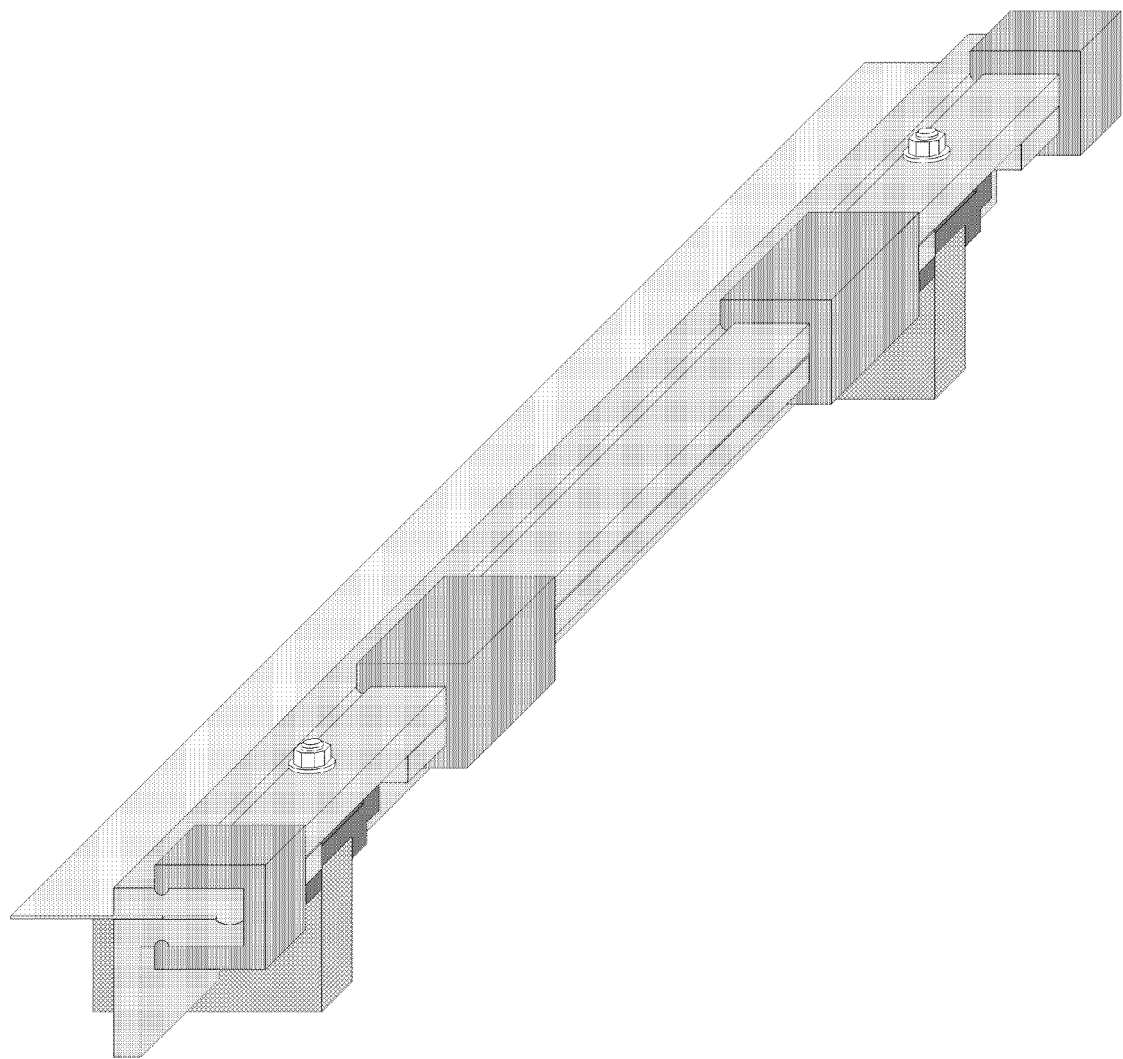
FIG. 21G illustrates a perspective view of a transverse rail member embodiment in place in a reflective assembly.

FIGS. 21E and 21F illustrates top and bottom views, respectively, of the transverse rail member of FIG. 21A in place in a reflective assembly as in FIGS. 21C and 21D and includes an expanded view surrounding a guide rail. FIG. 21E shows groove 2116A in transverse rail first portion 2113A for securing clips 2113C. FIG. 21E shows groove 2116B in transverse rail second portion 2113B for securing clips 2113C. FIG. 21G illustrates a perspective view of the transverse rail member of FIG. 21A in place in a reflective assembly as in FIGS. 21C, 21D, 21E and 21F.

In another aspect, the present invention provides a reflective trough comprising a supporting structure; a plurality of supporting ribs, wherein the plurality of ribs are mounted on the supporting structure; a plurality of guide rails, wherein at least one guide rail is mounted on each of the supporting ribs; and a plurality of slidably removable reflective sheets having longitudinal edges mounted within channels of the guide rails. Supporting structures useful with reflective trough embodiments include, but are not limited to, space frames, torque tube based structures, and other support structures known in the art. U.S. Provisional Patent Applications No. 61/079,382, filed on Jul. 9, 2008, and No. 61/091,095 filed on Aug. 22, 2008, hereby incorporated by reference in their entireties, describe an exemplary support structure and components thereof.

In order to improve the rigidity of the slidably removable reflective sheets, in an embodiment, the slidably removable reflective sheets are optionally placed under tension along a transverse direction. Placing the slidably removable reflective sheets under tension along a transverse direction generally improves the ability of the reflective sheets to withstand other forces, for example forces due to wind or snow loads. In an embodiment, the slidably removable reflective sheets are placed under tension by increasing the transverse spacing of guide rails and/or supporting ribs which the slidably removable reflective sheets are retained by or attached to.

Figure 22A:
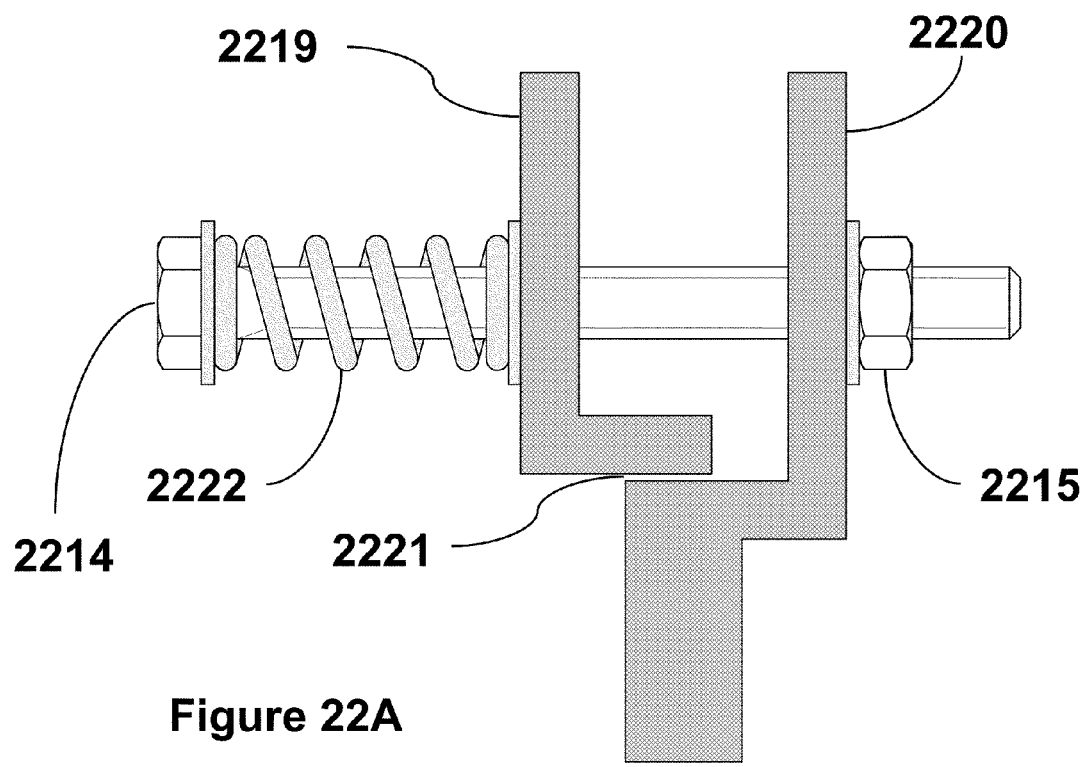
FIG. 22A illustrates the cross-section of an exemplary supporting rib comprising multiple portions.
Figure 22B:
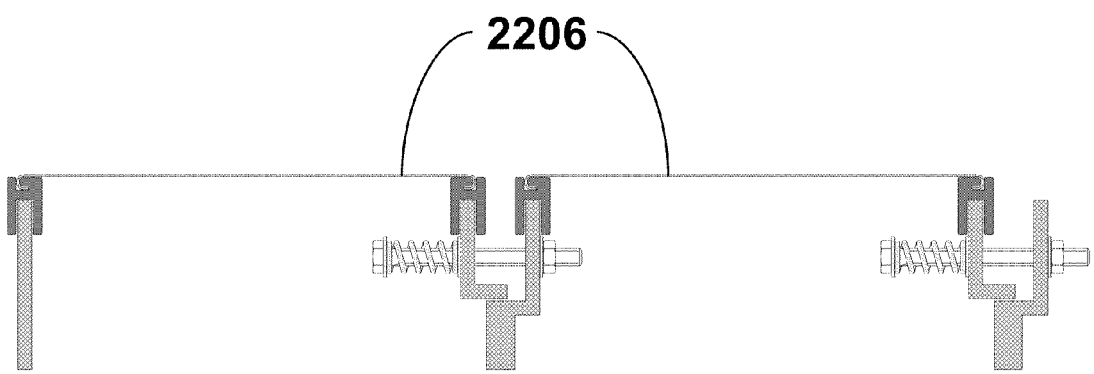
FIG. 22B illustrates a cross-sectional view of an exemplary reflective assembly, having two slidably removable reflective sheets under tension, and comprising a supporting rib having multiple portions.

In a specific embodiment, the supporting ribs may comprise multiple portions which are relatively translatable in a transverse direction for applying tension to a slidably removable reflective sheet. FIG. 22A illustrates the cross-section of an exemplary supporting rib comprising multiple portions. The supporting rib shown in FIG. 22A comprises a movable portion 2219 and a fixed portion 2220. The two portions touch one another at an interface 2221 which allows for translation of movable portion 2219 in a transverse direction with respect to fixed portion 2220. Interface 2221 may include components for preventing relative translation of movable portion 2219 and fixed portion 2220 along the longitudinal direction. Interface 2221 may also or alternately include components for preventing relative rotation of movable portion 2219 and fixed portion 2220. For example, interface 2221 may comprise interlocking features between movable portion 2219 and fixed portion 2220. The supporting rib of FIG. 22A further comprises one or more compression springs 2222, and threaded bolts 2214 for application of tension to a slidably removable reflective sheet by adjustment of nut 2215. In a specific embodiment, multiple compression springs and threaded bolts are positioned longitudinally along the supporting rib to distribute the applied tension. FIG. 22B illustrates a cross-sectional view of an exemplary reflective assembly, having two slidably removable reflective sheets 2206 under tension, and comprising two supporting ribs of FIG. 22A.

Figure 23A:
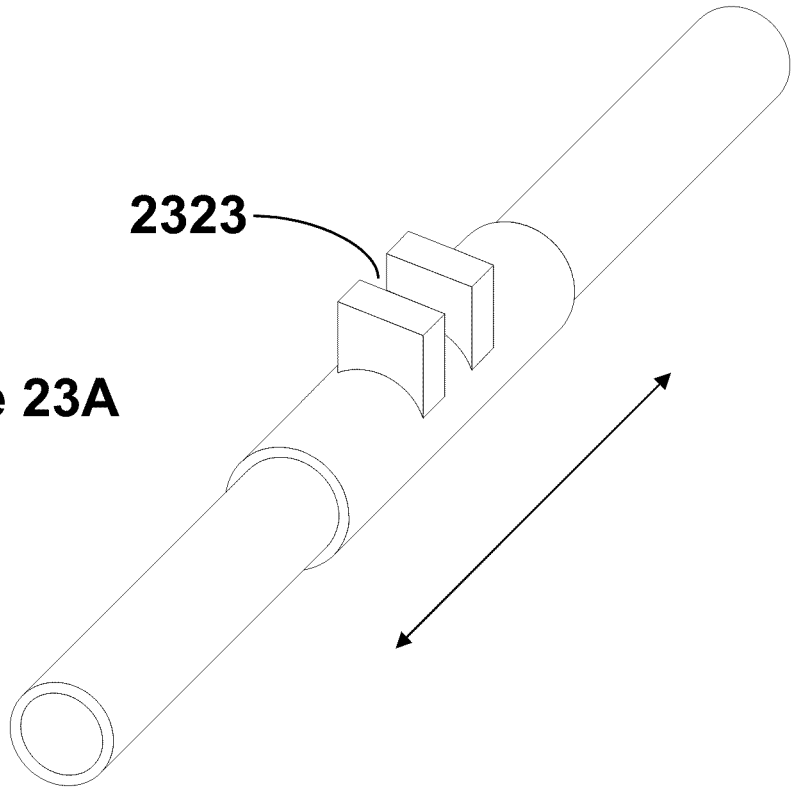
FIG. 23A and FIG. 23B illustrate two exemplary rib translation rail embodiments.

In a specific embodiment, the supporting structure comprises one or more rib translation rails for translating one or more of the supporting ribs in a transverse direction. In an embodiment, a rib translation rail comprises a length of tubing placed over a portion of a support structure for attaching to a supporting rib, such that the supporting rib is translatable along the transverse direction. FIG. 23A depicts a perspective view of an exemplary rib translation rail embodiment. A supporting rib attaches to the rib translation rail at attachment bracket 2323, allowing for translation of the rib translation rail and supporting rib along the direction shown by the arrow.

Figure 23B:
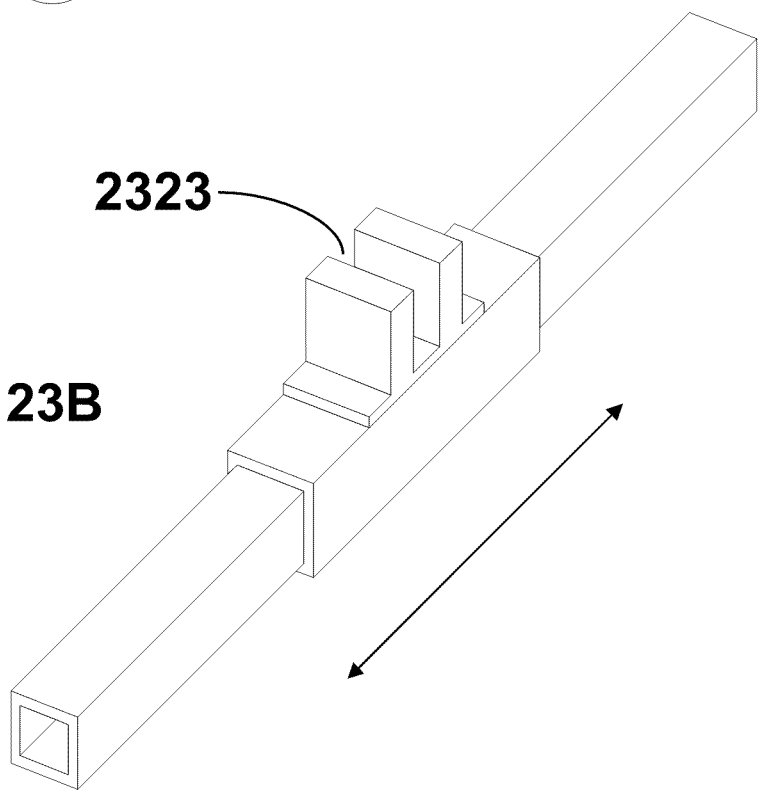

FIG. 23B depicts a perspective view of another rib translation rail embodiment having a square cross-section.

Figure 24:
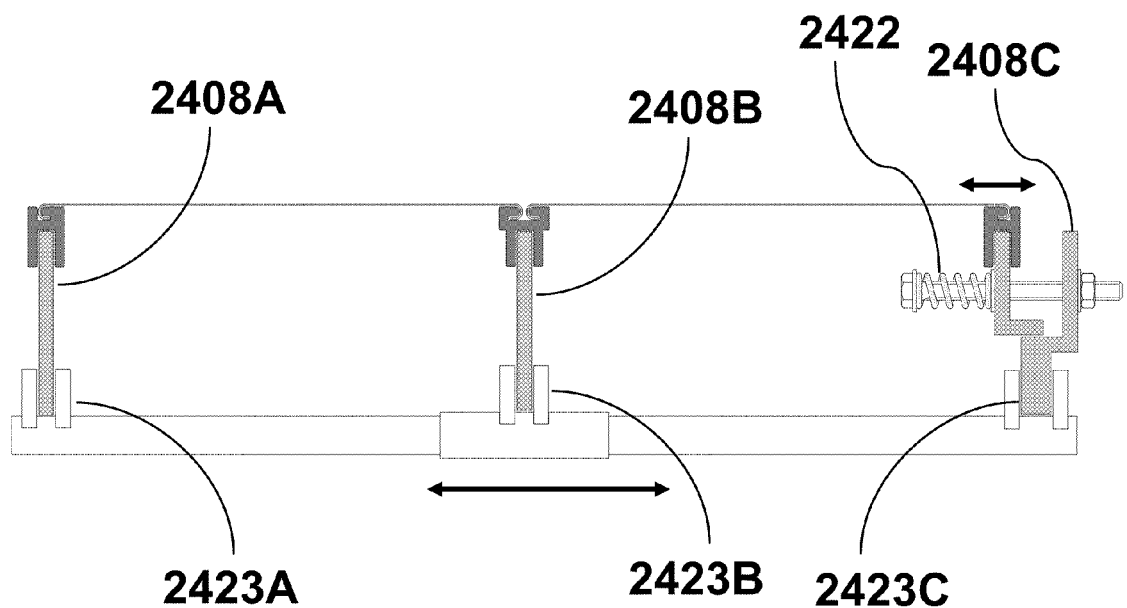
FIG. 24 illustrates a cross-sectional view of an exemplary reflective assembly comprising a supporting rib having multiple portions and a rib translation rail.

FIG. 24 illustrates a cross-sectional view of an exemplary reflective assembly having two slidably removable reflective sheets under tension and comprising a rib translation rail of FIG. 23A and a supporting rib of FIG. 22A. Three supporting ribs attach to a portion of a support structure at attachment brackets 2423A, 2423B and 2423C. Here, the supporting rib 2408A attached to attachment bracket 2423A is fixed to the support structure, as well as the fixed portion of the supporting rib 2408C attached to attachment bracket 2423C, while the supporting rib 2408B attached to attachment bracket 2423B can move via the rib translation rail along the direction shown. In this way the force applied by the compression spring 2422 can be transmitted through both slidably removable reflective sheets and resisted by the fixed supporting rib 2408A.

In an embodiment, the support structure comprises one or more flexure sections. In another specific embodiment, the support structure comprises one or more compliant features. Rib translation rails, compliant features, and/or flexure sections are useful, for example, for applying tension to one or more slidably removable reflective sheets along a transverse direction or for withstanding transverse dimensional changes due to changes in temperature, gradual changes in seating of the reflective sheets and guide rails over time, and/or other changes. In an exemplary embodiment, the support structure comprises one or more compression springs for applying tension to at least one slidably removable reflective sheet along a transverse direction; the support structure may further comprise one or more bolts or threaded rods which run through the center of each compression spring and allow for the compression of the spring to be adjusted.

REFERENCES

U.S. Pat. Nos. 4,372,027, 4,423,719, 4,510,923, 4,596,238, 4,611,575, 4,678,292, 5,058,565, 5,071,243, and 5,964,216.

U.S. Provisional Patent Applications, hereby incorporated by reference in their entireties, No. 61/079,394 filed Jul. 9, 2008; No. 61/079,382 filed Jul. 9, 2008; No. 61/091,095 filed Aug. 22, 2008; and No. 61/144,703 filed Jan. 14, 2009.

FIGURE REFERENCE LIST

Guide Rail or Guide Rail Body
101
201
301
401
601A, 601B
701
801
1101, 1101A, 1101B
2101
Longitudinal Channel
102
202
302
402A, 402B
602A, 602B
702A, 702B
802A, 802B
902A, 902B, 902C
2102
Longitudinal Channel Outer Portion
103
203
403A, 403B
603A, 603B
703A, 703B
Longitudinal Channel Inner Portion
104
204
304
404A, 404B
604A, 604B
704A, 704B
Supporting Rib Channel
105
205
305
405
605
705
805
Slidably Removable Reflective Sheet
106
206A, 206B
306
406A, 406B
606A, 606B
706A, 706B
806A, 806B
1006A, 1006B, 1006C
1106A, 1106B, 1106C
1206
1606A, 1606B, 1606C, 1606D, 1606E, 1606F
1706
2106
2206
Longitudinal Hook or Hemmed Edge
107
207A, 207B
307
407A, 407B
607A, 607B
Supporting Rib
108
208
308
408
608
708
1108
1208A, 1208B
1708A, 1708B
2408A, 2408B, 2408C
Longitudinal Tabs
709A, 709B
809A, 809B
Slidably Removable Reflective Strip
710
810
Solar Receiver
1411
1511
Support Strut
1512

Transverse Rail Member
1613A, 1613B, 1613C
1713, 1713A, 1713B
1913, 1913A, 1913B
2013A, 2013B
2113, 2113A, 2113B
Bolt
1714
1914
2114
2214
Nut
1715
1915
2115
2215
Notch or Groove
1716A, 1716B
2116A, 2116B
Retaining Member
1717A, 1717B
1817
Self-locating Features
2118
Supporting Rib Movable Portion
2119
Supporting Rib Fixed Portion
2220
Supporting Rib Movable/Fixed Portion Interface
2221
Spring
2222
2422
Supporting Rib Attachment Bracket
2323
2423A, 2423B, 2423C

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference) for purposes of enablement and written description.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of components is disclosed herein, it is understood that all individual members of those groups and all subgroups are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a distance range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by specific and/or preferred embodiments and optional features, modification and variation of the concepts herein disclosed may be resorted to by those skilled in the art, and that such modifications and variations are considered to be within the scope of this invention as defined by the appended claims.

We claim:

1. A guide rail for directing and retaining one or more slidably removable reflective sheets in a solar concentrator, and for maintaining the one or more slidably removable reflective sheets in a shape prescribed by the shape of the guide rail, the guide rail comprising a rail body, wherein the rail body has a longitudinal axis and comprises a first longitudinal channel having an opening at an upper surface of the rail body and a retaining shape for retaining longitudinal edges of the one or more slidably removable reflective sheets, wherein the first longitudinal channel comprises an outer portion and an inner portion wider than the outer portion, wherein the one or more slidably removable reflective sheets reflect incident light to a solar receiver.

2. The guide rail of claim 1, wherein the rail body further comprises a second longitudinal channel having a retaining shape.

3. The guide rail of claim 2, wherein the second channel comprises an outer portion and an inner portion wider than the outer portion.

4. The guide rail of claim 1, wherein the guide rail guides and retains longitudinal hemmed edges or longitudinal hook edges of the one or more slidably removable reflective sheets.

5. The guide rail of claim 1, wherein the rail body further comprises an additional longitudinal channel sized and shaped for attachment to a supporting rib.

6. The guide rail of claim 1, wherein the rail body is comprised of a top piece joined to a bottom piece and wherein the top piece and the bottom piece respectively define top and bottom surfaces of the first longitudinal channel.

7. The guide rail of claim 1, wherein the rail body comprises a material selected from the group consisting of: a lubricious material, polyoxymethylene, aluminum, steel, a slip coating, polytetrafluoroethylene, an anodized coating and any combination of these.

8. The guide rail of claim 1, wherein the inner portion of each longitudinal channel has a depth selected from 0.080 inches to 0.250 inches.

9. The guide rail of claim 1, wherein the outer portion of each longitudinal channel has a depth selected from 0.050 inches to 0.125 inches.

10. The guide rail of claim 1, wherein the rail body further comprises one or more retaining means for retaining the one or more slidably removable reflective sheets along the longitudinal direction.

11. A concentrating solar collection assembly comprising the guide rail of claim 1 and a first slidably removable reflective sheet of the one or more slidably removable reflective sheets having a longitudinal edge retained in the first longitudinal channel,
wherein the first slidably removable reflective sheet extends transversely from the guide rail.

12. The assembly of claim 11, further comprising a second slidably removable reflective sheet of the one or more slidably removable reflective sheets having a longitudinal edge retained in the first longitudinal channel, and wherein the first and second slidably removable reflective sheets extend transversely from the guide rail in opposite directions from one another.

13. The assembly of claim 12, wherein the first and second slidably removable reflective sheets have thicknesses selected from 0.020 inches to 0.080 inches.

14. The assembly of claim 12, wherein the first and second slidably removable reflective sheets comprise a material selected from the group consisting of aluminum, steel, a reflective film and any combination of these.

15. A reflective assembly for a concentrating solar collector comprising:
a pair of guide rails for guiding and/or retaining longitudinal edges of one or more slidably removable reflective sheets;
the one or more slidably removable reflective sheets having longitudinal edges mounted within longitudinal channels of the pair of guide rails;
wherein each guide rail comprises a rail body, wherein the rail body has a longitudinal axis and comprises a first longitudinal channel having an opening at an upper surface of the rail body and a retaining shape for retaining a longitudinal edge of the one or more slidably removable reflective sheets, wherein the first longitudinal channel comprises an outer portion and an inner portion wider than the outer portion, wherein the one or more slidably removable reflective sheets reflect incident light to a solar receiver.

16. The reflective assembly of claim 15 wherein the guide rails are shaped so as to define an optical surface of the one or more slidably removable reflective sheets.

17. The reflective assembly of claim 16 wherein the optical surface reflects a substantial portion of incident light to a solar receiver.

18. A reflective assembly for a concentrating solar collector comprising:
a pair of guide rails for guiding and/or retaining longitudinal edges of one or more slidably removable reflective sheets;
the one or more slidably removable reflective sheets having longitudinal edges mounted within longitudinal channels of the pair of guide rails;
wherein each guide rail comprises a channel in a supporting rib having an opening at an upper surface of the rail body and a retaining shape for retaining a longitudinal edge of the one or more slidably removable reflective sheets, wherein the channel comprises an outer portion and an inner portion wider than the outer portion, wherein the one or more slidably removable reflective sheets reflect incident light to a solar receiver.

19. The reflective assembly of claim 16, further comprising a transverse rail member mounted between the pair of guide rails for attaching to, supporting, or retaining one or more transverse edges of the one or more slidably removable reflective sheets.

20. The reflective assembly of claim 19 wherein the transverse rail member has one or more transverse channels for retaining the one or more transverse edges of the one or more slidably removable reflective sheets.

21. The reflective assembly of claim 19, wherein the transverse rail member is positioned to attach to, support, or retain the transverse edges of the one or more slidably removable reflective sheets at a rim of the reflective assembly.

22. The reflective assembly of claim 16, further comprising a pair of supporting ribs, wherein one guide rail is mounted on each supporting rib.

23. The reflective assembly of claim 22, wherein the supporting ribs span an entire length of the guide rails.

24. The reflective assembly of claim 16, wherein the longitudinal edges of the one or more slidably removable reflective sheets are longitudinal hemmed edges or longitudinal hook edges.

25. The reflective assembly of claim 16, wherein the guide rails apply tension to the one or more slidably removable reflective sheets.

26. The reflective assembly of claim 16, further comprising one or more springs attached to at least one of the pair of supporting ribs for placing the one or more slidably removable reflective sheets under tension.

27. A reflective trough for a concentrating solar collector comprising:
a supporting structure;
a plurality of supporting ribs; wherein the plurality of ribs are mounted on the supporting structure;
a plurality of guide rails, wherein each guide rail is mounted on a supporting rib; and
a plurality of slidably removable reflective sheets having longitudinal edges mounted within channels of the guide rails;
wherein each guide rail comprises a rail body, wherein the rail body has a longitudinal axis and comprises a first longitudinal channel having an opening at an upper surface of the rail body and a retaining shape for retaining the longitudinal edges of the plurality of slidably removable reflective sheets, wherein the first longitudinal channel comprises an outer portion and an inner portion wider than the outer portion, wherein the plurality of slidably removable reflective sheets reflects incident light to a solar receiver.

28. A reflective trough for a concentrating solar collector comprising:

a supporting structure;

a plurality of supporting ribs; wherein the plurality of ribs are mounted on the supporting structure;

a plurality of guide rails, wherein each guide rail is mounted on a supporting rib; and a plurality of slidably removable reflective sheets having longitudinal edges mounted within channels of the guide rails;

wherein each guide rail comprises a channel in a supporting rib having an opening at an upper surface of the rail body, and having a retaining shape for retaining the longitudinal edges of the plurality of slidably removable reflective sheets, wherein the channel comprises an outer portion and an inner portion wider than the outer portion, wherein the plurality of slidably removable reflective sheets reflects incident light to a solar receiver.

29. The reflective trough of claim 27, wherein the guide rails define a shape of optical surfaces of the plurality of slidably removable reflective sheets.

30. The reflective trough of claim 27, further comprising a solar receiver mounted at a line of substantially optimal energy capture for absorbing a substantial portion of incident light.

31. The reflective trough of claim 27, further comprising one or more transverse rail members for attaching to, supporting, or retaining transverse edges of the plurality of slidably removable reflective sheets.

32. The reflective trough of claim 27, wherein the supporting structure comprises means for translating at least one of the plurality of supporting ribs in a transverse direction along the length of the reflective trough.

* * * * *